(12) United States Patent
Khetan et al.

(10) Patent No.: US 9,171,464 B2
(45) Date of Patent: Oct. 27, 2015

(54) ENCODED REPRESENTATION OF ROUTE DATA

(71) Applicant: Apple Inc., Cupertino, CA (US)

(72) Inventors: Gaurang R. Khetan, Fremont, CA (US); J. Paul McCabe, San Jose, CA (US); Nils Stefan Daniel Bengtsson, Cupertino, CA (US); Uros Prestor, Union City, CA (US)

(73) Assignee: APPLE INC., Cupertino, CA (US)

( * ) Notice: Subject to any disclaimer, the term of this patent is extended or adjusted under 35 U.S.C. 154(b) by 227 days.

(21) Appl. No.: 13/632,049

(22) Filed: Sep. 30, 2012

(65) Prior Publication Data

US 2013/0332077 A1   Dec. 12, 2013

Related U.S. Application Data

(60) Provisional application No. 61/657,860, filed on Jun. 10, 2012, provisional application No. 61/699,799, filed on Sep. 11, 2012.

(51) Int. Cl.
*G01C 21/36* (2006.01)
*G08G 1/00* (2006.01)
(Continued)

(52) U.S. Cl.
CPC ............ *G08G 1/0962* (2013.01); *G01C 21/367* (2013.01); *G01C 21/3694* (2013.01); *G08G 1/096716* (2013.01); *G08G 1/096741* (2013.01); *G08G 1/096775* (2013.01)

(58) Field of Classification Search
CPC ............ G01C 21/3632; G06Q 10/047; G98G 1/096816; G98G 1/096827; G98G 1/096861
USPC .......................... 701/400, 410, 420, 430, 437
See application file for complete search history.

(56) References Cited

U.S. PATENT DOCUMENTS 6,163,269 A   12/2000   Millington et al.
6,178,380 B1   1/2001   Millington
(Continued)

FOREIGN PATENT DOCUMENTS

EP   1788541   5/2007
WO   WO 86/02764   5/1986
(Continued)

OTHER PUBLICATIONS

Hu, Jiuxiang, et al., "Road Network Extraction and Intersection Detection From Aerial Images by Tracking Road Footprints", IEEE Transactions on Geoscience and Remote Sensing, Dec. 2007, pp. 4144-4157, vol. 45, No. 12, IEEE.
(Continued)

*Primary Examiner* — Fadey Jabr
*Assistant Examiner* — Thomas Ingram
(74) *Attorney, Agent, or Firm* — Adeli LLP

(57) ABSTRACT

For a route server that generates route data for a route between a starting location and a destination location on a map, a method of compressing the route data that includes a maneuvering instruction for each of a plurality of junctures from the starting location to the destination location of the route is described. For a maneuvering instruction for each juncture of the route, the method determines whether the maneuvering instruction for the juncture is needed at a route client that is to receive the route data. When the maneuvering instruction for a particular juncture is determined not to be needed at the route client, the method modifies the route data by removing the maneuvering instruction for the particular juncture from the route data.

25 Claims, 38 Drawing Sheets

(51) Int. Cl.
*G08G 1/0962* (2006.01)
*G08G 1/0967* (2006.01)

(56) References Cited

U.S. PATENT DOCUMENTS

| | | | |
|---|---|---|---|
| 6,202,026 B1 | 3/2001 | Nimura et al. | |
| 6,295,503 B1 | 9/2001 | Inoue et al. | |
| 6,321,158 B1 | 11/2001 | DeLorme et al. | |
| 6,480,783 B1 | 11/2002 | Myr | |
| 6,496,189 B1 | 12/2002 | Yaron et al. | |
| 6,539,300 B2 | 3/2003 | Myr | |
| 6,577,946 B2 | 6/2003 | Myr | |
| 6,615,130 B2 | 9/2003 | Myr | |
| 6,862,524 B1 | 3/2005 | Nagda et al. | |
| 7,054,742 B2 | 5/2006 | Khavakh et al. | |
| 7,274,311 B1 | 9/2007 | MacLeod | |
| 7,379,811 B2 | 5/2008 | Rasmussen et al. | |
| 7,480,565 B2 | 1/2009 | Ikeuchi et al. | |
| 7,542,882 B2 | 6/2009 | Agrawala et al. | |
| 7,551,172 B2 | 6/2009 | Yaron et al. | |
| 7,729,854 B2 | 6/2010 | Muramatsu | |
| 7,746,343 B1 | 6/2010 | Charaniya et al. | |
| 7,860,645 B2* | 12/2010 | Kim et al. | 701/423 |
| 8,041,503 B2 | 10/2011 | Choi et al. | |
| 8,103,440 B2 | 1/2012 | Sengoku et al. | |
| 8,237,713 B2 | 8/2012 | Yaron et al. | |
| 8,249,259 B2 | 8/2012 | Marumoto et al. | |
| 8,681,176 B1 | 3/2014 | Maurer et al. | |
| 8,738,284 B1 | 5/2014 | Jones | |
| 8,798,918 B2* | 8/2014 | Onishi et al. | 701/420 |
| 2001/0028350 A1 | 10/2001 | Matsuoka et al. | |
| 2001/0056325 A1* | 12/2001 | Pu et al. | 701/202 |
| 2002/0059296 A1 | 5/2002 | Hayashi et al. | |
| 2002/0103599 A1 | 8/2002 | Sugiyama et al. | |
| 2003/0231190 A1 | 12/2003 | Jawerth et al. | |
| 2004/0212627 A1 | 10/2004 | Sumizawa et al. | |
| 2004/0236507 A1 | 11/2004 | Maruyama et al. | |
| 2005/0131631 A1 | 6/2005 | Nakano et al. | |
| 2005/0273252 A1* | 12/2005 | Nix et al. | 701/201 |
| 2006/0015249 A1 | 1/2006 | Gieseke | |
| 2006/0025923 A1* | 2/2006 | Dotan et al. | 701/207 |
| 2006/0041372 A1* | 2/2006 | Kubota et al. | 701/200 |
| 2006/0217879 A1 | 9/2006 | Ikeuchi et al. | |
| 2006/0287818 A1 | 12/2006 | Okude et al. | |
| 2007/0080830 A1 | 4/2007 | Sacks | |
| 2007/0276596 A1 | 11/2007 | Solomon et al. | |
| 2007/0276597 A1 | 11/2007 | Kato et al. | |
| 2007/0293958 A1 | 12/2007 | Stehle et al. | |
| 2008/0059889 A1 | 3/2008 | Parker et al. | |
| 2008/0077324 A1 | 3/2008 | Hatano et al. | |
| 2008/0091344 A1 | 4/2008 | Mikuriya et al. | |
| 2008/0154489 A1 | 6/2008 | Kaneda et al. | |
| 2008/0238941 A1 | 10/2008 | Kinnan et al. | |
| 2009/0037093 A1 | 2/2009 | Kurihara et al. | |
| 2009/0063041 A1* | 3/2009 | Hirose et al. | 701/209 |
| 2009/0105944 A1 | 4/2009 | Urano et al. | |
| 2009/0177373 A1 | 7/2009 | Groenhuijzen et al. | |
| 2009/0187335 A1* | 7/2009 | Muhlfelder et al. | 701/200 |
| 2009/0262117 A1 | 10/2009 | Soulchin et al. | |
| 2010/0002007 A1 | 1/2010 | Rajagopalan | |
| 2010/0057358 A1* | 3/2010 | Winer et al. | 701/210 |
| 2010/0153010 A1* | 6/2010 | Huang | 701/210 |
| 2010/0185382 A1 | 7/2010 | Barker et al. | |
| 2010/0225644 A1 | 9/2010 | Swope, III et al. | |
| 2010/0250536 A1 | 9/2010 | Broadbent | |
| 2010/0312466 A1 | 12/2010 | Katzer et al. | |
| 2010/0324817 A1 | 12/2010 | Hansen et al. | |
| 2010/0328100 A1 | 12/2010 | Fujiwara et al. | |
| 2011/0106592 A1 | 5/2011 | Stehle et al. | |
| 2011/0118971 A1 | 5/2011 | Petzold et al. | |
| 2011/0131376 A1 | 6/2011 | Fischer | |
| 2011/0207446 A1 | 8/2011 | Iwuchukwu | |
| 2011/0282567 A1 | 11/2011 | Nortrup | |
| 2012/0019513 A1 | 1/2012 | Fong et al. | |
| 2012/0041674 A1* | 2/2012 | Katzer | 701/461 |
| 2012/0050489 A1 | 3/2012 | Gupta et al. | |
| 2012/0206469 A1 | 8/2012 | Hulubei et al. | |
| 2012/0253659 A1* | 10/2012 | Pu et al. | 701/420 |
| 2012/0303263 A1* | 11/2012 | Alam et al. | 701/410 |
| 2013/0021382 A1 | 1/2013 | Morlock et al. | |
| 2013/0076784 A1 | 3/2013 | Maurer | |
| 2013/0191020 A1* | 7/2013 | Emani et al. | 701/468 |

FOREIGN PATENT DOCUMENTS

| | | |
|---|---|---|
| WO | WO 2005/103624 | 11/2005 |
| WO | WO 2007/056450 | 5/2007 |

OTHER PUBLICATIONS

Poullis, Charalambos, et al., "Delineation and geometric modeling of road networks", ISPRS Journal of Photogrammetry and Remote Sensing, Month Unknown, 2010, pp. 165-181, vol. 65, Computer Graphics and Immersive Technologies Lab, Integrated Media Systems Center, University of Southern California, United States.

Author Unknown, "(SC4) Sim City for Highways & Autobahns," Aug. 12, 2011, pp. 1-35, available at http://www.skyscrapercity.com/showthread.php?t=639496&page=14.

* cited by examiner

ENCODED REPRESENTATION OF ROUTE DATA

CLAIM OF BENEFIT TO PRIOR APPLICATION

This application claims benefit to U.S. Provisional Patent Application 61/657,860, filed Jun. 10, 2012; and U.S. Provisional Patent Application 61/699,799, filed Sep. 11, 2012. U.S. Provisional Patent Applications 61/657,860 and 61/699,799 are incorporated herein by reference.

BACKGROUND

FIG. 1 conceptually illustrates a known approach of generating a navigation map with traffic information. This figure illustrates that one approach for displaying traffic data on a map is by overlaying traffic information over pre-rendered static raster images that represent different portions of the map. To illustrate this approach, this figure illustrates a generated map section 110, a traffic data object 120, and a static road tile 130.

The static road image 130 is a pre-rendered raster image of the section 110 of a map. It is a two-dimensional graphic representation of a geographical area. The road image 130 may show roads, landmarks, natural features of the geographical area (such as hills, mountains, bodies of water, vegetation, coastline), and man-made structures (such as buildings, bridges, etc.). The road image 130 may also include labels on it (such as names of streets, locations, etc.) to help specify a location.

The traffic data object 120 includes static and dynamic traffic data for the roads that are part of the static road tile 130. This information may include road conditions such as traffic congestion, detours, and traffic accidents. It also includes information that describes the layout of the roads in the static road tile 130.

The dynamic traffic data 120 is applied to the static road image 130 to generate the map section 110 that shows the traffic information along the roads that are part of the map section. The map section 110 is a portion of the map that is generated with other sections for display.

The traditional approach of overlaying the traffic data over the static road image 130 to display traffic data on a section of a map has several disadvantages. One disadvantage is that the traffic data does not always perfectly match the road layout at all zoom levels for showing the mapping at different levels of details. Another disadvantage is that the representation of traffic data often occludes the detail (e.g., names and structure of roads) that is part of the static road image. Yet another disadvantage of this approach is that the traffic data 120 is tightly coupled to the static road image 130. Every time a client device upgrades to a new version of the static road image, the traffic server has to upgrade the traffic data 120 accordingly. Furthermore, since some client devices may not upgrade to the latest version of the static road image or may not upgrade at all, the traffic server has to support multiple versions of static road images.

BRIEF SUMMARY

Some embodiments of the invention provide a mapping application that includes several novel techniques to provide traffic data. In some embodiments, the novel features of the mapping application include (1) techniques for rendering traffic data for display by the mapping application, (2) techniques for representing and highlighting traffic on routes, and (3) a data structure for expressing traffic data and associating such data with road data that is used to render roads for display by the mapping application. In some embodiments, the mapping application also employs a novel encoding scheme for expressing routes in a compressed manner.

In some embodiments, the mapping application identifies a segment of traffic congestion, correlates this traffic segment to a portion of a road in the map area that corresponds to the traffic segment, and uses that portion's definition to define a traffic congestion representation for the traffic segment. The mapping application then uses road definition portion and the traffic congestion representation to concurrently render the road and traffic representation. In some embodiments, the mapping application can provide a three-dimensional (3D) perspective view of the map. When providing such a 3D perspective view, the mapping application uses the road definition portion and the traffic congestion portion to define road and traffic congestion features in a 3D scene that it renders from the particular perspective view. In some such embodiments, the mapping application defines a virtual camera to represent the 3D perspective view. This virtual camera is moveable by the user or by other processes of the mapping application to define new perspective view of the same road portion and traffic congestion or of different road portion and traffic congestion.

To facilitate the correlation of the static road data with the dynamic traffic data, the mapping application of some embodiments uses a novel data structure scheme. In this scheme, a linking layer is defined to correlate roads that are defined in the static road data structures to traffic congestion segments that are defined in the dynamic traffic data.

For a particular view of the map, the mapping application of some of these embodiments identifies the relevant static road data structure(s), linking data structure(s), and dynamic traffic data structure(s). It then uses the linking data structure(s) to identify the corresponding road portion for each traffic congestion segment in each identified dynamic traffic data structure. The mapping application then uses the road portion corresponding to each traffic congestion segment to define traffic representation for the traffic congestion segment. The mapping application then renders concurrently the road portion and the traffic representation.

In some embodiments, the mapping application defines each traffic representation to run parallel to its corresponding road portion, while in other embodiments it defines each traffic representation to be placed over its corresponding road portion. Yet other embodiments employ both such approaches depending on the zoom level at which the map is being viewed. For instance, in some embodiments, the mapping application defines a traffic representation to run parallel to its corresponding road portion when the road portion is too narrow at a zoom level, while defining the traffic representation to lie over its corresponding road portion when the road portion is not too narrow at another zoom level.

Some embodiments of the invention provide a novel encoding scheme for expressing routes in a compressed manner. In some embodiments, a route server encodes or compresses routes by removing unnecessary control points from the routes. A control point in some embodiments is a piece of data (e.g., maneuver instruction) that specifies a road segment to which to advance from a juncture of the route. A juncture is a location in a map where two or more road segments meet. The route server provides compressed routes to route clients that decode the routes.

The route server in some embodiments generates a route from a starting point to an ending point with a control point at every juncture. The route server then determines, for every control point in the route, whether the control point is necessary. The route server removes unnecessary control points from the routes and sends the routes to the route clients.

The route clients in some embodiments include a mapping application, which generates directions for a user by decoding the compressed routes. In some cases, the map data that the route server used to generate the compressed routes is not the same map data that the mapping application uses to decode the compressed routes. The mapping application employs a novel method of rendering the routes on a map even if the map data used by the route server and the map data used by the mapping application do not match.

In some cases, the mapping application sends a compressed route to another server for further analysis (e.g., ETA to the ending location). In some embodiments, the mapping application of some embodiments reduces the compressed route to send to the other server by removing control points that have been consumed by the mapping application.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
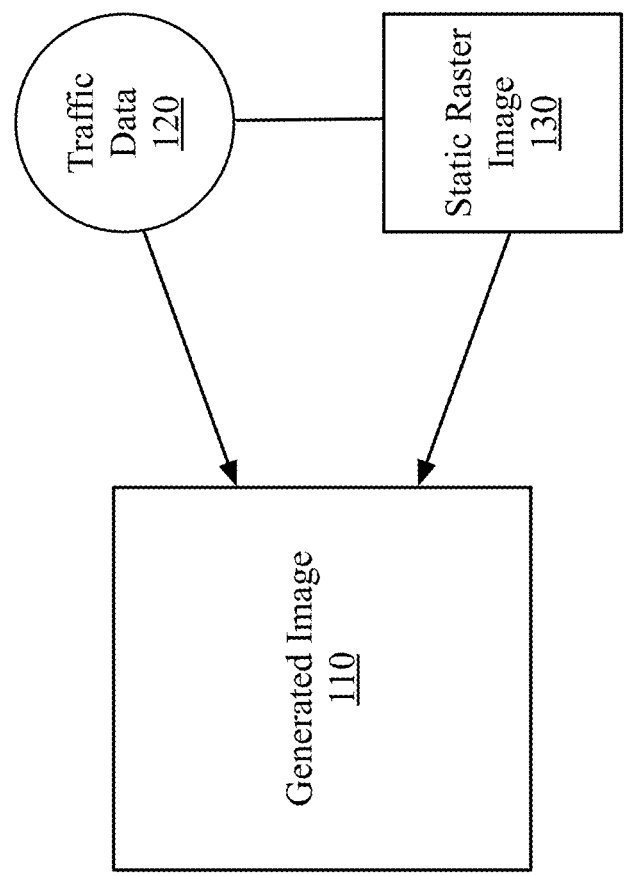
FIG. 1 conceptually illustrates a known approach of generating a navigation map with traffic information.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a mapping application that includes several novel techniques to provide traffic data. In some embodiments, the application executes on a device (e.g., a mobile device) that has a touch-sensitive screen that displays the output of the application, and a multi-touch interface that allows a user to provide touch and gestural inputs through the screen to interact with the application. In other embodiments, the application executes on a device that does not have a touch-sensitive screen.

In some embodiments, the novel features of the mapping application include (1) techniques for rendering traffic data for display by the mapping application, (2) techniques for representing and highlighting traffic on routes, and (3) a data structure for expressing traffic data and associating such data with road data that is used to render roads for display by the mapping application. In some embodiments, the mapping application also employs a novel encoding scheme for expressing routes in a compressed manner.

In several embodiments described below, these features are part of an integrated mapping application that provides several other useful operations, including location browsing, map searching, route identifying, and route navigation operations. However, in other embodiments, the mapping application does not employ all of these features. For instance, in some embodiments, the mapping application does not provide route navigation.

Section I below describes the mapping application of some embodiments of the invention and the novel ways that it represents and highlights traffic data in some embodiments. Section II then describes the novel data structure that the mapping application of some embodiments uses to express traffic data and associate this data with road data. Section II further describes the rendering of the traffic and road data to generate a display of a map with traffic data. Section III describes the encoding and decoding of routes in some embodiments of the invention. Section IV then describes electronic devices that employ the mapping application of some embodiments. Section V lastly describes location services used by some embodiments of the invention.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

I. Mapping Application
  A. In General
    1. Integrated Application with Multiple Features The integrated mapping application of some embodiments includes several useful modalities, including location browsing, map searching, route identifying and route navigating operations. This integrated application (referred to below as the mapping application, the navigation application or the integrated application) in some embodiments is defined to be executed by a device that has a touch-sensitive screen that displays the output of the application. In some embodiments, this device has a multi-touch interface for allowing a user to provide touch and gestural inputs through the screen to interact with the application. Examples of such devices are smartphones (e.g., iPhone® sold by Apple Inc., phones operating the Android® operating system, phones operating the Windows 8® operating system, etc.).

Figure 2:
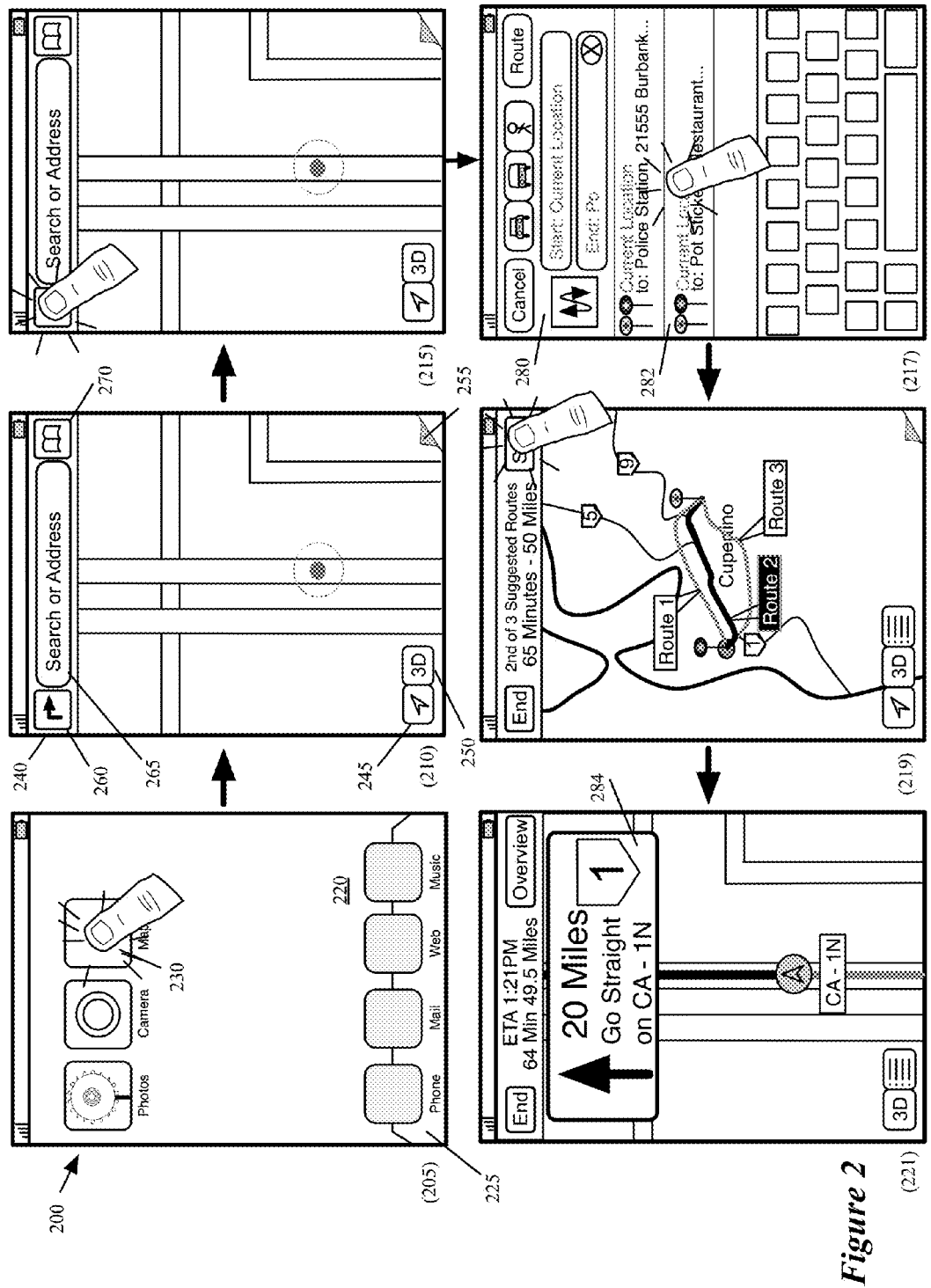
FIG. 2 illustrates an example of a device that executes an integrated mapping application of some embodiments of the invention.

FIG. 2 illustrates an example of a device 200 that executes an integrated mapping application of some embodiments of the invention. This figure also illustrates an example of launching a route navigation in this application. This application has a novel user interface (UI) design that seamlessly and cohesively integrates the controls for each of its different modalities by using a minimum number of on-screen controls that float on top of the content in order to display as much of the content as possible. Additionally, this cluster adapts to the task at hand, adjusting its contents in an animated fashion when a user moves between the different modalities (e.g., between browsing, searching, routing and navigating). This common element with an adaptive nature enables the mapping application to optimize for different tasks while maintaining a consistent look and interaction model while moving between those tasks.

FIG. 2 shows six stages 205, 210, 215, 217, 219, 221 of interaction with the mapping application. The first stage 205 shows the device's UI 220, which includes several icons of several applications in a dock area 225 and on a page of the UI. One of the icons on this page is the icon for the mapping application 230. The first stage shows a user's selection of the mapping application through touch contact with the device's screen at the location of this application on the screen.

The second stage 210 shows the device after the mapping application has opened. As shown in this stage, the mapping application's UI has a starting page that in some embodiments displays (1) a map of the current location of the device, and (2) several UI controls, arranged in a top bar 240 and as floating controls. As shown in FIG. 2, the floating controls include an indicator 245, a 3D control 250, and a page curl control 255, while the top bar 240 includes a direction control 260, a search field 265, and a bookmark control 270.

In some embodiments, a user can initiate a search by tapping in the search field 265. This directs the application to present an animation that (1) presents an on-screen keyboard and (2) opens a search table full of invaluable completions. This table has some important subtleties. When the search field is tapped and before the terms are edited, or when the search field is empty, the table contains a list of "recents," which in some embodiments are recent searches and route directions that the user has requested. This makes it very easy to quickly bring up recently accessed results.

After any input in the search field, the table is filled with search completions both from local sources (e.g., bookmarks, contacts, recent searches, recent route directions, etc.) and remote servers. The incorporation of the user's contact card into the search interface adds additional flexibility to the design. When showing recents, a route from the current location to the user's home is always offered in some embodiments, while it is offered in the contexts that are deemed to be "appropriate" in other embodiments. Also, when the search term matches at least part of an address label (e.g. 'ork' for 'Work'), the application presents the user's labeled address as a completion in the search table in some embodiments. Together these behaviors make the search UI a very powerful way to get results onto a map from a variety of sources. In addition to allowing a user to initiate a search, the presence of the text field in the primary map view in some embodiments also allows users to see the query corresponding to search results on the map and to remove those search results by clearing the query.

The bookmark control 270 (e.g., button) allows locations and routes to be bookmarked by the application. The position indicator 245 allows the current position of the device to be specifically noted on the map. When this indicator is selected once, the application maintains the current position of the device in the center of the map. In some embodiments, it can also identify the direction to which the device currently points.

The 3D control 250 is a control for viewing the map or inspecting a route in three dimensions (3D). The mapping application provides the 3D control as a quick mechanism of getting into and out of 3D. This control also serves as (1) an indicator that the current view is a 3D view, (2) an indicator that a 3D perspective is available for a given map view (e.g., a map view that is zoomed out might not have a 3D view available), (3) an indicator that a 3D perspective is not available (e.g., the 3D data is not available for the map region), and (4) an indicator that a flyover animation is available at the given zoom level. The 3D control may provide a different appearance corresponding to each indication. For instance, the 3D control may be colored grey when the 3D view is unavailable, black when the 3D view is available but the map is in the 2D view, and blue when the map is in the 3D view. In some embodiments, the 3D control changes to an image of a building when the flyover animation is available for the user's given zoom level and location on the map. Flyover animation is further described in concurrently filed U.S. Non-Provisional patent application Ser. No. 13/632,132, now published as U.S. Patent Publication 2013/0325319, entitled "Integrated Mapping and Navigation Application". This concurrently filed application Ser. No. 13/632,132, now published as U.S. Patent Publication 2013/0325319, is incorporated herein by reference.

The page curl control 255 is a control that allows the application to minimize the number of on-screen controls, by placing certain less frequently used actions in a secondary UI screen that is accessible through the page curl control that is displayed on the map. In some embodiments, the page curl is permanently displayed on at least some of the map views that the application provides. For instance, in some embodiments, the application displays the page curl permanently on the starting page (illustrated in the second stage 210) that it provides for allowing a user to browse or search for a location or to identify a route.

The direction control 260 opens a direction entry page 280 through which a user can request a route to be identified between a starting location and an ending location. The third stage 215 of FIG. 2 illustrates that the selection of the direction control 260 opens the direction entry page 280, which is shown in the fourth stage 217. The direction control is one of three mechanisms through which the mapping application can be directed to identify and display a route between two locations; the two other mechanisms are (1) a control in an information banner that is displayed for a selected item in the map, and (2) recent routes identified by the device that are displayed in the search field 265. Accordingly, the information banner control and the search field 265 are two UI tools that the application employs to make the transition between the different modalities seamless.

The fourth stage 217 shows that the direction entry page 280 includes starting and ending fields for providing starting and ending locations for a route, and a table that lists recent routes that the application has provided to the user. Other controls on this page are controls for starting a route, for reversing the order of the start and end locations, for canceling the direction request, and for picking walking, auto, or public transit routes. These controls and other aspects of the mapping application are described in U.S. Provisional Patent Application No. 61/656,080, entitled "Integrated Location Browsing, Map Searching, Route Identifying, and Route Navigating Application," and U.S. Provisional Patent Application 61/699,842, entitled "Integrated Mapping and Navigation Application." These two provisional applications are incorporated herein by reference. These controls and other aspects of the mapping application are further described in U.S. patent application Ser. No. 13/632,102, now published as U.S. Patent Publication 2013/0326407, entitled "Problem Reporting in Maps," filed concurrently with this application. This concurrently filed application Ser. No. 13/632,102, now published as U.S. Patent Publication 2013/0326407, is incorporated herein by reference.

The fourth stage illustrates the user selecting one of the recent directions that was auto-populated in the table 282. The fifth stage 219 then shows three routes on a 2D map view between the specified start and end locations specified through the page 280. It also shows the selection of the second route and some information about this route in a bar at the top of the layout. This bar is shown to include start and end buttons. The start button is shown to be selected in the fifth stage.

As shown in the sixth stage, the selection of the start button directs the application to enter a turn-by-turn navigation mode. In this example, the application has entered a 2D turn-by-turn navigation mode. In other embodiments, the application will enter by default into a 3D turn-by-turn navigation mode. In this mode, the application displays a realistic sign 284 that identifies the distance from the current location of the device to the next juncture maneuver in the navigated route and some other pertinent information. The application also displays a top bar that includes some information about the navigation, as well as End and Overview buttons, for respectively ending the navigation and obtaining an overview of the remaining portion of the navigated route or the entire portion of the navigated route in other embodiments.

The mapping application of some embodiments identifies the location of the device using the coordinates (e.g., longitudinal, altitudinal, and latitudinal coordinates) in the GPS signal that the device receives at the location of the device. Alternatively or conjunctively, the mapping application uses other methods (e.g., cell tower triangulation) to compute the current location. When the user carrying the device deviates from the route, the mapping application of some embodiments tracks the location of the device and re-calculates a new route from the deviated location in order to re-direct the user to the destination location from the deviated location. In other words, the mapping application of some embodiments operating in the navigation mode requires the device to be on a route at all times.

The application further displays the floating 3D control and the floating list control, which were described above. It should be noted that the list control was adaptively added to the floating control cluster upon entering the route inspection and route navigation modalities, while the position indicator was removed from the floating control upon entering the route navigation modality. Also, upon transition from the route inspection mode to the route navigation mode, the application performs an animation in some embodiments that involves the page curl uncurling completely before the application transitions into the navigation presentation.

In some embodiments, the animation transition includes removing the top bar, its associated controls and the floating controls from the navigation presentation, and moving the sign 284 to the top edge of the presentation a short time period after starting the navigation presentation. As further described below, the application requires the user to tap on the navigated map to bring back the top bar, its controls and the floating controls, and requires another tap to remove these controls again from the map, in some embodiments. Other embodiments provide other mechanisms for viewing and removing these controls.

2. 2D and 3D Navigation

Figure 3:
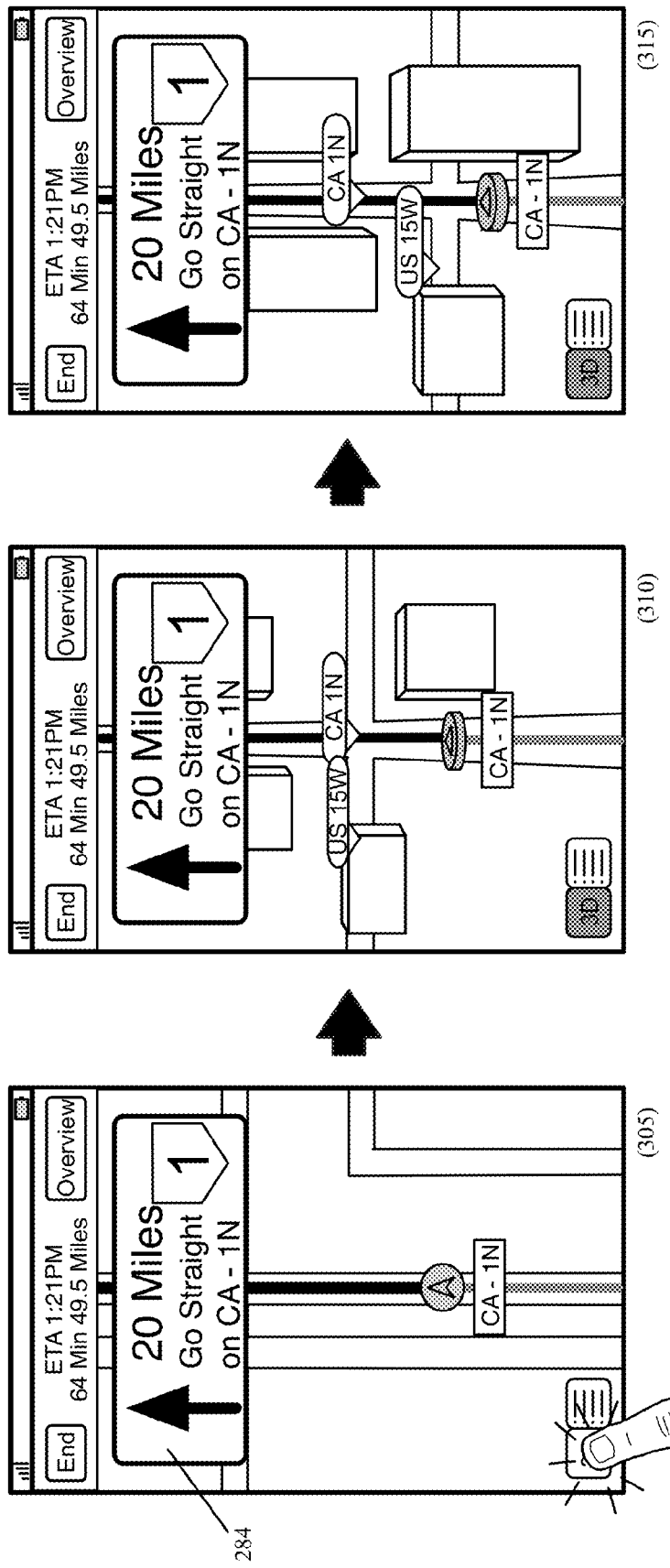
FIG. 3 illustrates how the navigation application of some embodiments provides the 3D control as a quick mechanism of entering a 3D navigating mode.

The navigation application of some embodiments can display a navigation presentation in either a 2D mode or a 3D mode. As mentioned above, one of the floating controls is the 3D control 250 that allows a user to view a navigation presentation in three dimensions (3D). FIG. 3 illustrates how the navigation application of some embodiments provides the 3D control 250 as a quick mechanism for entering a 3D navigating mode. This figure illustrates this operation in three stages 305-315. The first stage 305 illustrates the user selecting the 3D control 250 while viewing a two-dimensional navigation presentation.

The second stage 310 illustrates the navigation presentation in the midst of its transition into a 3D presentation. As shown in this figure, the 3D control appears highlighted at this stage to indicate that the navigation presentation has entered a 3D mode. As mentioned above, the navigation application generates the 3D view of the navigated map in some embodiments by rendering the map view from a particular position in the three dimensional scene that can be conceptually thought of as the position of a virtual camera that is capturing the map view. This rendering will be further described below by reference to FIG. 4.

The third stage 315 then illustrates the navigation presentation at the end of its transition into its 3D appearance. As shown by the difference between the heights of the buildings in the second and third stages, the transition from 2D to 3D navigation in some embodiments includes an animation that shows three dimensional objects in the navigated map becoming larger. Generating such animation that shows objects rising/falling and becoming larger/smaller is further described in a concurrently filed U.S. patent application Ser. No. 13/632,027, now published as U.S. Patent Publication 2014/0071119, entitled "Displaying 3D Objects in a 3D Map Presentation."

3. Virtual Camera

The mapping application of some embodiments is capable of displaying navigation maps from multiple perspectives. The application can show maps in three dimensions (3D) or in two dimensions (2D). The 3D maps are generated simulations of a virtual scene as seen by a virtual camera. When rendering a 3D navigation map, a virtual camera is a conceptualization of the position in the 3D map scene from which the device renders a 3D view of the scene. In some embodiments, the mapping application renders 3D map view (i.e., 3D map presentations) during map browsing/searching mode, route inspection mode, and/or route navigation mode.

Figure 4:
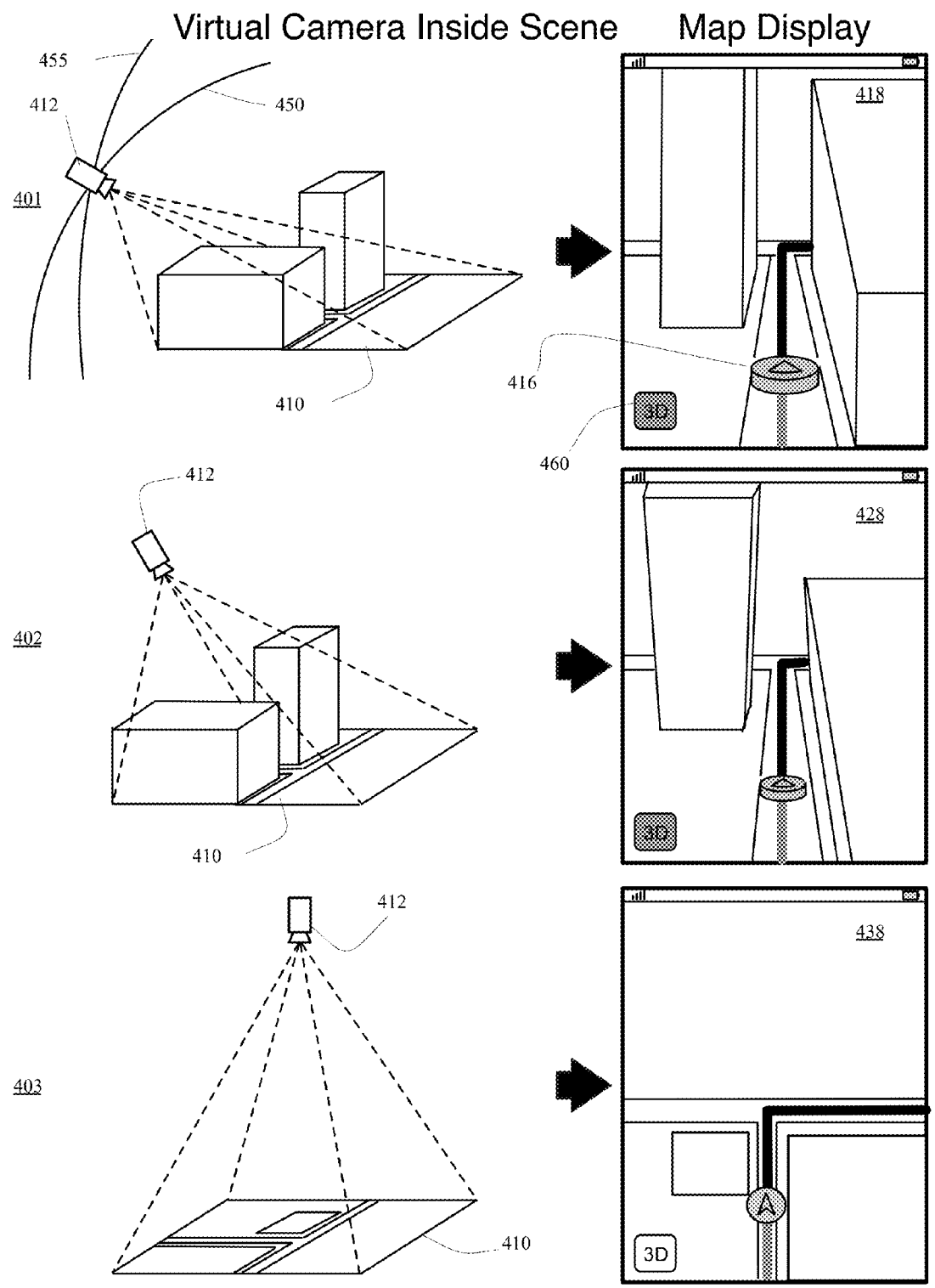
FIG. 4 presents a simplified example to illustrate the concept of a virtual camera.

FIG. 4 presents a simplified example to illustrate the concept of a virtual camera 412. In this example, the virtual camera is used to generate a 3D presentation during a route navigation mode. FIG. 4 illustrates a location in a 3D navigation map scene 410 that includes four objects, which are two buildings and two intersecting roads. To illustrate the virtual camera concept, this figure illustrates three scenarios, each of which corresponds to a different virtual camera location (i.e., a different rendering position) and a different resulting view that is displayed on the device.

The first stage 401 shows the virtual camera 412 at a first position pointing downwards at an angle (e.g., a 30 degree angle) towards the 3D scene 410. By rendering the 3D scene from the position and angle shown in stage 401 the application generates the 3D map view 418. From this position, the camera is pointing at a location that is a moving position in front of the device. The virtual camera 412 is kept behind the current location of the device. "Behind the current location" in this case means backward along the navigation application's defined path in the opposite direction from the current direction that the device is moving in.

The navigation map view 418 looks as though it was shot by a camera from above and behind the device's location indicator 416. The location and angle of the virtual camera places the location indicator 416 near the bottom of the navigation map view 418. This also results in the majority of the screen being filled with the streets and buildings ahead of the present location of the device. In contrast, in some embodiments, the location indicator 416 is in the center of the screen, with half of the screen representing things ahead of the device and the other half representing things behind the device. To simplify the figure, no road signs are depicted for the views 418, 428, and 438.

The second stage 402 shows the virtual camera 412 at a different position, pointing downwards towards the scene 410 at a larger second angle (e.g., −45°. The application renders the scene 410 from this angle, resulting in the 3D navigation map view 428. The buildings and the roads are smaller than their illustration in the first navigation map view 418. Once again the virtual camera 412 is above and behind the location indicator 416 in the scene 410. This again results in the location indicator appearing in the lower part of the 3D map view 428. The location and orientation of the camera also results again in the majority of the screen displaying things ahead of the location indicator 416 (i.e., the location of the car carrying the device), which is what someone navigating needs to know.

The third stage 403 shows the virtual camera 412 at a top-down view that looks downwards on a location in the 3D map scene 410 that was used to render the 3D views 418 and 428. The scene that is rendered from this perspective is the 2D map view 438. Unlike the 3D rendering operations of the first and second stages that in some embodiments are perspective 3D rendering operations, the rendering operation in the third stage is relatively simple as it only needs to crop a portion of the 2D map that is identified by a zoom level specified by the application or the user. Accordingly, the virtual camera characterization in this situation somewhat unnecessarily complicates the description of the operation of the application as cropping a portion of a 2D map is not a perspective rendering operation.

In some embodiments, the virtual camera can be made to move by changing the zoom level for viewing the map after the map enters a 3D mode, as further described below. In some of these embodiments, the application switches to a top-down mode (where the rendering position faces straight down) that produces 2D views when the zoom level reaches a particular zoom out level.

At the third stage 403, the mapping application in some embodiments switches from rendering a 3D scene from a particular perspective direction to cropping a 2D scene when the camera switches from the 3D perspective view to a 2D top-down view. This is because in these embodiments, the application is designed to use a simplified rendering operation that is easier and that does not generate unnecessary perspective artifacts. In other embodiments, however, the mapping application uses a perspective rendering operation to render a 3D scene from a top-down virtual camera position. In these embodiments, the 2D map view that is generated is somewhat different than the map view 438 illustrated in the third stage 403, because any object that is away from the center of the view is distorted, with the distortions being greater the further the object's distance from the center of the view.

The virtual camera 412 moves along different trajectories in different embodiments. Two such trajectories 450 and 455 are illustrated in FIG. 4. In both these trajectories, the camera moves in an arc and rotates downward as the camera moves upward along the arc. The trajectory 455 differs from the trajectory 450 in that in the trajectory 455 the camera moves backward from the current location as it moves up the arc.

While moving along one of the arcs, the camera rotates to maintain a point ahead of the location indicator at the focal point of the camera. In some embodiments, the user can turn off the three dimensional view and go with a purely two dimensional view. For example, the application of some embodiments allows a three dimensional mode to be turned on and off by use of a 3D button 460. The 3D button 460 is essential to the turn-by-turn navigation feature, where it has a role as an indicator and a toggle. When 3D is turned off, the camera will maintain a 2D navigation experience, but when 3D is turned on, there may still be some top-down perspectives when 3D viewing angles are not appropriate (e.g., when going around a corner that would be obstructed in 3D mode).

Although FIG. 4 illustrates the use of the virtual camera to render a 3D navigation presentation, one of ordinary skill will realize that the virtual camera can also be used to render a 3D presentation of a 3D scene during map browsing/searching mode or route inspection mode. In these modes, the position of the device may be indicated in some cases, but the 3D scene typically does not include lines trailing and leading this position to indicate the direction of the device's past movement and expected future movement. The scene instead will include objects in the 3D map scene that should be rendered to provide a 3D map presentation for map browsing, map searching, and/or route inspection.

B. Representing Traffic

Figure 5:
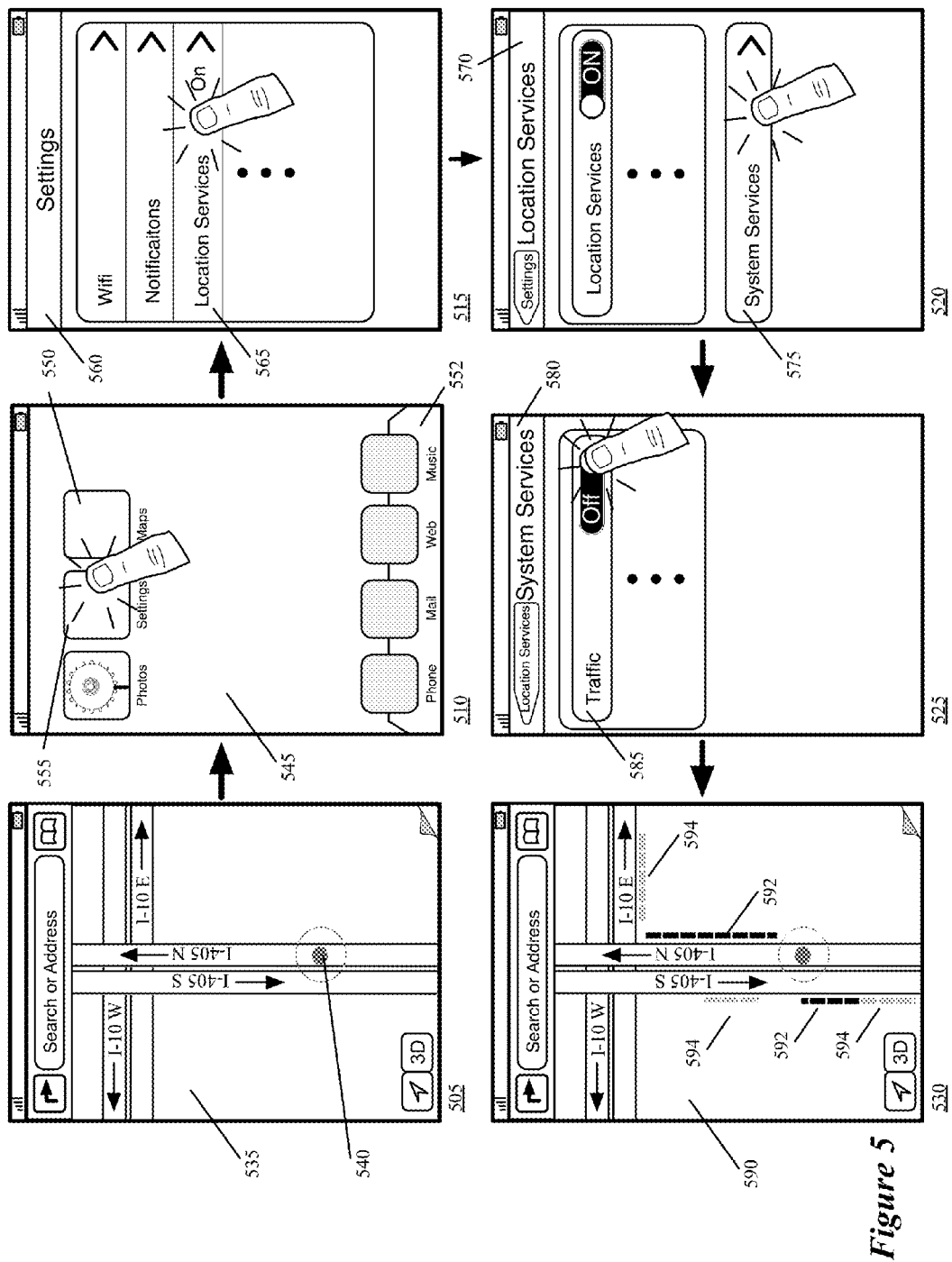
FIG. 5 illustrates how some embodiments turn on the traffic services and display traffic data on a map view of the integrated mapping application of some embodiments of the invention.

As mentioned above, the mapping application employs several novel techniques for representing and highlighting traffic on routes. FIG. 5-FIG. 9B illustrate some of these novel techniques. FIG. 5 illustrates how some embodiments turn on the traffic services and display traffic data on a map view of the integrated mapping application of some embodiments of the invention. This figure shows six stages 505, 510, 515, 520, 525, 530 of interaction with the mapping application. The first stage 505 shows a map view 535 of the mapping application that shows a current location 540 of the device.

The second stage 510 shows the device after the map view of the mapping application has been replaced by a view 545 presented by the operating system of the device. In some embodiments, the user can change to the OS view 545 from the map view 535 by pressing one of the buttons (not shown) of the device. In the OS view 545, the device displays several icons of several applications in a dock area 552 and on a page of the UI. One of the icons on this page is an icon 550 for the mapping application. Another icon is an icon 555 for reviewing and editing the settings of the device. The second stage 510 shows the user's selection of the icon 555 by touching the location that this icon is displayed on the touch-sensitive screen of the device.

The third stage 515 shows the device after the settings page 560 has been opened in response to the user's selection of the settings icon 555. It also shows the user's selection of the location services option 565 on this page. In response to this selection, the device opens a location services page 570, as shown in the fourth stage 520. In the fourth stage, several location services are listed for several applications and for the operating system. Also listed is a system services option 575, which is selected in the fourth stage.

The fifth stage 525 then shows the opening of a system services page 580, which lists one or more system services, including a traffic service 585. This stage shows the selection of this service to turn on traffic reporting, which now allows one or more traffic harvesting services (that are communicatively coupled to the device directly or indirectly through other servers) to collect data from the device to identify traffic congestion in the localities traversed by the device. U.S. patent application Ser. No. 13/610,807, entitled "Harvesting Traffic Information from Mobile Device," describes the harvesting of such data in more detail, and is incorporated herein by reference. In some embodiments, the servers that gather the traffic data from the mobile devices that have turned on traffic reporting, also collect traffic data from one or more other sources that provide traffic data. As further described below, these servers then generate traffic tiles, distribute these tiles to the mobile devices (directly or indirectly through other servers), periodically and dynamically update these tiles, and re-distribute these tiles to the mobile devices.

The sixth stage 530 shows the device after it has returned to a map view 590 of the mapping application. In some embodiments, the device returns to this view when the user exits the system services page 580 by pressing a button (not shown) of the device, and then selecting the map icon 550 on the page 545 of the UI.

The map view 590 that is shown in the sixth stage illustrates traffic about two intersecting highways. The map view 590 uses a particular scheme for displaying traffic data. This scheme uses (1) dashed lines of a first color 592 (e.g., red) to represent heavy traffic congestion, (2) dashed lines of a second color 594 (e.g., orange) to represent moderate traffic congestion, and (3) no lines or other indicators to represent the lack of traffic along a road. Also, in this scheme, the dashed lines that represent heavy or moderate traffic congestion are illustrated next to the portions of the roads that have such congestion. For instance, in map view 590, one portion along north bound I-5 has heavy congestion as indicated by dashed lines 592, while one portion on east bound I-10 has moderate congestion as indicated by dashed lines 594.

Figure 6:
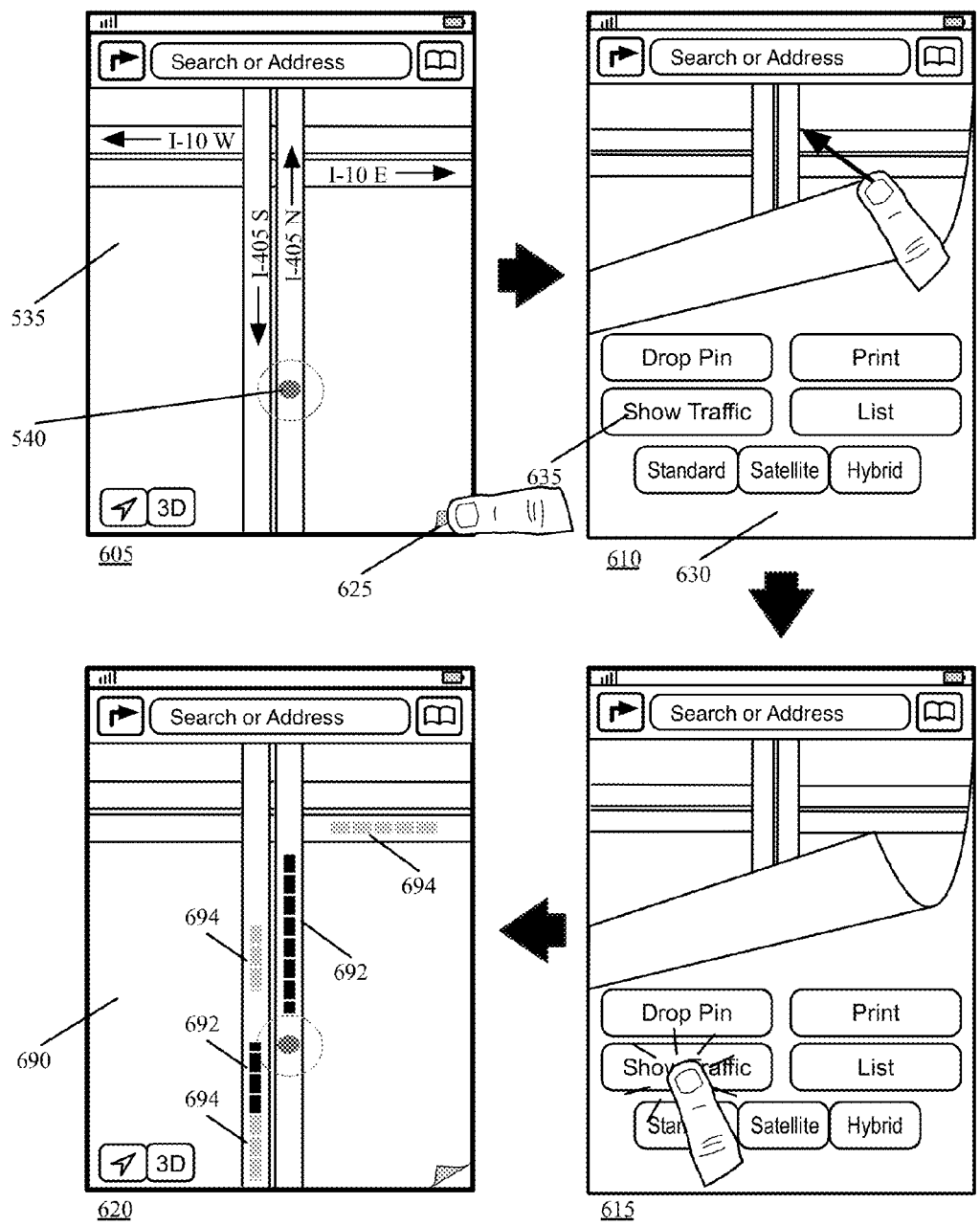
FIG. 6 illustrates another way that some embodiments use to turn on the traffic services and display traffic data on a map view of the integrated mapping application of some embodiments of the invention.

FIG. 6 illustrates another way that some embodiments use to turn on the traffic services and display traffic data on a map view of the integrated mapping application of some embodiments of the invention. Under this approach, traffic data is not necessarily shown when the traffic services are enabled through system services, but rather need to be actively requested through selection of a traffic button in the map view. This figure shows four stages 605, 610, 615, and 620 of interaction with the mapping application. The first stage 605 shows a map view 535 of the mapping application that shows a current location 540 of the device. This stage also shows the selection of the page curl icon 625.

The second stage 610 shows the user's dragging of the page curl icon 625 to expose the secondary UI screen 630. In some embodiments, the touch selection of the page curl icon 625 peels back the map view 535 to expose the screen 630; no drag operation is needed in these embodiments to peel back the page curl.

As shown in the second stage 610, the secondary UI screen 630 includes a show traffic button 635. The third stage 615 shows the selection of this button 635. The fourth stage 620 shows a map view 690 that is similar to the map view 590 of FIG. 5, except that in the map view 690 the dashed traffic lines are shown in the middle of the highways not adjacent to them. Specifically, the map view 690 uses the same color and patterning scheme as the map view 590 as it uses (1) dashed lines of a first color 692 (e.g., red) to represent heavy traffic congestion, (2) dashed lines of a second color 694 (e.g., orange) to represent moderate traffic congestion, and (3) no lines or other indicators to represent the lack of traffic along a road. Also, in this scheme, the dashed lines that represent heavy or moderate traffic congestion overlay the portions of the roads that have such congestion. For instance, in map view 690, one portion along north bound I-5 has heavy congestion as indicated by dashed lines 692 that overlay this direction, while one portion on east bound I-10 has moderate congestion as indicated by overlaid dashed lines 694. As further described below by reference to FIG. 8B, the mapping application of some embodiments for certain zoom levels of the map draws the traffic patterns over the roads, while for other zoom levels draws the traffic patterns adjacent to the roads. This is because the mapping application of some embodiments draws the traffic patterns over the roads when the roads are sufficiently large (after a particular zoom level) so as not to be occluded by the traffic patterns.

It should be noted that in some embodiments, the mapping application can show the traffic data in the map view 690 only if the traffic service 585 was previously enabled before the traffic button 635 was selected. In other words, some embodiments show traffic data only when the device has its traffic service 585 turned on and the user has requested the showing of traffic data through the show traffic button 635. In other embodiments, however, the device does not require any separate enablement of the traffic service, and instead simply shows the traffic data upon the selection of the traffic button 635. Also, in some embodiments, the traffic service 585 is turned on by default in order to report traffic data when the user first starts to use the device or when the device is turned on (i.e., each time the device goes through a power-on, boot-up cycle). In these embodiments, the traffic service 585 would have to be turned off to opt out the device from reporting the traffic data.

Figure 7:
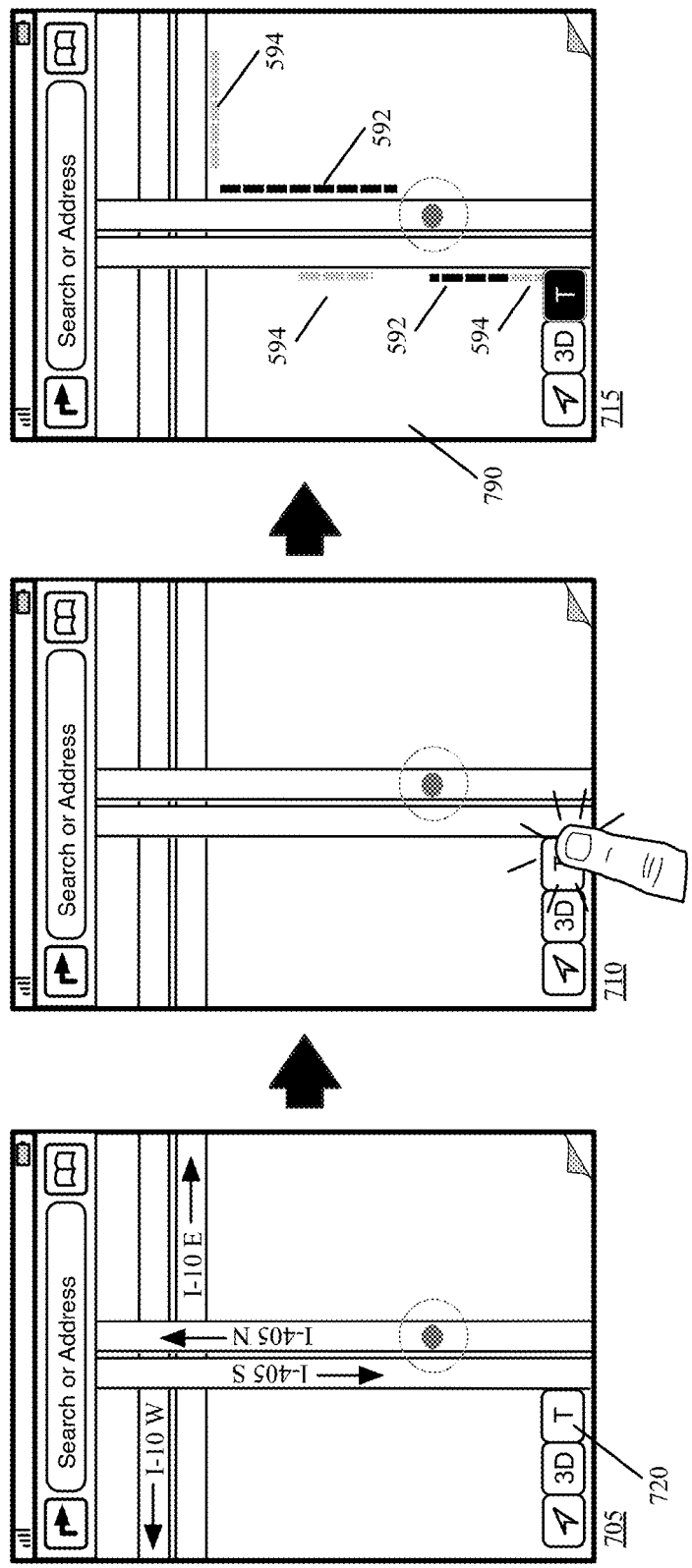
FIG. 7 illustrates yet another way that some embodiments use to turn on the traffic services.

FIG. 7 illustrates yet another way that some embodiments use to turn on the traffic services. Under this approach, traffic data again is not necessarily shown when the traffic services are enabled through system services, but rather need to be actively requested through selection of a traffic button in the map view. In this example, the traffic button that is used to request the traffic data is a floating button 720 that is illustrated in a first stage 705 of FIG. 7.

The second stage 710 of this figure shows the selection of this button. The third stage then shows this button as being selected (through the highlighting of this button) and shows the map view 790, which is identical to the map view 590 that was described above by reference to the sixth stage 530 of FIG. 5. Again, in some embodiments, the mapping application can show the traffic data in the map view 790 of FIG. 7 only if the traffic service 585 was previously enabled before the traffic button 720 was selected. In other embodiments, however, the device does not require any separate enablement of the traffic service, and instead simply shows the traffic data upon the selection of the traffic button 720.

The traffic data that is shown is highly useful in allowing a user to identify a route to avoid traffic. In some embodiments, a user can identify such a route in one of several ways. Two such ways are through the browsing of the map view that illustrates the traffic data, and the inspection of alternative routes that are displayed on the map view.

Figure 8A:
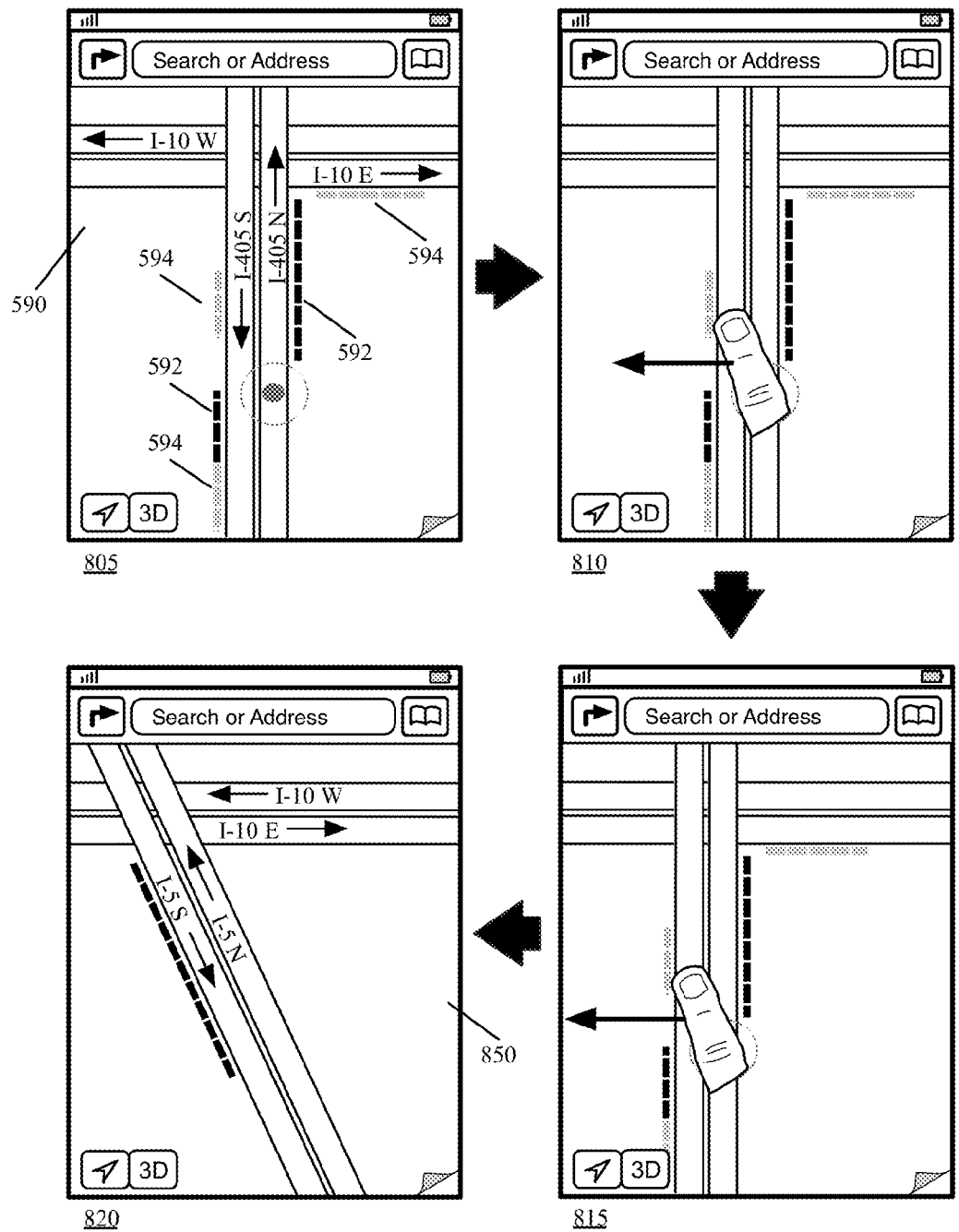
FIG. 8A illustrates an example of the user browsing an area about the map view.

FIG. 8A illustrates an example of the user browsing an area about the map view 590 that was described by reference to FIG. 5. This browsing is illustrated in terms of four stages of operation 805-820. The first stage 805 shows the map view 590 after traffic data has been presented for this view. In this view, the I405N is shown to have traffic in the north bound direction at its intersection with the I10 freeway. The second stage 810 and the third stage 815 show the user browsing about this view by performing a swipe operation through a single finger drag operation. The fourth stage 820 illustrates another portion 850 of the map that shows the northbound I5 freeway not having any congestion. Hence, the user may choose to travel along the I5 freeway to avoid the congestion around the I405 freeway.

Figure 8B:
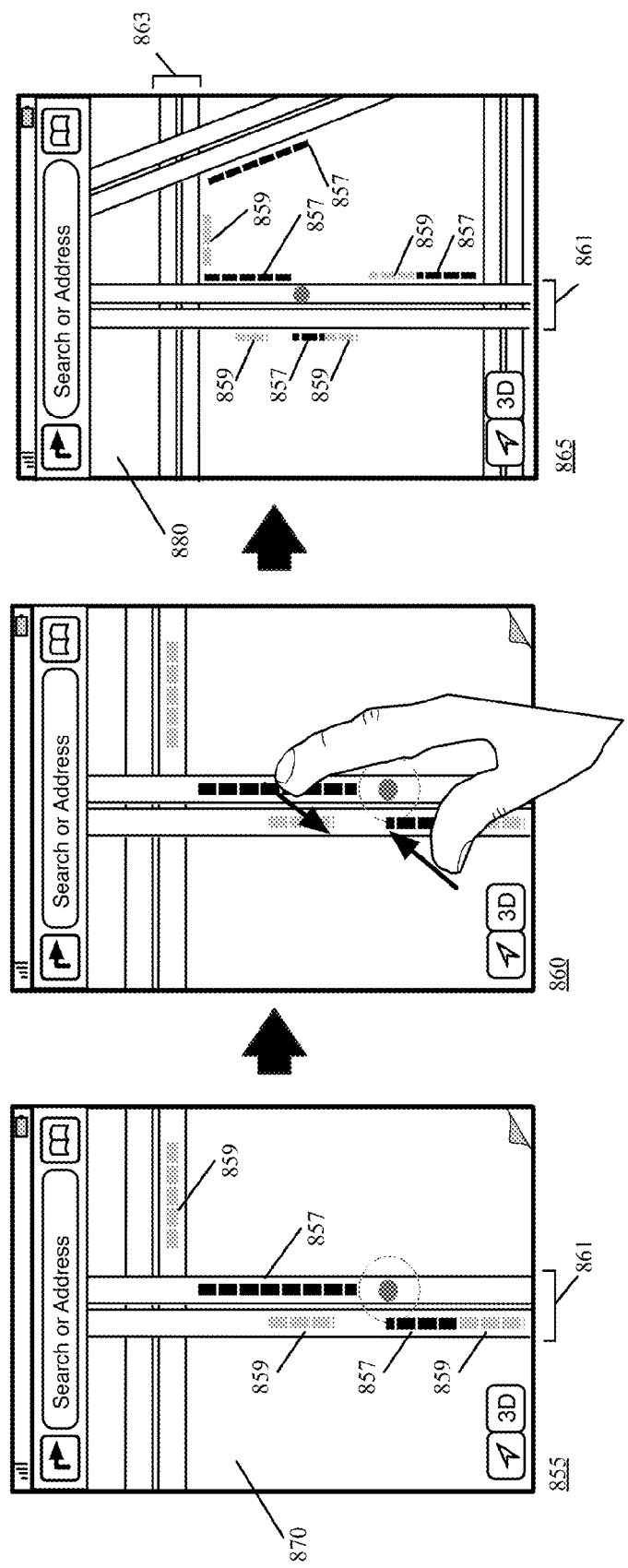
FIG. 8B illustrates another example of the user browsing a mapping to view traffic data.

FIG. 8B illustrates another example of the user browsing a mapping to view traffic data. In this example, the user changes zoom levels to view map data about a certain location. The user can do this in order to get a better sense of the traffic around a particular location. This browsing is illustrated in three stages. The first stage 855 shows a first view 870 of a map at a first zoom level. In this view, two different traffic congestion patterns 857 and 859 are shown for heavy to moderate traffic on a particular road 861. At this zoom level, the mapping application has overlaid the traffic patterns on top of the road 861, as for instance it might have determined that the roads are sufficiently large (e.g., sufficiently wide) for the application to overlay the traffic patterns over the roads without occluding the roads.

In the second stage 860, the user performs a zoom out operation to zoom out of the current map view. In some embodiments, zooming out changes the zoom level from a higher value to a lower value, but other embodiments may specify the zoom level by using the opposite designation (i.e., by having the high zoom levels correspond to further views of the map). Also, in this example, the zoom out operation is performed through a multi-touch pinch operation, although it can be done through other operations in other embodiments.

After the zoom out operation of the second stage 860, the third stage 865 shows a second view 880 of the map at a second zoom level. In this view, again two different traffic congestion patterns 857 and 859 are shown for heavy to moderate traffic on the particular road 861 and a nearby road 863. At this zoom level, the mapping application has drawn the traffic patterns adjacent to roads 861 and 863, as for instance it might have determined that the roads are too small (e.g., too narrow) for the application to overlay the traffic patterns over the roads without occluding the roads.

Figure 9A:
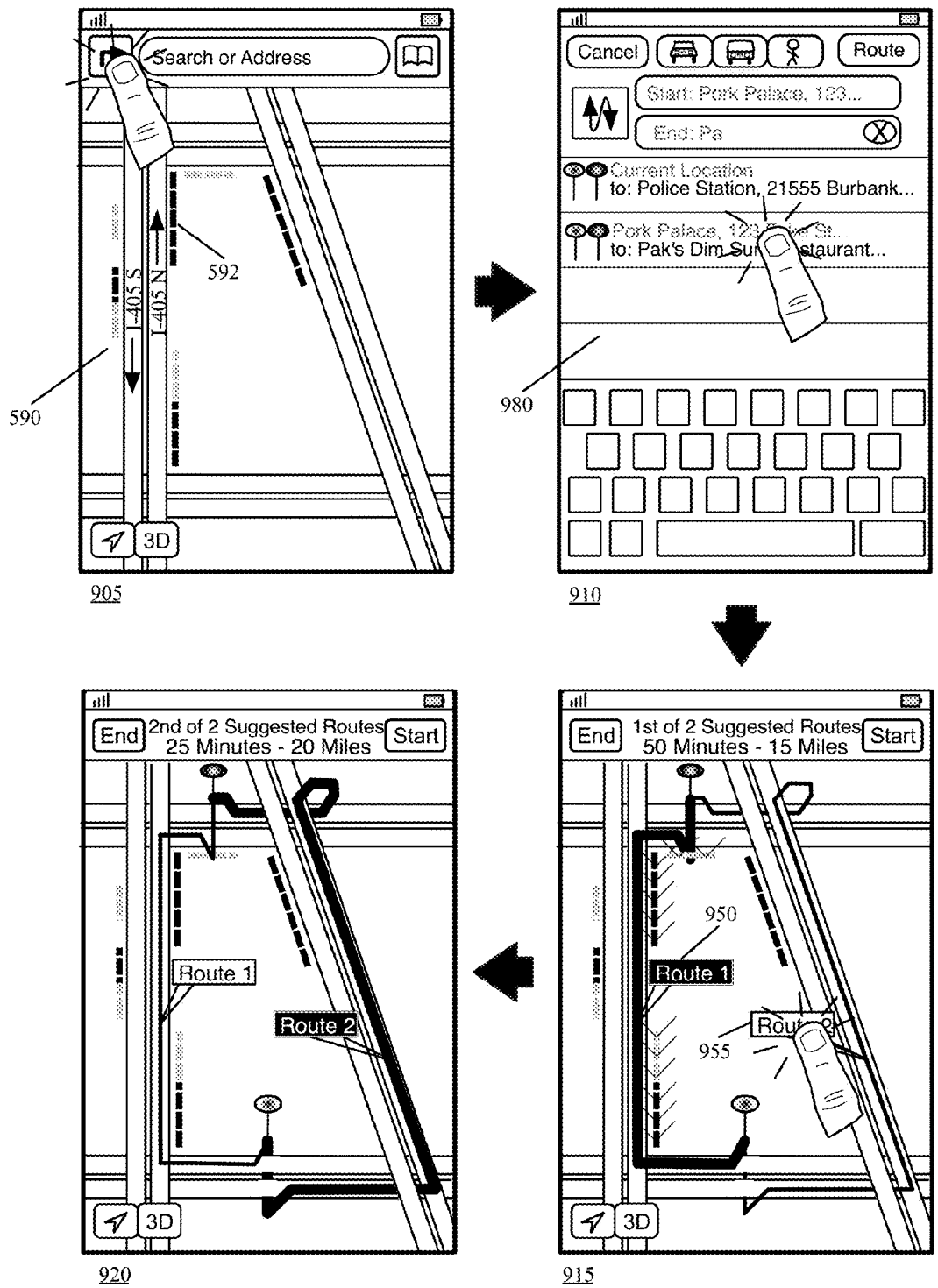
FIG. 9A illustrates an example of the user inspecting alternative routes that are displayed on the map view to identify the least congested route.

FIG. 9A illustrates an example of the user inspecting alternative routes that are displayed on the map view to identify the least congested route. This figure illustrates this example in terms of four stages 905-920. The first stage 905 illustrates the map view 590 that is displayed in the sixth stage 530 of FIG. 5. This stage shows the congestion along various portions of two freeways, with one of the portions that has heavy traffic being a portion of the I405N freeway. This stage also shows the user selection of the direction control 260.

The second stage 910 illustrates the direction entry page 980 after the user has entered the starting address and partially completed the ending field. This page also shows the selection of a recent direction that was auto-populated in the table 282 after the partial data provided by the user in the ending field.

The third stage 915 then shows two routes 950 and 955 that are presented to the user. Both routes 950 and 955 are highlighted but the first route appears with a brighter and/or more saturated color. The first route traverses along a congested portion of the I405N. This route is default selected as indicated by the highlighting of this route's name in the third stage. The third stage also shows that the traffic indicating first color pattern 592 appears brighter and/or more saturated in this stage than it did in the first stage 905. In some embodiments, the mapping application brightens and/or saturates the color, changes the color, or otherwise changes the appearance of the traffic indicating patterns when they are (1) under the identified path of a displayed route, (2) are near such an identified path, or (3) are near such an identified path and are for the same direction as the identified path. The scheme illustrated in FIG. 9A brightens and/or saturates the color of traffic indicating patterns that are under the identified path of a displayed route (e.g., because of the zoom level) or are near such an identified path and are for the same direction of traffic as the identified path. This scheme does not change the appearance of the traffic indicating patterns that are near the identified path but are not for the same direction of traffic as the identified path. Hence, in this example, the patterned traffic lines along the south bound direction of 1405 are not brightened or otherwise modified in the third stage 915.

The third stage also illustrates the user's selection of the second route by touching the banner that lists this route's name. The fourth stage 920 then shows the highlighting of the second route 955. This stage still highlights the first route 950 but it does so with a less bright and/or less saturated color than is used for highlighting the second route 955. Once the first route is de-emphasized and the second route is emphasized, the patterned traffic lines 592 return to their appearance in the first stage 905 as they are no longer along a portion of a selected route. As shown in the fourth stage, the second route 955 does not have congestion in the northbound direction. Hence, the user can select this route to avoid congestion between the start and end locations.

Figure 9B:
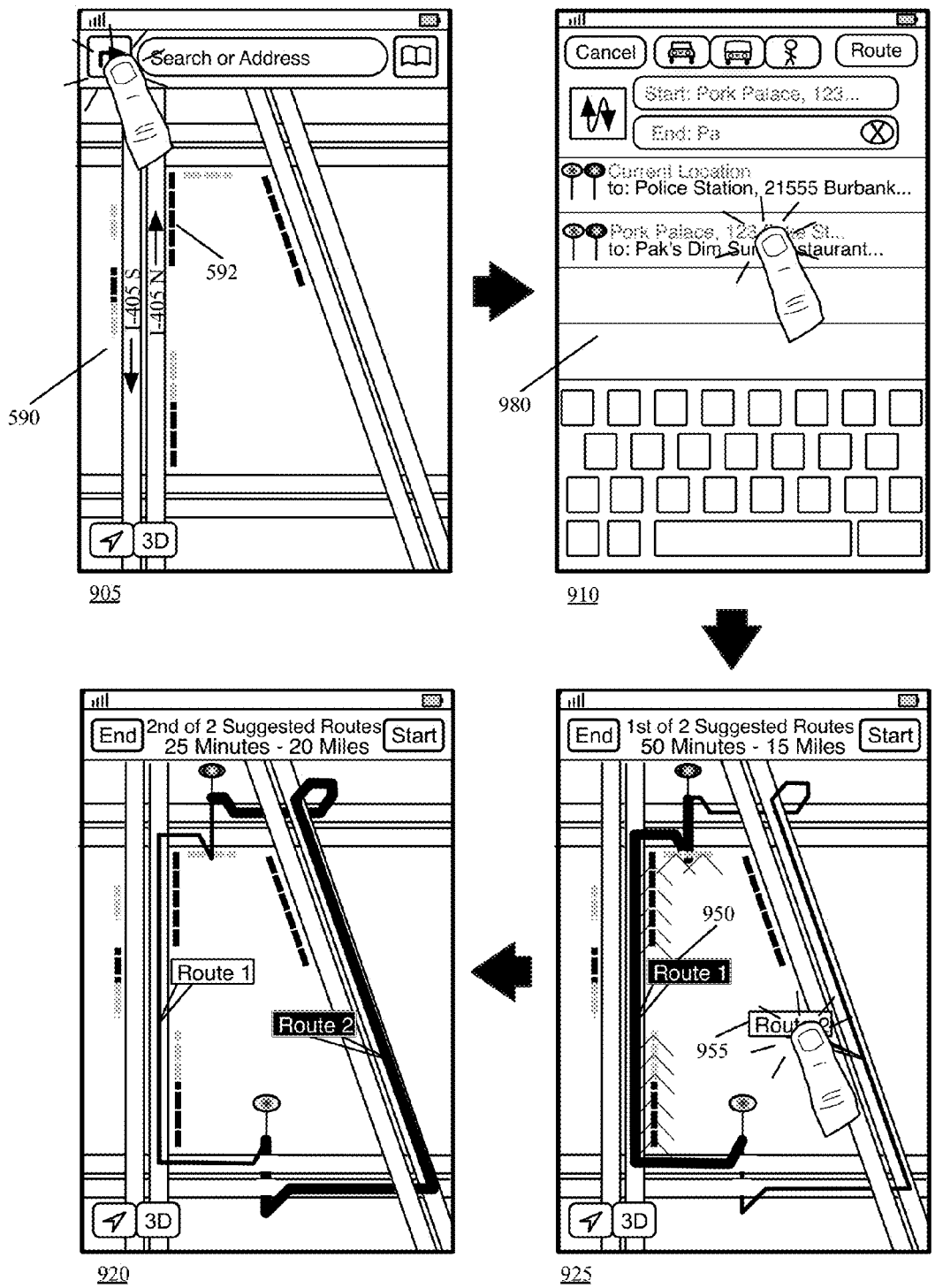
FIG. 9B pictorially shows the darkening and/or de-saturation of the traffic patterns in terms of line markers.

As mentioned above, the mapping application changes the appearance of the traffic indicating patterns when they are (1) under the identified path of a displayed route, (2) are near such an identified path, or (3) are near such an identified path and are for the same direction as the identified path. In the example illustrated in FIG. 9A, the mapping application brightens and/or saturates the color appearance of the traffic patterns underneath the displayed route or near the displayed route in the same direction as this route. However, other embodiments may change the appearance of the traffic patterns differently. For instance, some embodiments might darken and/or reduce the saturation of the traffic patterns underneath the displayed route or near the displayed route in the same direction as this route, as illustrated in FIG. 9B. FIG. 9A pictorially shows the brightening and/or saturation of the traffic patterns in terms of line markers in the 45 and 135 degree directions in the third stage 915, while FIG. 9B pictorially shows the darkening and/or de-saturation of the traffic patterns in terms of line markers in the −45 and −135 degree directions in the third stage 925.

C. Representing Other Traffic Conditions

Figure 10A:
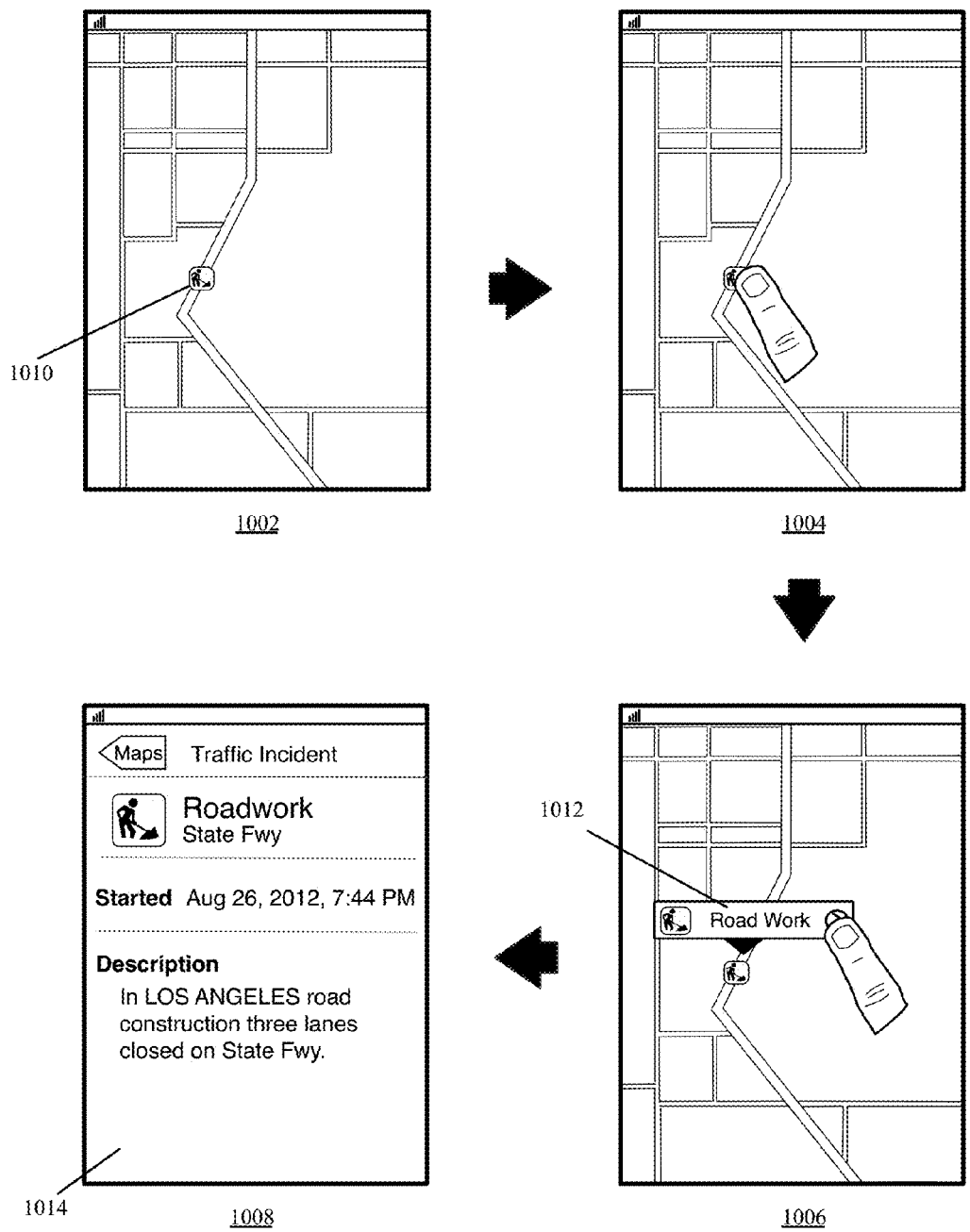
FIG. 10A illustrates an example of displaying traffic condition.

The mapping application of some embodiments provides other traffic and road information when its traffic reporting feature has been turned on. FIG. 10A illustrates an example of one such other information. This figure illustrates in four stages 1002-1008 how the mapping application reports roadwork along a road. As shown in the first stage, the application in some embodiments specifies roadwork at a particular location in the world by providing at the corresponding location on the map view an icon that has a picture of a working man.

This icon 1010 is a selectable item in the UI. The second stage shows a user selecting the icon by touching the location on the screen that displays the icon. The third stage 1006 then shows that the selection of the icon results in a banner 1012, which has a label for the icon (here reading "Road Work"), a picture for the icon (here again showing a working man) and an arrow to the right to indicate additional information. Other embodiments will use other representations for the label, picture and info components of the banner.

The third stage 1006 shows the selection of the banner's arrow. The fourth stage 1008 shows that this selection results in a new displayed window that provides additional information regarding the roadwork. In this case, the additional information provides the start date for the roadwork and some other description for this roadwork.

Figure 10B:
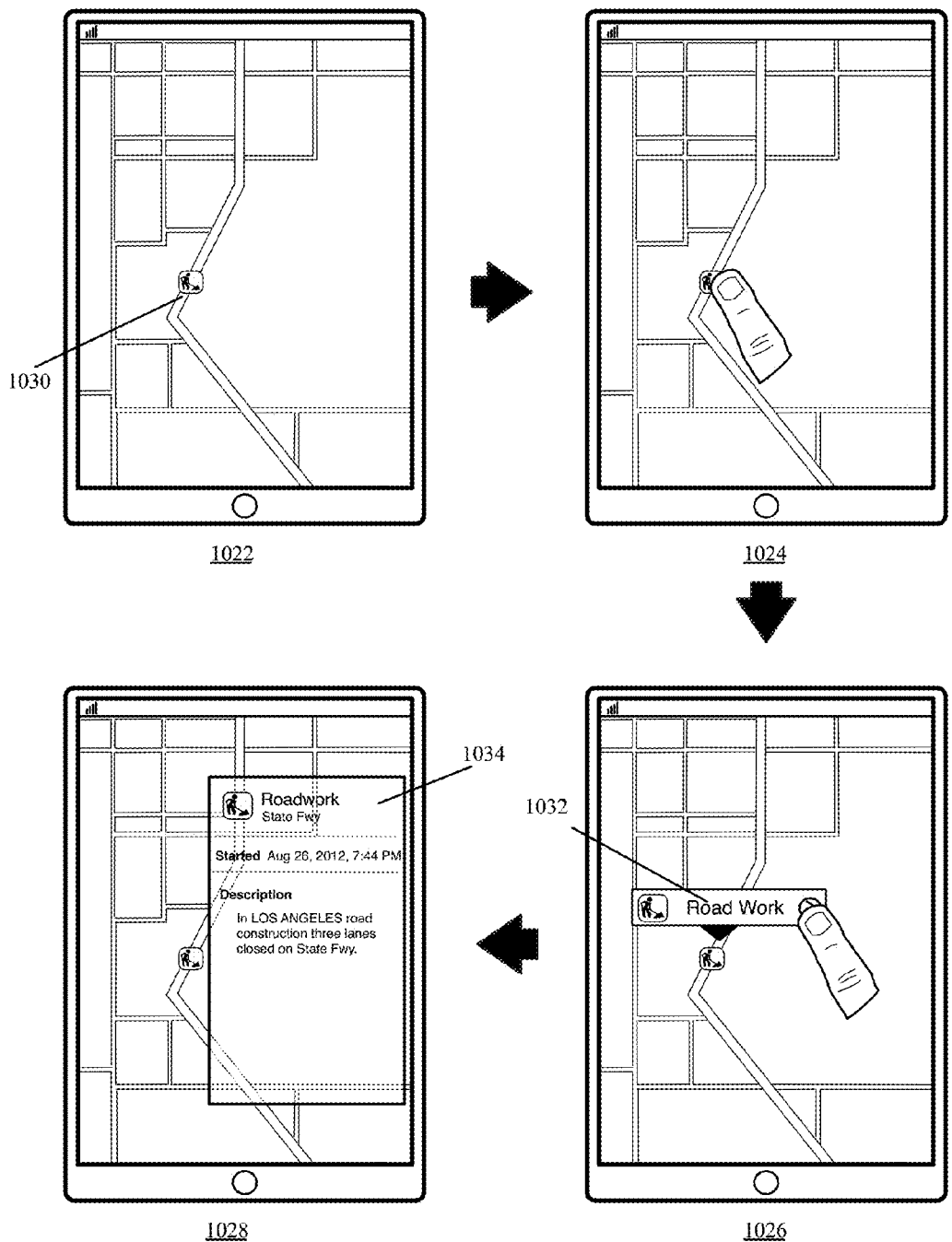
FIG. 10B illustrates a device with a larger screen showing traffic condition.

In some embodiments, the mapping application provides a new window display to provide the additional information in the fourth stage 1008 when the device's screen is too small to display all the information regarding the roadwork in a popover window. However, when the device's screen is large enough or has sufficient resolution to accommodate a popover window that can be displayed over the window displaying the map view and that can provide sufficient information, the mapping application in some embodiments provides this popover window. FIG. 10B illustrates one such popover window. This figure illustrates the same example as illustrated in FIG. 10A, except in FIG. 10B the device has a larger screen than the device illustrated in FIG. 10A. As the screen is larger, the fourth stage 1028 in FIG. 10B shows the opening of a popover window 1034 to provide the additional information about the road work after the user selects the info arrow in the banner 1032 in the third stage 1026.

Figure 10C:
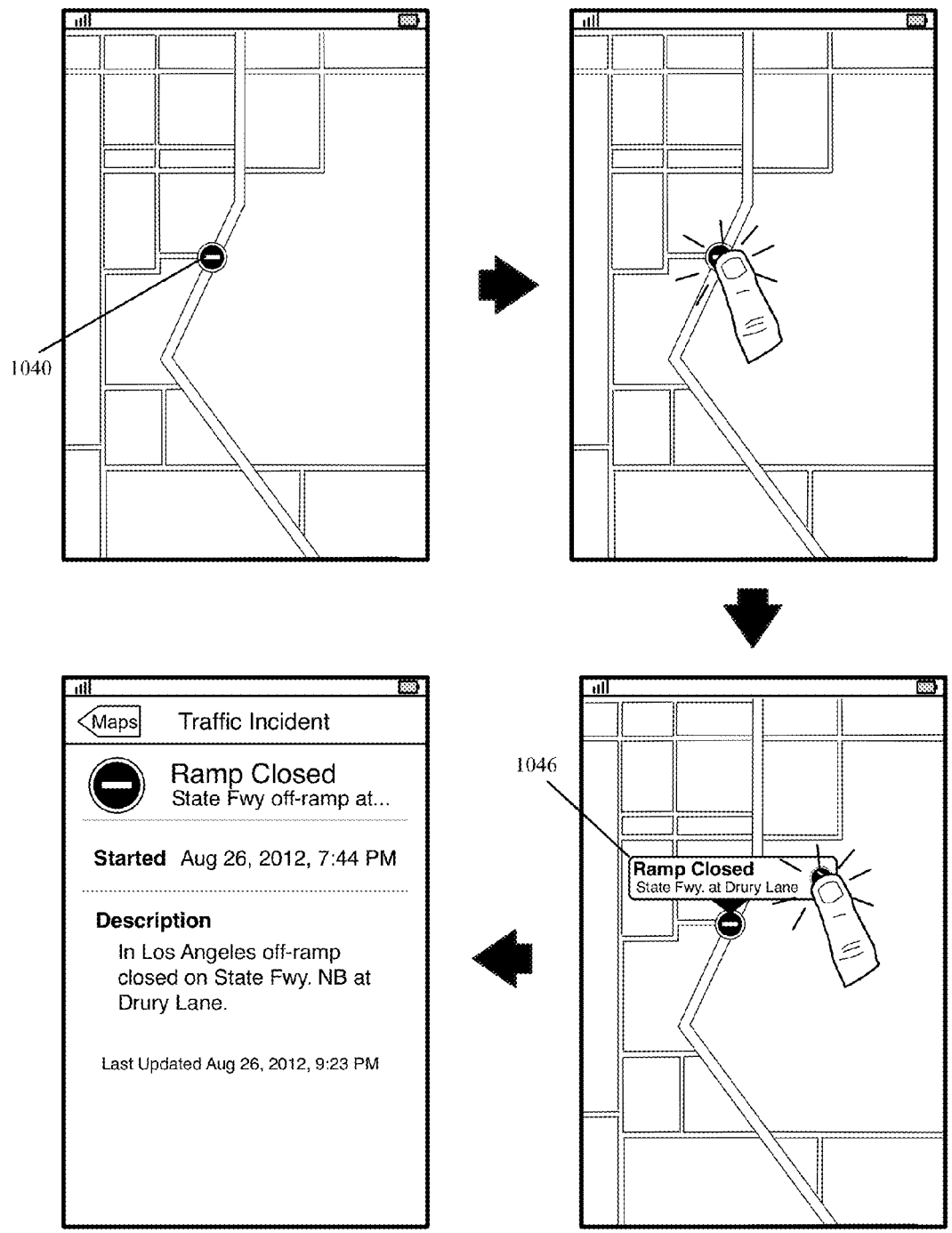
FIG. 10C-10E respectively illustrates how the mapping application of some embodiments shows ramp closings, hazardous conditions and accidents along a map.
Figure 10D:
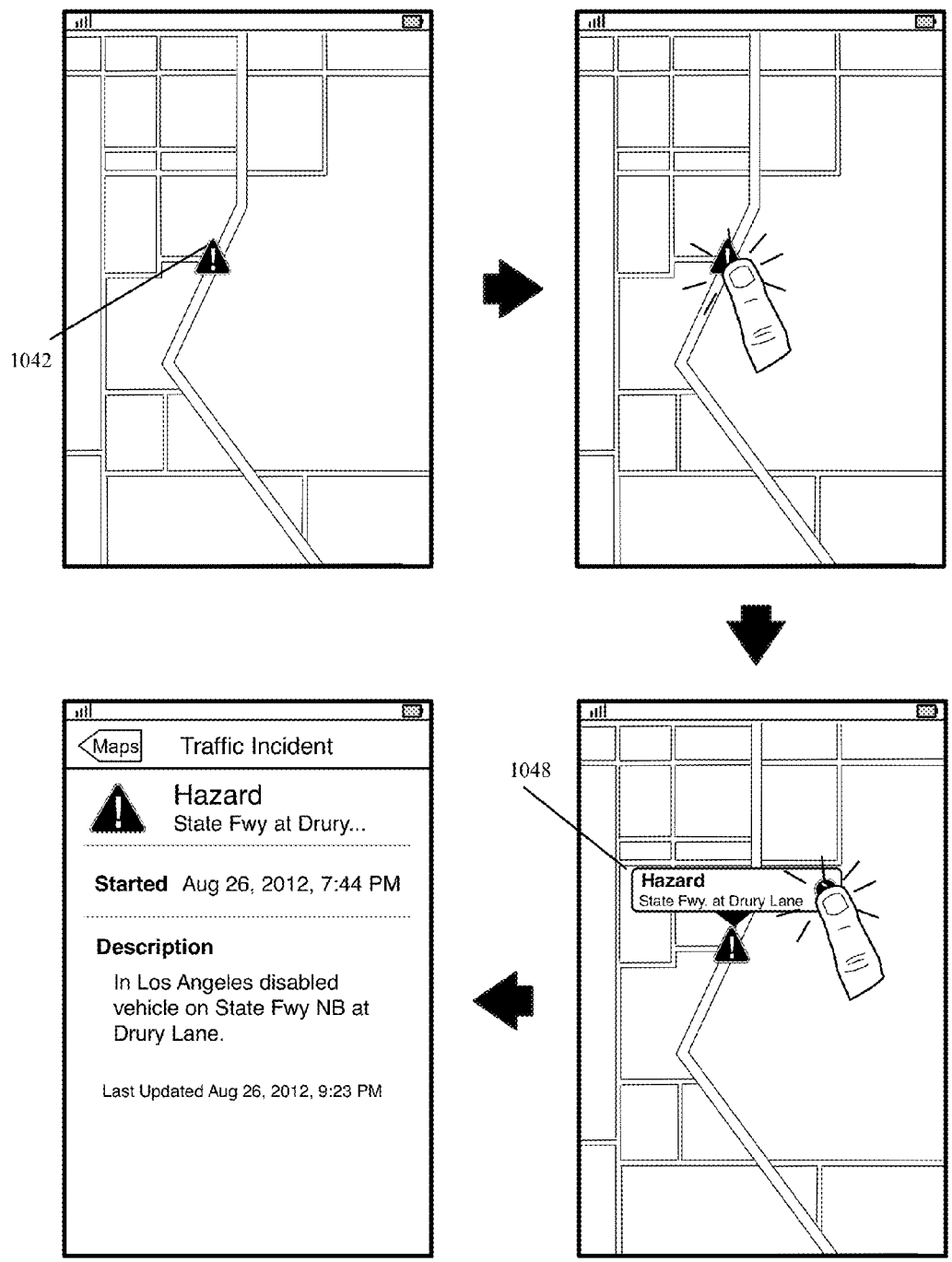
Figure 10E:
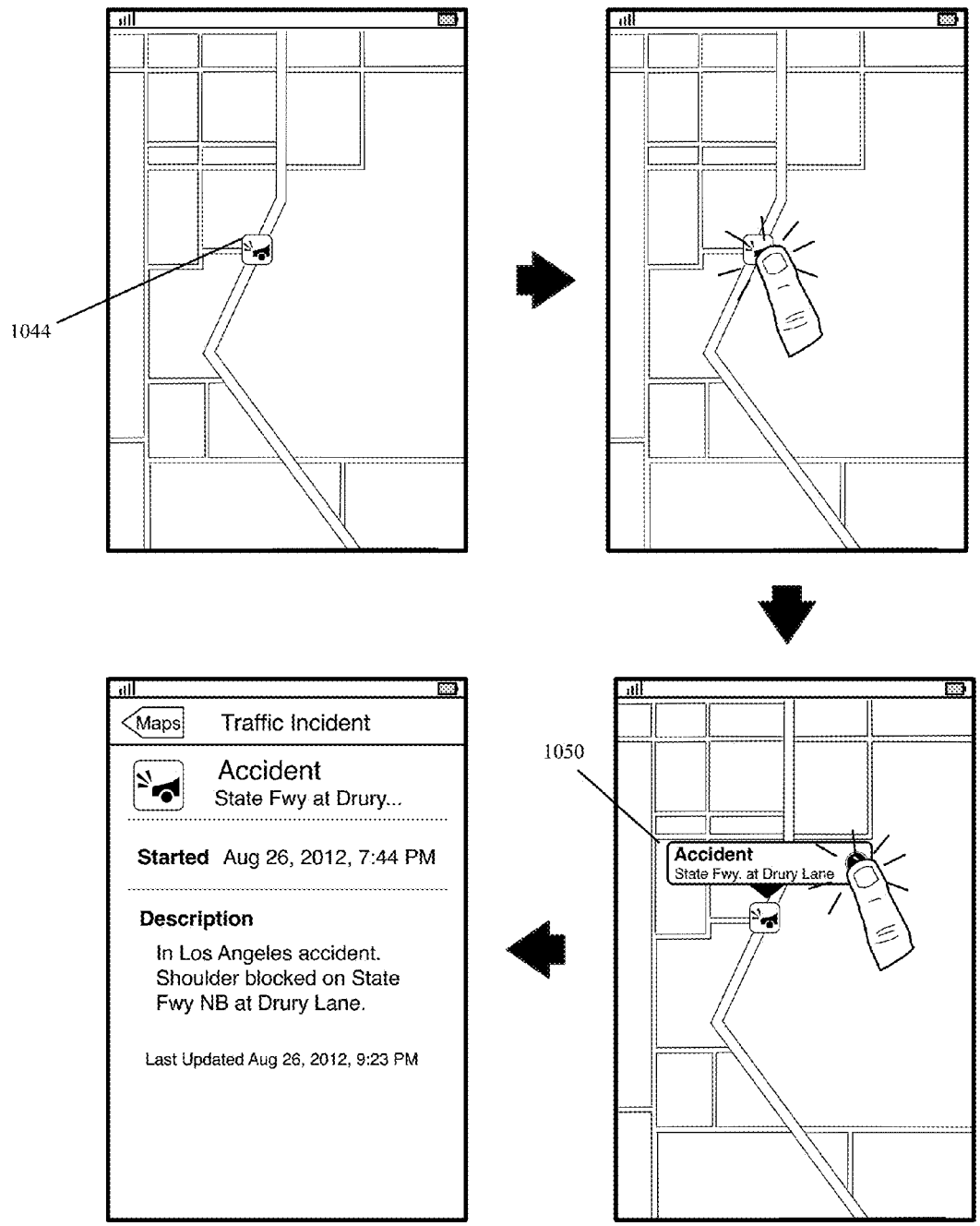

The mapping application of some embodiments similarly provides traffic information for other types of traffic or road conditions. FIGS. 10C-10E present examples of other traffic or road conditions that are handled in a similar fashion to the roadwork example illustrated in FIG. 10A. FIGS. 10C-10E respectively illustrates how the mapping application of some embodiments shows ramp closings, hazardous conditions and accidents along a map. These figures show that this application illustrates these three types of conditions in terms of three different icons 1040, 1042, and 1044. In four stages, each of these figures shows that selection of an icon opens a banner 1046, 1048, or 1050 that provides some information about each condition. In these stages, these figures also show that the selection of the arrow on each banner opens another window that provides additional information about the ramp closing, hazardous condition or accident. As in the example illustrated in FIG. 10B, the mapping application in some embodiments provides a popover window (similar to window 1034) to provide additional information about the ramp closing, hazardous condition, or accident specified by the banner 1046, 1048, or 1050 when the device has a large enough screen or high enough resolution to accommodate a sufficiently sized popover window to show useful data.

D. Drawing Traffic Representations in Perspective 3D View

As mentioned above and as further described below, the mapping application of some embodiments draws representations of traffic congestion (e.g., the patterned traffic lines shown in FIGS. 5-9B) or traffic conditions over or along roads that it draws. The drawings of the traffic representations and the roads are part of the same rendering process, which allows the traffic representations to be drawn in accord with the rendering of the roads and other objects in the 2D or 3D scene. Hence, the traffic representations do not unnecessarily occlude other objects in the 2D or 3D map view.

Figure 10F:
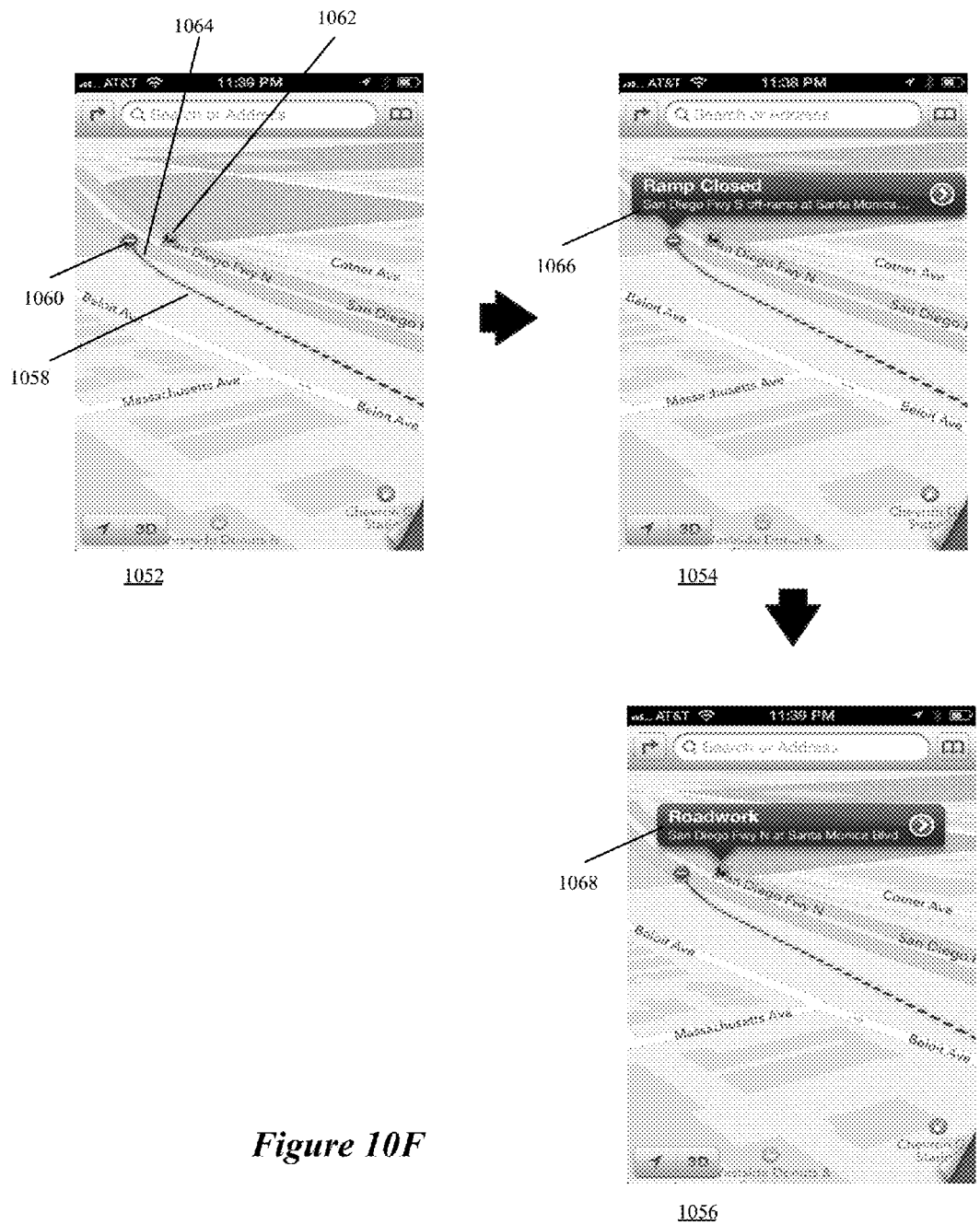
FIG. 10F illustrates a 3D perspective view of a map.
Figure 10G:
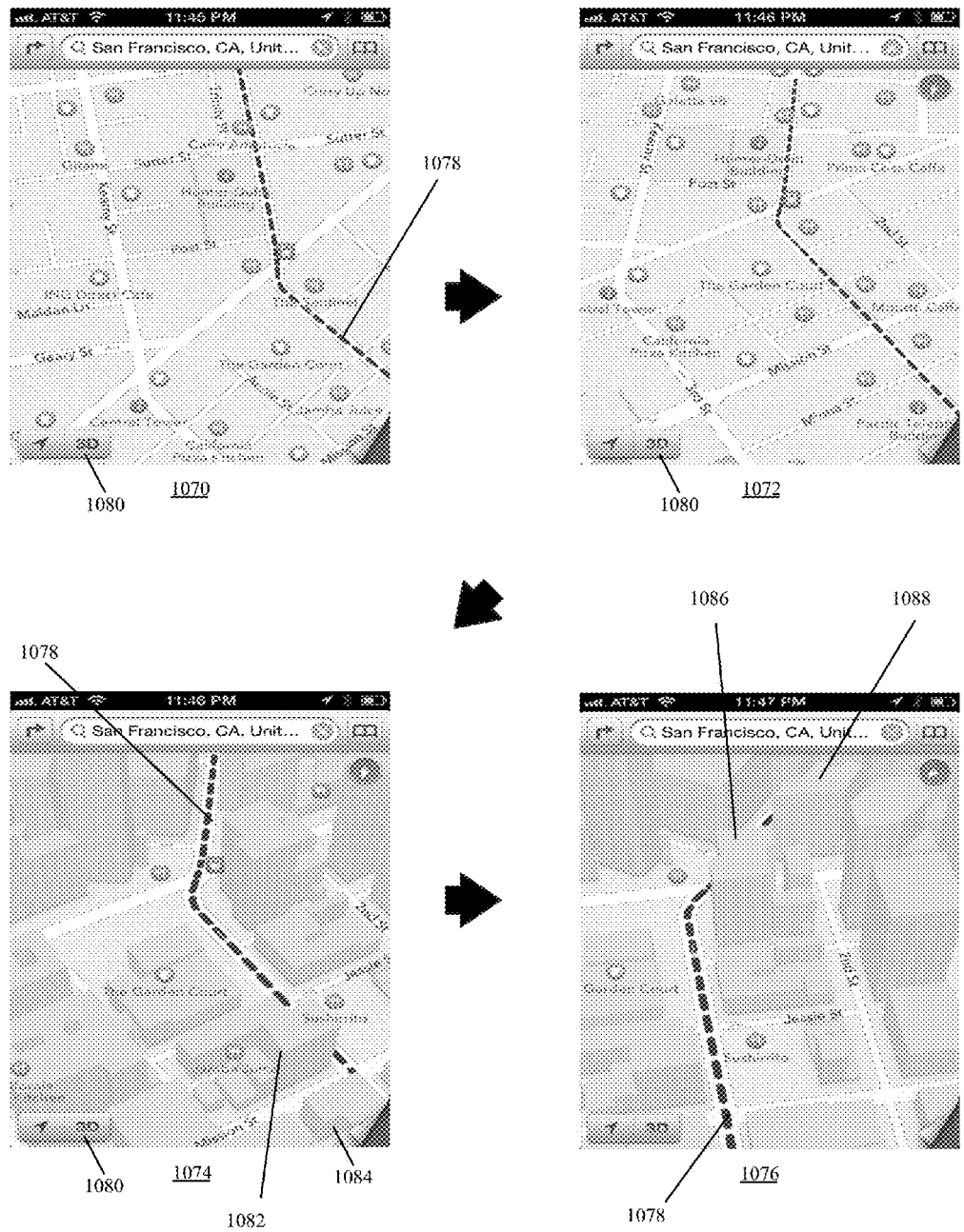
FIG. 10G presents another example of rendering traffic representations in order to further illustrate how the mapping application treats traffic representations as just another object in a 3D scene that it renders.

To better illustrate the rendering of the traffic representations in harmony with the road rendering, FIGS. 10F and 10G illustrate perspective 3D views of map locations that have traffic congestion, and in the case of FIG. 10F, traffic conditions. In these examples, the traffic representations are rendered just like any other object in the 3D scene and hence appear seamlessly and unobtrusively within the scene. In other words, their positions and orientations are defined like any other object in the 3D scene, and then the scene (which includes the traffic representations, roads, and possibly other objects) is rendered from the view of a virtual camera viewing the scene.

FIG. 10F illustrates a 3D perspective view of the map that is illustrated in three stages 1052, 1054 and 1056. The first stage 1052 presents the initial perspective view that includes traffic pattern 1058, ramp closed icon 1060 and construction icon 1062. As there are no 3D objects in this 3D scene that occlude the view of the virtual camera that defines the position and orientation of the perspective view, the traffic pattern 1058 and the icons 1060 and 1062 are fully visible and not occluded by any other objects in the 3D scene.

In the perspective view illustrated in the first stage 1052, the traffic pattern has been rendered to overlap and fit within a road. Both the traffic pattern and this road have been rendering by using a perspective transform as both the traffic pattern and the road appear to be thinner towards the top 1064 of the road. The perspective operation also has made the traffic pattern denser towards the top 1064 of the road. Also, in this perspective view, the icons 1060 and 1062 appear as vertically standing objects in the 3D scene.

The second stage 1054 then illustrates the map presentation after the ramp-closed icon has been selected. In response to this selection, a banner 1066 has been opened to provide more information about the closing of the ramp. The third stage 1056 next illustrates the map presentation after the roadwork icon 1062 has been selected. In response to this selection, a banner 1068 has been opened to provide more information about the roadwork. In some embodiments, these banners also appear as vertically standing objects in the 3D scene being rendered.

FIG. 10G presents another example of rendering traffic representations in order to further illustrate how the mapping application treats traffic representations as just another object in a 3D scene that it renders. To illustrate this point, this example shows a traffic pattern that does not occlude other objects in the 3D scene, but instead is getting partially occluded by other objects in the 3D scene because it is partially behind these objects.

This example is illustrated in four stages 1070, 1072, 1074 and 1076. The first stage 1070 shows a 2D view of a map of a location in San Francisco that has traffic congestion 1078 along a particular road. The second stage 1072 shows the same location but now in a 3D perspective view, as indicated by the highlighting of the 3D button 1080.

The third stage 1074 shows another 3D perspective view of this location after the mapping application has zoomed into that location (e.g., in response to user input). As shown in this stage, this zooming has resulted in the display of buildings that appear as 3D objects in the 3D scene being rendered. In this 3D scene, two of the 3D buildings 1082 and 1084 occlude portions of the traffic pattern 1078 as these two buildings are between the position of the virtual camera rendering the scene and those portions of the traffic pattern.

The fourth stage 1076 then shows the map location after it has been rotated clockwise. In this rotated view, other portions of the traffic pattern 1078 are occluded by two other buildings 1086 and 1088. Again, these occluding buildings occlude portions of the traffic pattern as they are between the position of the virtual camera and these portions. The third and fourth stages 1074 and 1076 together illustrate that the traffic pattern 1078 (like other traffic representations) is simply an object in the 3D scene for which the mapping application initially identifies its location and then renders along with other objects in the scene based on the vantage point of the virtual camera.

After generating the traffic pattern 1078 representation, the mapping application's rendering module renders the composite scene by arranging this representation in the scene with other objects in the scene based on the layer information of this representation and of other objects in the scene. In some embodiments, this layer information is derived from the perspective view of the virtual camera. Accordingly, because of this layering, different buildings in the third stage 1074 and fourth stage 1076 occlude different parts of the rendered traffic pattern as they are between the virtual camera view and the occluded parts of the rendered traffic.

II. Data Structure and its Use in Rendering Traffic Data

A. Dynamic Road Condition Objects and Linking Objects

Figure 11A:
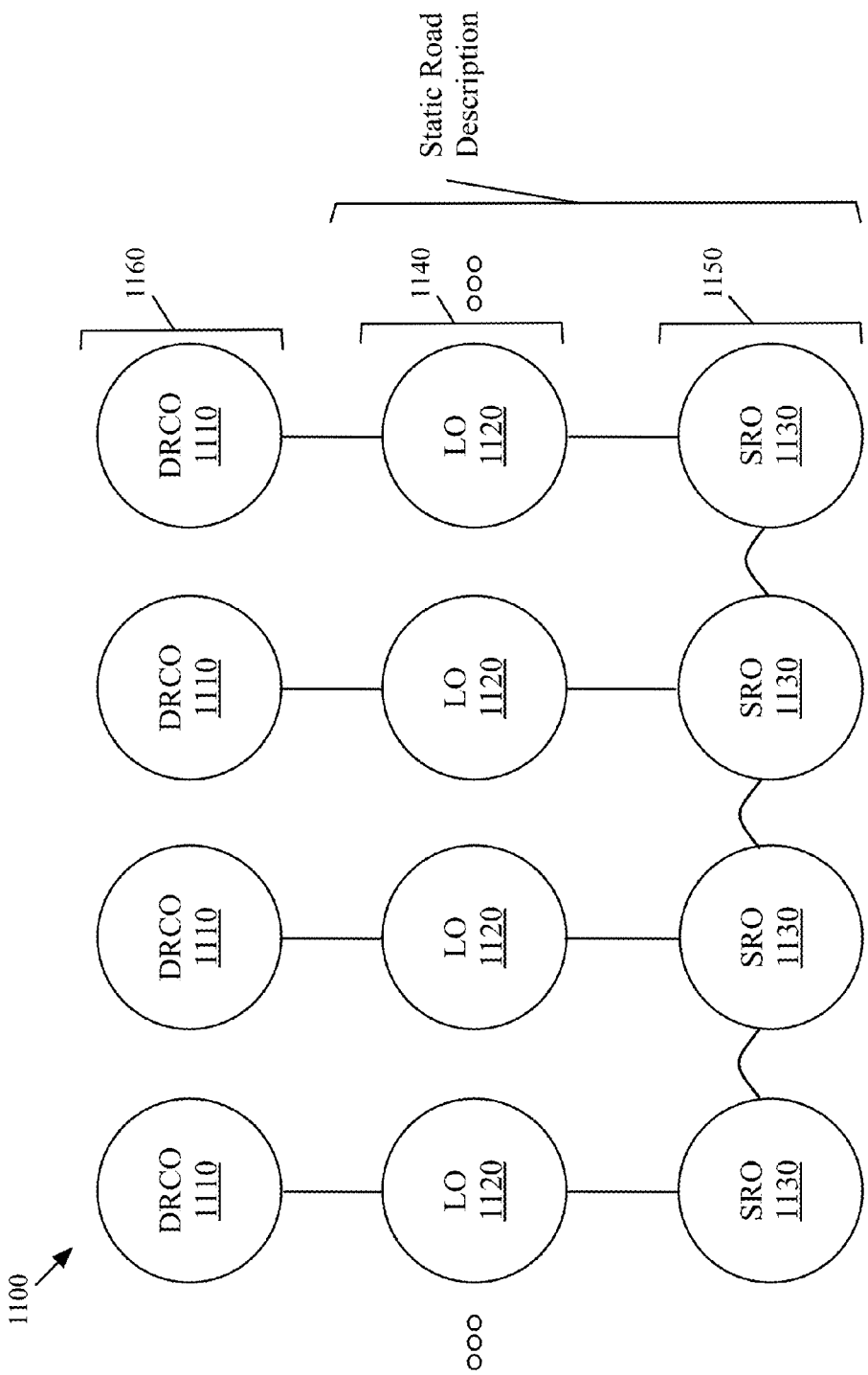
FIG. 11A conceptually illustrates a data structure to express traffic data and associate this data with road data.

Some embodiments of the invention use several different novel data structures to express traffic data and associate this data with road data. FIG. 11A conceptually illustrates one such data structure 1100. Specifically, this figure illustrates using a linking object layer 1140 to map dynamic road-condition data 1110 to static road map 1130. One example of road-condition data includes traffic data. In some embodiments, the traffic data includes data that pertains to the speed of traffic along the roads, while in other embodiments this data includes data relating to occurrence of accidents along the roads. Also, road-condition data includes other types of data, such as weather conditions (e.g., rain, snow, etc.) or surface road conditions (e.g., ice on the road, wet conditions, construction, rough road conditions, etc.).

As shown FIG. 11A, linking object layer 1140 is one of three layers of objects, with the other layers being the static road object layer 1150 and the dynamic road-condition object layer 1160. These three layers respectively include several linking objects 1120, static road objects 1130 and dynamic road-condition objects 1110. Collectively, these three layers describe a road with several segments and the different conditions along different segments of the road.

In some embodiments, the static road objects 1130 are road vector tiles that store road geometry information for a given geographic area (e.g., for a given section of a map) in terms of vector data. This vector geometry information is used to render the traffic map. The information contained in the static road object 1130 is static, which means once it is downloaded to the device, it will not need to be downloaded or updated for a while. Of course, if the device has to delete this object from its memory, it will have to be downloaded again. Also, in some embodiments, the server that generates the static road tiles, updates such tiles once in a while so that it can support a new version of the map or a new version of its services. At such occasions, the device would have to receive new static road tiles for the areas that its mapping application needs to display.

In some embodiments, the dynamic road condition objects 1110 are tiles generated by a set of servers that monitor and generate data regarding road conditions. In some embodiments, this set of servers does not include any server used to generate the road tiles, while in other embodiments the set of servers is the same server set or includes one or more of the servers that generate the road tiles.

In some embodiments, a dynamic road condition object 1110 contains road condition data such as traffic congestion, detours, and traffic accidents for certain sections of roads. As mentioned above, the road condition data in some embodiments also includes other information such as weather conditions (e.g., rain, snow, etc.) and surface road conditions (e.g., ice on the road, wet conditions, construction, rough road conditions, etc.).

The information contained in the dynamic road condition object is dynamic as it gets updated periodically and/or in real-time by a set of servers that provides the dynamic road condition data. This information is relayed through a network (e.g., a cellular wireless network) that in some embodiments is the same network that transmits the static road data, other mapping data, the route data and/or the navigation data. In other embodiments, the dynamic road condition data is provided through a different network than the network that provides the static road data, other mapping data, the route data and/or the navigation data.

The dynamic road condition objects 1110 need to be mapped to physical locations on a map in order to render the traffic map. In some embodiments, each dynamic road condition object is associated with one static road object through a linking object 1120, as shown in FIG. 11A. However, as further described below, each dynamic road condition object in some embodiments is associated with more than one static road object, or one static road object is associated with more than one dynamic road condition object.

Irrespective of whether there is a one-to-one association between a dynamic road condition object and a static road object, or a one-to-many or many-to-one association between these objects, some embodiments still use one linking object to establish each association between a dynamic road condition object and a static road object. The linking object 1120 establishes the link between a dynamic road condition object 1110 and a static road object 1130. As further described below, the linking object 1120 contains the data that allows one dynamic road condition object to link to one static road object. Also, as further described below, the linking object in some embodiments contains other positional data necessary for rendering the road condition data in a dynamic road condition object over or about the roads defined in the static road object. By providing such positional data, the linking object simplifies the process of rendering the road condition data (e.g., the traffic data), and ensures that such renderings are at the desired locations over or adjacent to the roads.

In some embodiments, the linking object 1120 is an object that is instantiated from a class that defines the attributes (and in some cases, the functions) associated with the linking object. In other embodiments, the linking object 1120 is a conceptual representation of another construct (e.g., a reference, a pointer, a common index value etc.) that is used to define an association between a dynamic road condition object and a static road object.

The linking object layer 1140 acts as a translation layer between the dynamic road condition object layer 1160 and the static road object layer 1150. Because of the linking object layer 1140, a single version of dynamic road condition objects 1110 can be mapped to multiple versions of static road objects that are provided at different times (e.g., for multiple different versions of a mapping application). Consequently, the traffic server only needs to provide one version of traffic tile to support multiple versions of road tiles and mapping applications that might be deployed at any given time on devices that are subscribers or recipients of the mapping, navigation and/or traffic services.

B. Linking Traffic Objects

Figure 11B:
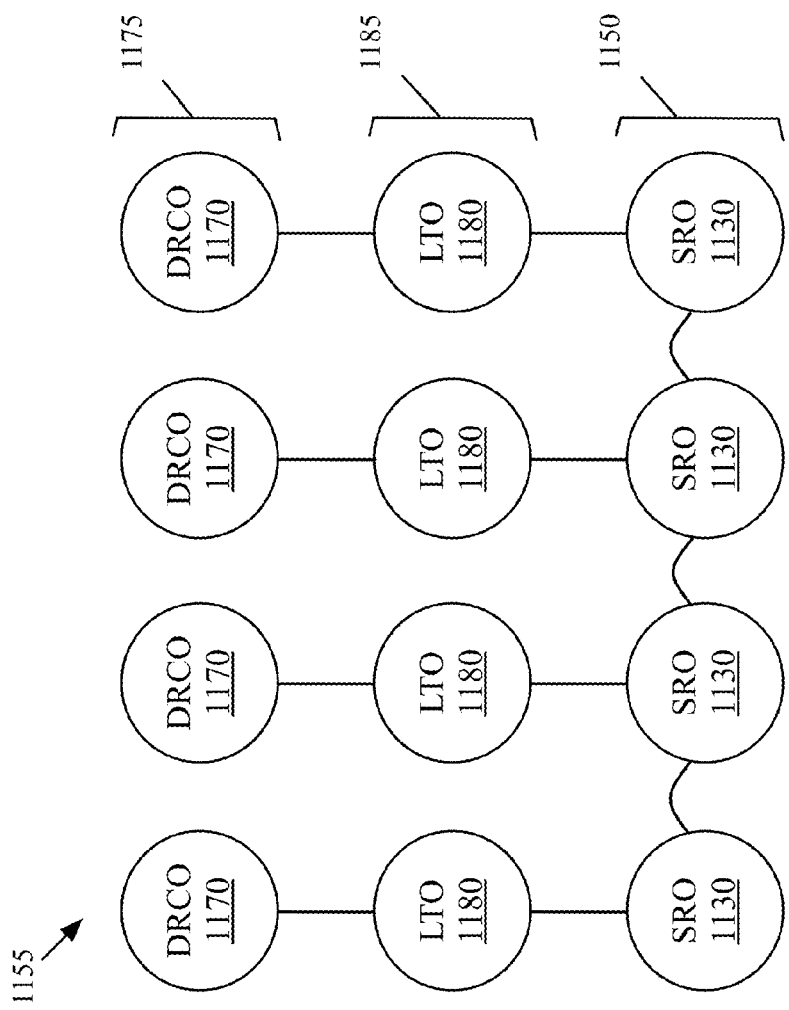
FIG. 11B illustrates a more detailed example of a data structure that is used to represent a road and the traffic associated with different segments of the road.

FIG. 11B illustrates a more detailed example of a data structure 1155 that is used to represent a road and the traffic associated with different segments of the road. The data structure 1155 is the same as the data structure 1100 of FIG. 11A in that it has a static road object layer 1150, a linking object layer 1185, and a dynamic road-condition object layer 1175. Also, the static road objects 1130 in FIGS. 11A and 11B are identical.

However, there are two differences between these two structures that should be noted. First, the dynamic object layer 1175 includes dynamic traffic objects 1170 that dynamically receive and store traffic data, which is a specific type of road condition data. As mentioned above, traffic data in some embodiments includes data that pertains to the speed of traffic along the roads, while in other embodiments this data also includes data relating to the occurrence of accidents along the roads.

Second, the linking object layer 1185 includes linking traffic objects (LTO) 1180 that not only establish each association between a dynamic traffic object 1170 and a static road object 1130, but also store the positional data necessary for rendering the traffic data in a dynamic traffic object over or about the roads defined in the static road object. By providing such positional data, the linking object simplifies the process of rendering the traffic data, and ensures that such renderings are at the desired locations over or adjacent to the roads. One example of such a linking traffic object and the positional data that it stores will be described below by reference to FIG. 14. As further described below, FIG. 14 also illustrates an example of a dynamic traffic object 1170.

In the discussion below regarding FIGS. 12-17, the dynamic road condition that is described is dynamic traffic data. This discussion, however, is equally applicable to any other dynamic road conditions, such as weather conditions and road surface conditions.

Figure 12:
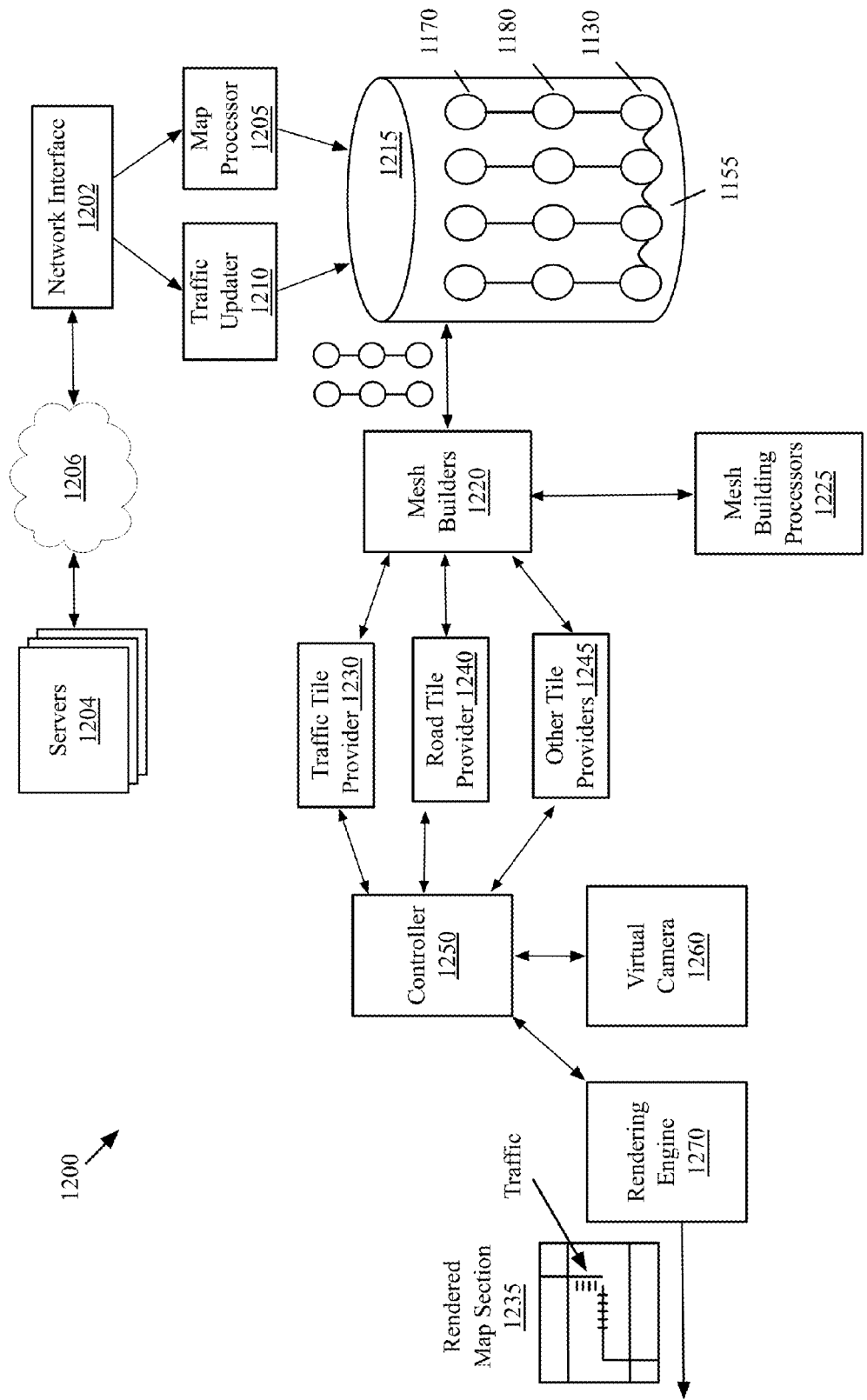
FIG. 12 provides a conceptual illustration of how the data in a dynamic traffic object and its associated linking traffic object provide the data necessary for rendering the traffic for a particular road segment or set of road segments.

FIG. 12 provides a conceptual illustration of how the data in a dynamic traffic object 1170 and its associated linking traffic object 1180 provide the data necessary for rendering the traffic for a particular road segment or set of road segments. This figure illustrates the rendering pipeline of the mapping application of some embodiments. As shown in this figure, the rendering pipeline 1200 includes a network interface 1202, a map processor 1205, a traffic updater 1210, a data storage 1215, one or more mesh builders 1220, one or more mesh building processors 1225, a traffic tile provider 1230, a road tile provider 1240, one or more other tile providers 1245, a controller 1250, a virtual camera 1260, and a rendering engine 1270.

The storage 1215 stores the road description 1155 that was described above by reference to FIG. 11B. This road data structure 1155 includes several different layers of data structure that are populated by the map processor 1205 and the traffic updater 1210 based on data that these two modules receive through the network interface 1202. The network interface 1202 is the interface between the device and a network 1206 through which the device receives road data and updated traffic data from a set of servers 1204, which as mentioned before include one subset of servers for sending road data and another subset of servers for sending traffic data.

The map processor receives and processes road objects (e.g., road tiles) 1130 and their associated linking traffic objects 1180 in some embodiments. In some embodiments, the map processor receives these objects each time it has to receive a new road or a new road segment that it has not previously received, or it has previously received but it has since removed from the storage 1215. The map processor 1205 also receives new road objects 1130 and their associated linking objects 1180 each time a new version of a map or a new version of the mapping application is released.

The traffic updater 1210 receives and processes traffic data through the network interface 1202, and stores this data in dynamic traffic objects 1170 of the road description 1155. In some embodiments, the traffic updater also creates (e.g., instantiates) the traffic objects, while in other embodiments, the traffic updater simply receives traffic objects (e.g., traffic tiles) that it or the map processor associates with the static road objects through the linking objects. In yet other embodiments, the traffic updater modifies the traffic objects (e.g., the traffic tiles) that it receives. The traffic updater also periodically and/or in real time receives and/or updates the dynamic traffic objects. In some embodiments, the map processor 1205 and traffic updaters 1210 include tile retrievers/downloaders and decompressors as described in U.S. Provisional Patent Application 61/699,862, entitled "Generating Map Data for Rendering," and as further described in U.S. Non-Provisional patent application Ser. No. 13/631,998, now published as U.S. Patent Publication 2013/0328861, entitled "Generation of Road Data," filed concurrently with this application. The Provisional Application 61/699,862, and the concurrently filed non-provisional application Ser. No. 13/631,998, now published as U.S. Patent Publication 2013/0328861, are incorporated herein by reference.

As mentioned above, traffic tile generating servers in some embodiments gather traffic data from the mobile devices that have turned on traffic reporting, and collect traffic data from one or more other sources that provide traffic data. These servers then generate traffic tiles, distribute these tiles to the traffic updaters of the mobile devices (directly or indirectly through other servers), periodically and dynamically update these tiles, and re-distribute these tiles to the traffic updaters of the mobile devices.

To generate the traffic tiles, the servers and/or traffic updaters (1) identify several or numerous sets of traffic segments for several or numerous roads, (2) identify different groupings of the traffic segment sets, and (3) for each group of traffic segment sets, define a traffic tile that includes data that specifies the traffic segments of the group and the traffic congestion along the traffic segments of the group. As described above and below, each traffic tile specifies traffic congestion data for each traffic segment based on the traffic data gathered from one or more sources that provide data regarding traffic along the roads.

The downloaded road, traffic and other tiles are used to render the roads and other map data along with the traffic data. The controller 1250 directs much of the processes for performing this rendering. From the virtual camera 1260, the controller receives the portion of the map that is currently being requested for display. Based on the identified portion of the map and in some embodiments areas surrounding this portion, the controller directs the tile providers 1230, 1240 and 1245 to retrieve view tiles for it to pass along to the rendering engine 1270 to render. In some embodiments, the view tiles include road tiles, traffic tiles, and building tiles that describe respectively roads in a scene, the traffic along the roads in the scene, and the buildings in the scene.

The tile providers 1230, 1240 and 1245 instantiate and direct the mesh builders 1220 (also referred to as tile sources) to build different layers of view tiles. Depending on the type of map being displayed by the mapping application, a tile provider may instantiate different numbers and different types of mesh builders. For example, for a 2D or 3D rendered vector map (i.e., a non-satellite image map), some embodiments instantiate separate mesh builders to build meshes for landcover polygon data (e.g., parks, bodies of water, etc.), roads, place of interest markers, point labels (e.g., labels for parks, etc.), road labels, buildings, raster data (for certain objects at certain zoom levels), as well as other layers of data to incorporate into the map. One of the mesh builders 1220 builds a mesh that specifies traffic markers (e.g., traffic patterns shown in FIGS. 5-9B) along the roads. In some embodiments, each of the tile providers 1230, 1240, and 1245 instantiates its own set of mesh builders 1220.

The tile providers receive from the controller a particular view (i.e., a volume, or viewing frustrum) that represents the map view to be displayed (i.e., the volume visible from the virtual camera). The tile providers perform any culling (e.g., identifying the surface area to be displayed in the virtual map tile) in some embodiments, then send the "empty" view tiles to the mesh builders, which then have to perform their operations and return "built" view tiles back to the tile providers. Each view tile indicates an area of the world for which a mesh builder has to draw a mesh. Upon receiving such a view tile, a mesh builder identifies the map tiles (e.g., a road tile, a traffic tile, etc.) that it needs and directs a tile processor (not shown) to retrieve these tiles from the data storage 1215 or from the mapping servers 1204.

Upon receiving the tiles back from the tile processor, the mesh builder uses vector data stored in the tiles to build a polygon mesh for the area described by the view tile. In some embodiments, the mesh builder uses several different mesh building processors to build the mesh. Examples of these processors include a mesh generator, a triangulator, a shadow generator, a texture decoder, etc. In some embodiments, these processors (and additional mesh building functions) are available to each mesh builder, with different mesh builders using different functions.

One of the mesh builders in some embodiments builds a mesh with traffic patterns. This mesh builder identifies one or more segments of the road that need to be rendered for display by the device from the view tiles that it receives. For each road segment that this mesh builder identifies for rendering, the builder identifies its corresponding traffic segments and receives the static road tiles 1130, the linking traffic tiles (e.g., linking traffic object(s) 1180), and the dynamic traffic tiles (e.g., the dynamic traffic object 1170) for these road and traffic segments.

Based on these received road, linking and traffic tiles, the traffic mesh builder identifies the portions of the traffic segments that need to be rendered with a particular traffic pattern that is in a particular color, and then uses the mesh building processors 1225 to generate the desired traffic patterns with the desired colors. As mentioned above, the mapping application of some embodiments draws traffic congestion on the map as a patterned set of lines with different colors to indicate different traffic conditions. In order to do that, the mesh builder directs the mesh building processors to produce different sets of polygons that are differently colored for different regions on or along a road that have different levels of traffic congestion.

Each mesh builder returns the view tiles that it builds to its corresponding tile provider. In some embodiments, the tile provider performs culling on the built mesh using the particular view from the virtual camera (e.g., removing surface area too far away, removing objects that will be entirely behind other objects, etc.). In some embodiments, the tile provider receives the built view tiles from the different mesh builders at different times (e.g., due to different processing times to complete more and less complicated meshes, different time elapsed before receiving the necessary map tiles from the tile processor, etc.). Once all of the layers of view tiles have been returned, the tile provider of some embodiments puts the layers together and releases the data to the controller for rendering. Accordingly, in some embodiments, the traffic tile provider provides traffic view tiles to the controller while the road tile provider provides road view tiles to the controller. Other embodiments may have one tile provider for road and traffic data. In these embodiments, this tile provider receives the traffic and road data from one or more mesh builders, combines this data into one tile (when it receives the traffic and road data from two or more mesh builders), and provides a view tile that includes traffic and road data for rendering.

The controller then combines the view tiles that relate to the same region of the map view and passes these tiles to the rendering engine 1270 for rendering. For instance, in the embodiments that the controller receives traffic view tiles and road view tiles from different tile providers, the controller combines these view tiles (also called virtual tiles above and below) and provides these combined tiles to the rendering engine to render. In some embodiments, the combined view tiles account for the arrangement of the objects in the rendered scene based on the layer information of the objects in the scene. These objects include the roads and traffic representations as well as any other objects (e.g., buildings) that may occlude these representations based on a particular view of the virtual camera. In some embodiments, the combined view tiles specify layer information for the traffic representation that allows the rendering engine 1270 to determine which portions of the traffic representation are occluded by other objects in the scene for the particular view of the virtual camera.

Accordingly, based on the tiles that it receives from the controller, the rendering engine 1270 generates a rendered section 1235 of a map that shows traffic data (if any) along the roads (if any) that are in that section of the map. The above-incorporated U.S. Provisional Patent Application 61/699,862 and U.S. Non-Provisional application Ser. No. 13/631,998, now published as U.S. Patent Publication 2013/0328861, entitled "Generation of Road Data," further describe the operation of the rendering engine 1270, virtual camera 1260, controller 1250, tile providers 1230, 1240, and 1245, mesh builders 1220, mesh building processors 1225, and the interface to the servers 1204.

The approach described above can be used to generate the description of traffic congestion representations or traffic sign representations, such as those shown in FIGS. 10A-10G. In some embodiments, the only different between the generation of the description of the congestion and sign representations is that for the sign representation only a single location for the sign needs to be derived, whereas for the traffic congestion representations (e.g., the traffic patterned line segments) a span along a length of a road needs to be defined.

The rendering pipeline 1200 is just one conceptual example of the mapping application's rendering pipeline of some embodiments that renders traffic congestion over or along the roads in the map. In other embodiments, the rendering pipeline of the mapping application differs from the rendering pipeline 1200 of FIG. 12. One alternative rendering pipeline will be described below by reference to FIG. 17B.

Figure 13:
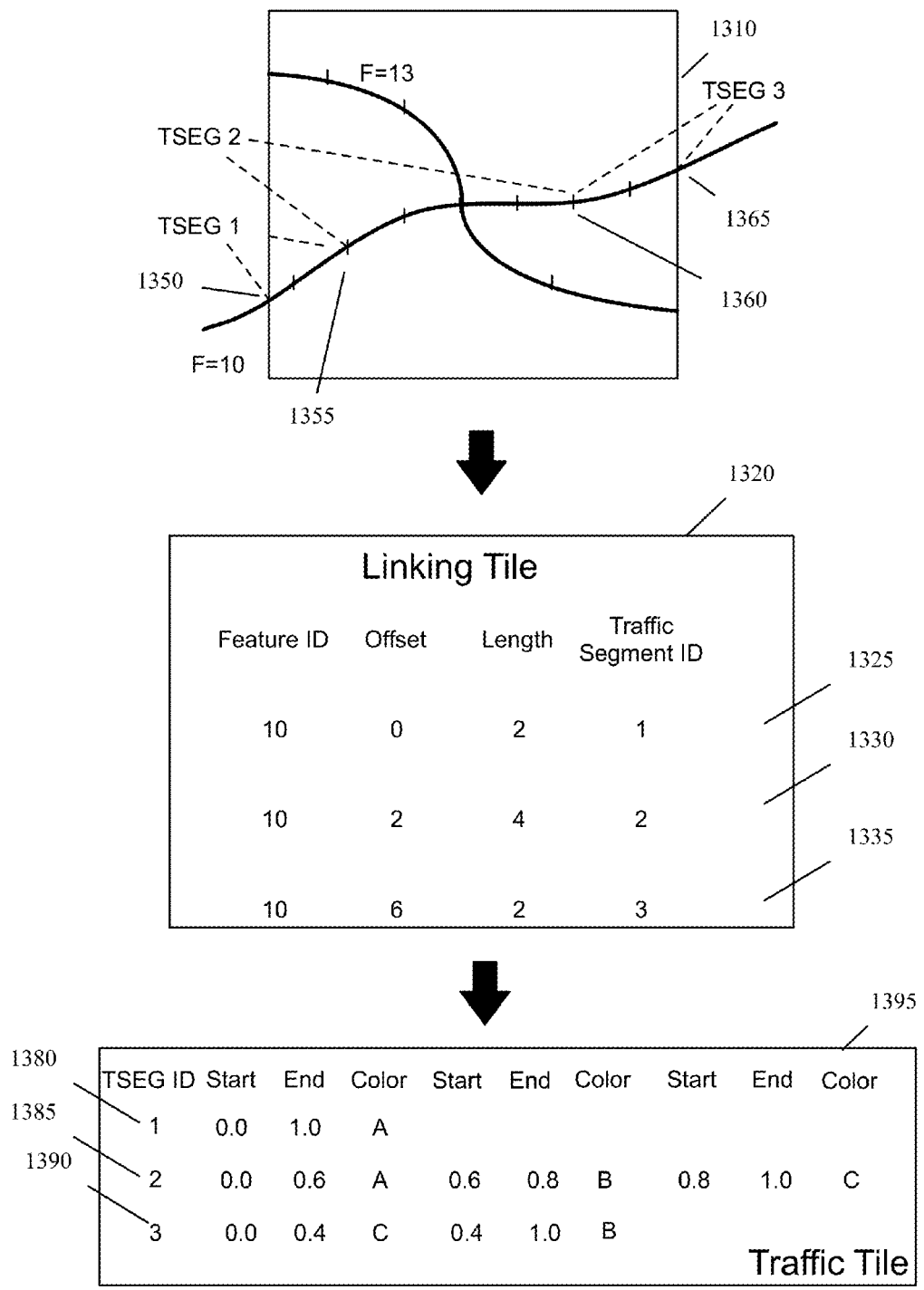
FIG. 13 conceptually illustrates for some embodiments how each entry of linking objects are mapped to geometry data of corresponding road objects and how traffic congestion patterns are specified for different portions of a road.

FIG. 13 conceptually illustrates how each entry of a linking object is mapped to geometry data of a corresponding road object in some embodiments. It also illustrates how traffic congestion patterns are specified for different portions of a road. In these embodiments, the static road object 1130 is a road tile that specifies the road in a map section (e.g., map tile). As shown, this figure includes the map view of a road vector tile 1310, a data structure view of a linking tile 1320, and a data structure view of the dynamic road condition object, which in this example is a traffic tile 1395.

The road vector tile 1310 represents a square geographic area of the world. As shown in the figure, this particular tile contains two roads with feature identifications (IDs) 10 and 13 that cross over each other. Each road includes several vertices connected in sequence. For the road with feature ID 10, there are three traffic segments TSEG 1, TSEG 2, and TSEG 3 within this tile. These traffic segments are defined by the linking tile 1320, and are used by the traffic tile, as further described below. Also, as further described below, the traffic tile 1395 can specify one or more congestion patterns for each traffic segment.

As shown by the data structure 1320 of the linking tile, the linking tile 1320 contains several entries 1325-1335. Each linking tile entry includes information for mapping a traffic segment to a road that contains the traffic segment. Each linking tile entry contains a feature ID field, a traffic segment ID field, an offset field, and a length field. The feature ID field identifies a geometric feature (e.g., a road or road segment) in the corresponding road vector tile. The traffic segment ID field uniquely identifies a portion of a road or road segment for which traffic data is provided in the corresponding traffic tile. The offset and length fields describe the corresponding starting geometry vertex and the length (expressed in vertices in this example) for the road portion represented by the traffic segment ID within the road represented by the feature ID. These two attributes, offset and length, specify how the mesh builder should traverse along the road or road segment identified by the feature ID to identify the various traffic segments along this road or road segment. In some embodiments, the mesh builder does this operation after the road representation has been defined by it or another mesh builder. Alternatively, the mesh builder does this operation independently of the building of the road by it or another mesh builder by simply using the definition of the road or road segment from the road tile to complete the definition of the traffic segment, after which it can then specify the traffic congestion representation.

The linking tile layer allows the traffic navigation system to split static traffic content from the dynamic traffic content. Static traffic content (e.g., feature ID, traffic segment ID, and offset and length) is stored in the linking tile. A traffic server references traffic segments in linking tiles through the traffic segment IDs that are used by both the traffic and linking tiles. Specifically, as shown in FIG. 13, each traffic tile 1395 includes a sequence of traffic flow entries, with each entry containing a traffic segment ID and traffic data for the traffic segment. In this example, the traffic data for each traffic segment (TSEG) is expressed in terms of one or more sets of start, end and color values. The start and end values in some embodiments are offset values that are expressed in units relative to overall length of the traffic segment. In this example, the start and end values are specified as numbers between 0.0 to 1.0. The color value for each traffic segment portion (that is specified by color value's corresponding start and end values) provides the traffic congestion color for the traffic segment portion. The color value can have one of three values in some embodiments in order to indicate one of three traffic conditions. Specifically, in some embodiments, the color values can be no color, red color and orange color to indicate no traffic congestion, heavy traffic congestion and moderate traffic congestion. By providing the ability to specify different traffic conditions for portions for a traffic segment (through the start, end and color values), the traffic tile 1395 allows the device to specify traffic congestion along a traffic segment at a more granular level. This ability is useful when a traffic segment is long and hence can have varied traffic congestion across it.

For each entry in the linking tile, the mapping application looks up feature ID in the corresponding road vector tile for geometry information. The application also uses the traffic segment ID to retrieve from the traffic tile the corresponding traffic data that was received from a traffic server for the traffic segment. The application then uses the retrieved traffic data to represent traffic on or adjacent to a road on the map according to (1) the road data in the road objects (tiles), (2) the offset and length fields of the linking objects (tiles) 1320, and (3) the start, length and color values in the traffic objects (tiles) 1395.

Specifically, in some embodiments, the traffic tiles express the traffic conditions by storing different color values for different portions of traffic segments that are defined along a road, as mentioned above. In these embodiments, the mapping application retrieves the traffic color for a traffic segment portion from the traffic tile, and supplies this color to its mesh builder to represent traffic along a portion of the road that includes the traffic segment portion (i.e., the portion of the road associated with the traffic segment ID as specified by the start and length values stored in the traffic tile 1395 for that portion). As mentioned above, some embodiments uses (1) dashed red lines to represent heavy traffic congestion, (2) dashed orange lines to represent moderate traffic congestion, and (3) the absence of any lines to represent the lack of traffic along a traffic segment. Accordingly, in the embodiments that express traffic condition in terms of colors, the traffic tile stores no color value or stores a default color value when no colored line needs to be drawn for the traffic segment, and this absence of color or this use of default color informs the mesh building pipeline and rendering engine that it does not need to generate any patterned color lines to indicate heavy or mild congestion along a route.

In the example illustrated in FIG. 13, the linking tile 1320 has three entries. The first entry 1325 maps traffic segment 1 to road feature 10 with an offset of 0 and a length of 2. The second entry 1330 maps traffic segment 2 to road feature 10 with an offset of 2 and a length of 4. The third entry 1335 maps traffic segment 3 to road feature 10 with an offset of 6 and a length of 2.

As shown in the road vector tile 1310, the traffic segment 1 (TSEG 1) starts from the left most vertex 1350 of the road feature 10 because the offset of traffic segment 1 is 0, as defined by the linking tile entry 1325. The traffic segment 1 continues for two vertices until it reaches vertex 1355 because its length is 2. Similarly, the traffic segment 2 (TSEG 2) starts from vertex 1355 of the road feature 10 because the offset of traffic segment 2 is 2, as defined by the linking tile entry 1330. The traffic segment 2 continues for four vertices until it reaches vertex 1360 because its length is 4. The traffic segment 3 (TSEG 3) starts from vertex 1360 of the road feature 10 because the offset of traffic segment 3 is 6, as defined by the linking tile entry 1335. The traffic segment 3 continues for two vertices until it reaches vertex 1365 because its length is 2.

With the help of the linking tile 1320, a device can look up feature ID 10 in the road vector tile 1310 for corresponding geometry information. The client device also looks up traffic flow data by taking the traffic segment IDs 1-3 and retrieving traffic data for one or more portions of the traffic segment from the traffic tiles. In the example illustrated in FIG. 13, the traffic tile 1395 has (1) a start, end and color data tuple to specify one traffic portion for the first traffic segment, (2) three start, length and color tuples to specify three traffic portions for the second traffic segment, and (3) two such data tuples (each having start, end and color values) to specify two traffic portions for the third traffic segment.

By using the different colors specified for different portions of different traffic segments and correlating each of the traffic segments to a particular road, the client device draws appropriate traffic representation (e.g., appropriate color) on or adjacent to a road feature (e.g., road feature 10). Specifically, the device draws the heavy and moderate traffic representations according to (1) the road data in the road tiles, (2) the offset and length fields of the linking tile entries 1325-1335 and (3) the start and length offset fields that are stored for the traffic segments in the traffic tile 1395.

Figure 14:
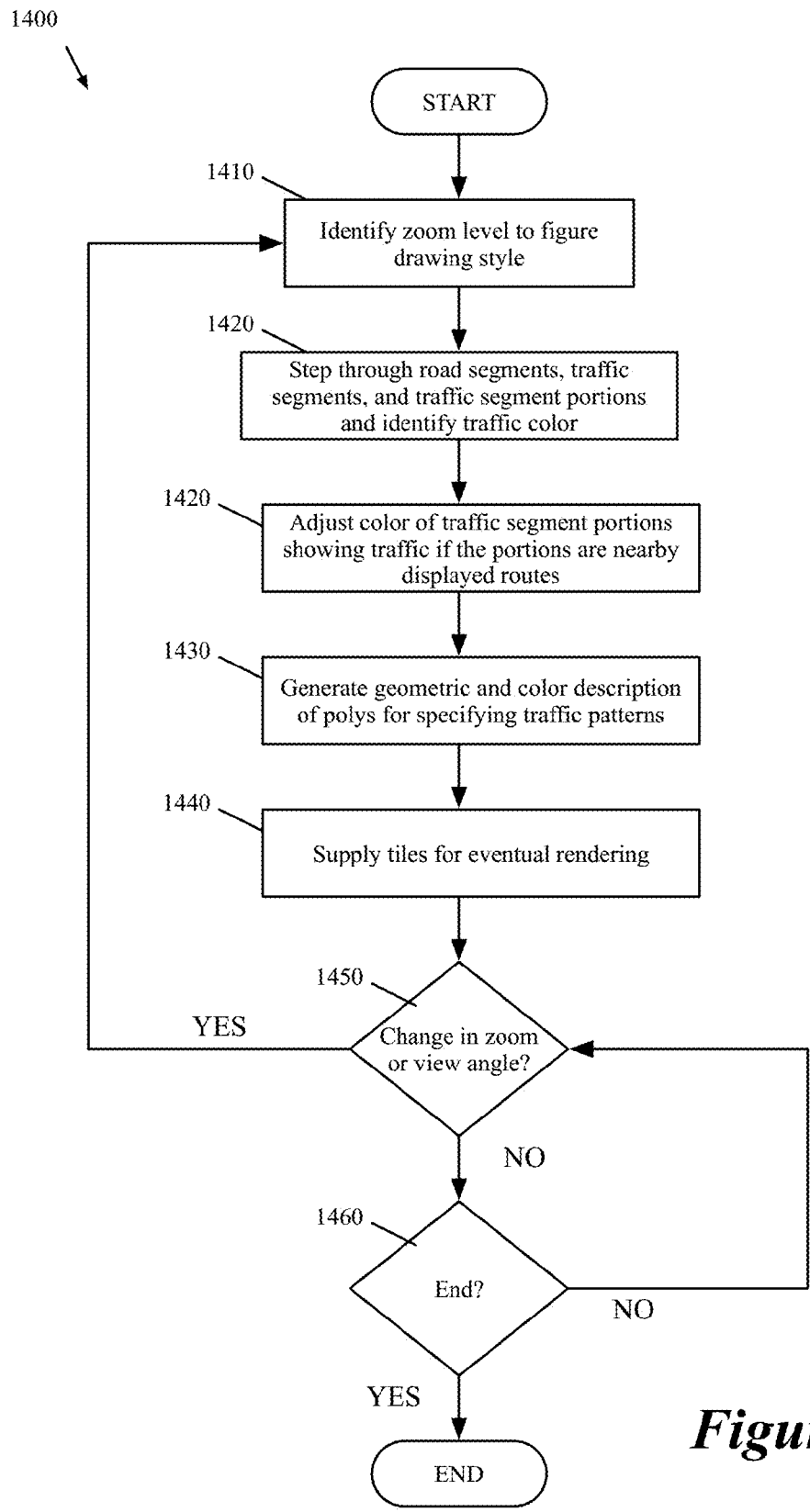
FIG. 14 presents a process that conceptually illustrates the operations of a traffic mesh builder that is directed by a traffic tile provider to build a mesh that specifies the traffic congestion for a particular view of the map.

FIG. 14 presents a process 1400 that conceptually illustrates the operations of a traffic mesh builder that is directed by a traffic tile provider to build a mesh that specifies the traffic congestion for a particular view of the map. As shown in this figure, this operation initially identifies (at 1410) the zoom level for viewing the tile. The zoom level determines a particular area of the map to display with a particular level of detail. In some embodiments, the zoom level is a defined range of distances of the virtual camera from the map (e.g., along the z-axis of a 3D map scene). The zoom level in some embodiments governs how the process 1400 will draw the traffic patterns. For instance, as described above, the mapping application draws the traffic patterns over the roads for certain high zoom levels that result in wider roads, while it draws the traffic patterns adjacent to the roads for certain lower zoom levels that result in narrower roads.

Next, at 1420, the process identifies all road segments, traffic segments, and traffic segment portions that are part of the map view that has to be rendered in order to identify the color of the traffic segment portions that are specified in the dynamic traffic tiles for that view. To do this, the process identifies one or more static road tiles that relate to that view and the road segments that are specified in those static road tiles. It also identifies the traffic segments for these road segments through the linking tile or tiles for the identified static road tile or tiles. For these traffic segments, the process then uses the dynamic traffic tile(s) associated with the linking tile(s) to identify the colors that specify the traffic congestion along the portions of the identified traffic segments.

Also at 1420, the process then determines whether there are any routes displayed in the map view, and if any such routes exists, determines whether any traffic congestion pattern (e.g., for showing heavy or moderate traffic conditions) are sufficiently adjacent to any identified route such that their appearance has to be modified. As mentioned above, different embodiments modify the appearance of the traffic congestion patterns differently. For instance, as mentioned above, the process 1400 changes the appearance of the traffic indicating patterns when they are (1) under the identified path of a displayed route, (2) are near such an identified path, and/or (3) are near such an identified path and are for the same direction as the identified path. In some embodiments that draw traffic patterns over the roads for some zoom levels and along the roads for other zoom levels, the process adjusts the appearance of traffic patterns (1) that are under any identified route when such patterns are to be rendered over the road, and (2) that run along any identified route in the same direction as the route when such patterns are to be rendered along the road.

Next at 1430, the process directs one or more mesh building processors to generate the geometric and color description of the polygons (e.g., triangles) that define the traffic patterns (e.g., the patterns that show heavy and moderate traffic conditions). To do this, the process provides to the mesh building processors the description of each traffic segment portion for which traffic congestion patterns have to be generated. In some embodiments, this description is generated at least partially based on (1) the traffic segment offset and length parameters in the linking tiles, (2) the color, start and length data tuples of the traffic segment portions in the dynamic traffic tiles, and (3) the definition of the roads in the road tiles.

Thus, the references to traffic segments in the dynamic traffic tiles and the association of traffic segments to roads in the roads linking tiles allow the description of the traffic representation for a traffic segment portion to be derived from the definition of the road tiles. The description is expressed differently in different embodiments. In some embodiments, this description includes copies of the definition of the road portion corresponding to the traffic segment portion. In other embodiments, this description includes references to the definition of the road portion corresponding to the traffic segment portion.

The generation of the traffic representations (at 1430) also accounts for whether a traffic representation of a traffic segment portion is being drawn over its corresponding road portion or along its corresponding road portion. As mentioned above, at lower zoom levels (corresponding to a more zoomed out view) the roads might be too narrow to draw the traffic representation over, while at higher zoom levels (correspond to a more zoomed in view) the roads are wide enough to draw the traffic representation over. Accordingly, at 1430, the process determines the zoom level and generates the traffic representation description accordingly to go over or along its corresponding road portion.

After the geometric and color descriptions have been generated, the process 1400 provides this information in form of tiles (e.g., build traffic tiles) to the modules responsible for directing the rendering of the map view. As described above, the built traffic tiles are supplied in some embodiments to a traffic tile provider, which in turn supplies these tiles to the controller to combine with road tiles. In these embodiments, the controller then supplies the combined tile data to the rendering engine for rendering, as described above.

After 1440, the process determines (at 1450) whether it has been informed of a change in the zoom level or view angle that would necessitate generation of new geometric and color description for a new section of the map. If so, it returns to 1410 to repeat operations 1410-1440. Otherwise, it determines (at 1460) whether it has been directed to end (e.g., upon the shutdown of the application, the turning off of the traffic reporting, etc.). If not, the process returns to 1450 to ascertain whether a new request for a new zoom level or new view has been received. Otherwise, the process ends.

C. Simplifying Use of Traffic Data for Changing Deployed Base of Devices

For different reasons, different devices might have different versions of static road objects. For instance, different devices might update their mapping applications at different time periods, and different versions of the mapping applications may use different versions of static road objects. Alternatively, in some embodiments, different devices might update their map data at different time periods, and different versions of the maps may use different versions of static road objects.

The linking object layer allows the traffic server(s) (that generate the dynamic traffic objects or the data for the dynamic traffic objects) to support different devices with one set of dynamic traffic objects (e.g., one set of traffic tiles). This is because the linking objects contain traffic segment IDs that allow the latest version of dynamic traffic objects to connect to any static road object as they create the desired association between any feature ID (old or new) and the traffic segments identified in the dynamic traffic objects. In other words, the motivation for having this set of shared IDs and the linking objects is to make the traffic server serve client devices based on its own version, i.e., the version of its dynamic traffic objects, regardless what versions of road vector objects (e.g., tiles) the client devices may have. In other words, the traffic server is insulated from the changing versions of the road vector objects, because the linking object layer can be used to facilitate the translation of a single version of dynamic traffic objects into detailed geographic locations on a map by devices that use different versions of static road objects.

Figure 15:
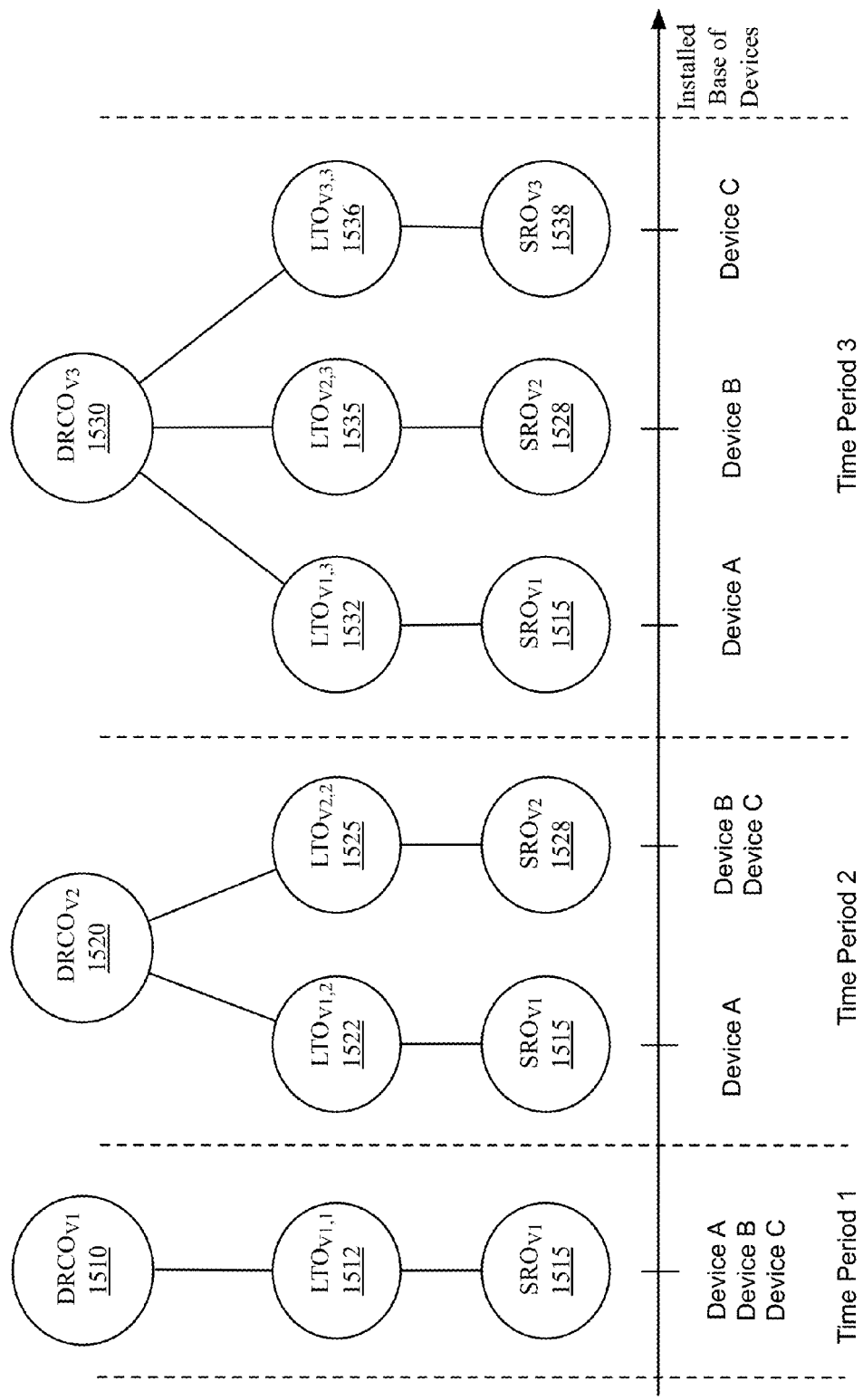
FIG. 15 conceptually illustrates how the linking objects make the traffic server version independent.

FIG. 15 conceptually illustrates how the linking objects make the traffic server version independent. Specifically, this figure shows that the traffic server is able to maintain a single version of dynamic traffic objects (e.g., single version of dynamic traffic tiles) while some client devices upgrade to new versions of road vector objects (e.g., road vector tiles) and some client devices continue to use older versions of road vector objects. In this figure, three time periods 1-3, arranged in chronological order, are illustrated to show how versions of road objects on client devices change over time and how the linking object layer changes accordingly to enable the traffic server to maintain a single version of dynamic traffic objects at all times.

At time period 1, each of the devices A, B, and C uses the same version V1 of road object 1515. The traffic server provides the same version V1 of traffic object 1510 to all client devices. Each of device A, B, and C also stores version V(1, 1) linking object 1512 to map traffic information in the traffic object 1510 into geographic locations on road vector object 1515.

At time period 2, device B and C upgrade their road vector objects 1528 to version V2 and the traffic server has also upgraded its traffic object 1520 to version V2. Device A maintains its road vector objects 1515 at version V1. As a result, device A has downloaded linking object version V(1, 2) 1522 to make the new V2 traffic object 1520 work with the old V1 road object 1515, as device A has not needed to download new road objects. Devices B and C have downloaded linking object version V(2, 2) 1525 to make the new V2 traffic object 1520 work with the new V2 road object 1528 that they have also received or will receive because of their upgrade. Because of the linking object layer, the traffic server can maintain a single version of traffic object 1520 to serve two different versions of road objects (e.g., road vector tiles) on client devices during the second time period.

At time period 3, device C upgrades its road vector objects 1538 to version V3. Device A maintains its road vector objects 1515 at version V1 and device B maintains its road vector objects 1528 at version V2. The traffic server has also upgraded its traffic objects 1530 to version V3. As a result, device A has downloaded linking object version V(1, 3) 1532 to make the new V3 traffic object 1530 work with the old V1 road object. Device B has downloaded linking object version V(2, 3) 1535 to make the new V3 traffic object 1530 work with the old V2 road object. Device C has downloaded linking object version V(3, 3) 1536 to make the new V3 traffic object 1530 work with the new V3 road vector object 1538 that it has received or will receive because of its upgrade. Because of the linking object layer, the traffic server can maintain a single version of traffic object 1530 to serve three different versions of road objects (e.g., road vector tiles) on client devices during the third time period.

Every time a new version of road objects is generated, the dynamic traffic objects will be generated just for that version in some embodiments. Hence, in these embodiments, new sets of linking objects are not only supplied to client devices that receive upgraded road objects, but also to client devices that do not receive upgraded road objects, so that both groups of devices can use the same newer version of the dynamic traffic objects. However, the different groups of devices receive different linking object layers, because the former devices receive linking object layers that connect newer traffic objects to newer static road objects, while the latter devices receive linking object layers that connect newer traffic objects to older static road objects.

D. Hierarchical Roads, Linking, and Traffic Tile Data

Some embodiments of the invention define the static road objects as a hierarchical set of static road vector tiles that define a map (or a section of a map) for a plurality of zoom levels for viewing the map. For instance, in some embodiments, the device allows the map to be viewed at a large number of zoom levels (e.g., 21 zoom levels). For each of these zoom levels, the device has a set of static road tiles that displays the roads at that zoom level.

In these embodiments, each road vector tile is defined at a particular zoom level, e.g., from zoom level 1 to zoom level 21, and there is a 1:1 relationship between the road vector tile and the linking tile. In other words, each road vector tile has a corresponding linking tile. Accordingly, each linking tile also has a zoom level, e.g., from zoom level 1 to zoom level 21. Also, in some of these embodiments, the traffic data is provided at a single zoom level and applied to road vector tiles for a range of zoom levels. One such approach will now be described by reference to FIGS. 16 and 17.

Figure 16:
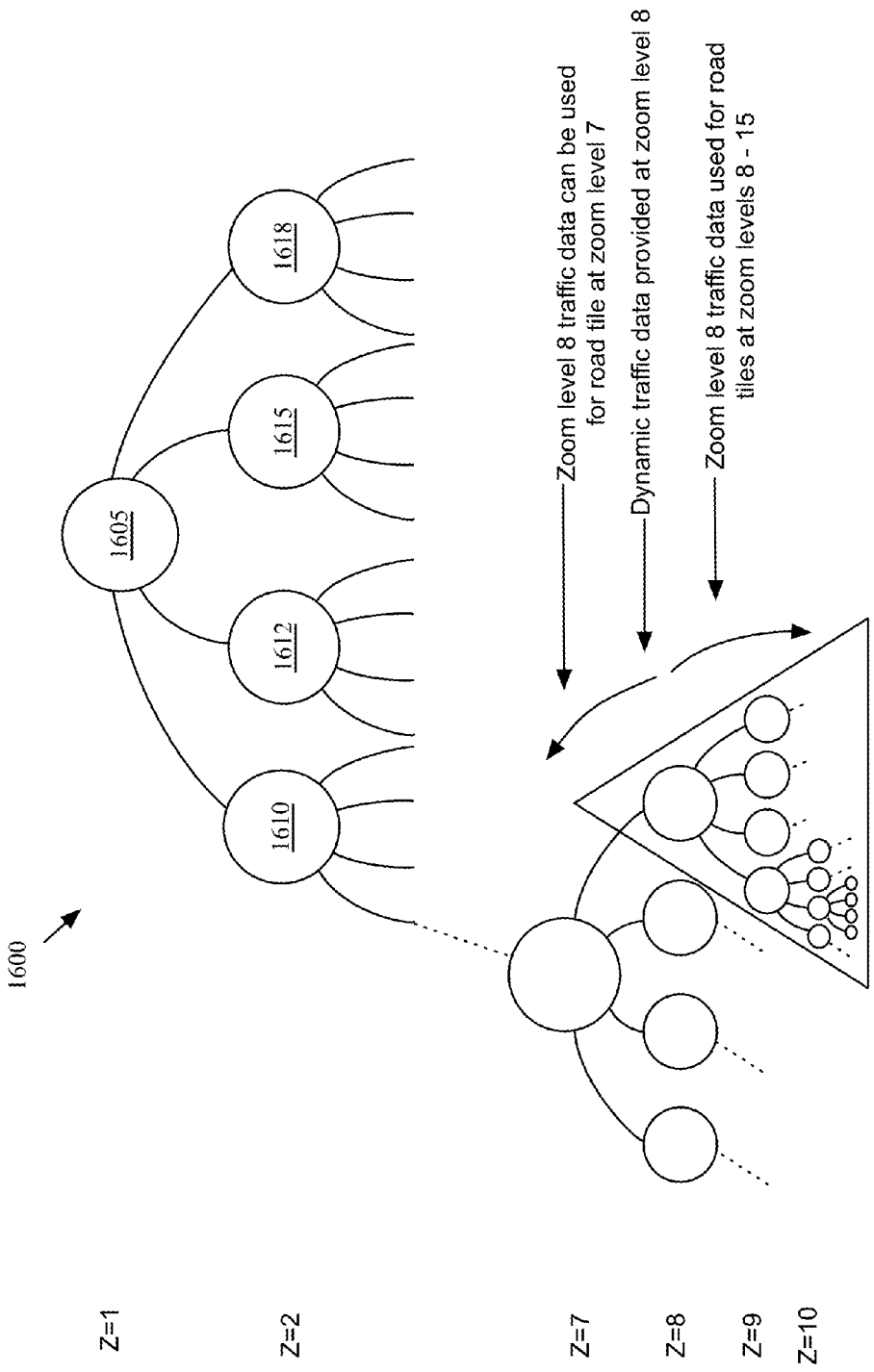
FIG. 16 illustrates an exemplary hierarchical structure that organizes static road tiles at different zoom levels in a quadtree.

FIG. 16 illustrates an exemplary hierarchical structure that organizes static road tiles at different zoom levels in a quadtree. This figure also shows that traffic data at a single zoom level, e.g., zoom level 8, can be used for road vector tiles from levels 7 to 15. More specifically, the quadtree 1600 is a data structure in which each non-leaf node has exactly four children. In some embodiments, each node of the quadtree 1600 represents a road tile of a map at a particular zoom level. The four children of each non-leaf node in the tree partition the geographic area covered by the non-leaf node into four quadrants or regions. Each child node represents a road tile at a zoom level that is one level below its parent.

The root node 1605 of the quadtree 1600 is a road tile at zoom level 1. It covers the entire map region. At zoom level 2, the geographical area covered by the root node 1605 is divided into four regions represented by four road tiles 1610-1618. At zoom level 3, the geographical area covered by each of the tiles 1610-1618 is divided into four even smaller road vector tiles. This process goes on until reaching a leaf node, e.g., at zoom level 21.

FIG. 16 illustrates that the dynamic traffic data tiles are provided at a single zoom level, zoom level 8. In contrast to linking tiles that have to be defined at the same zoom level as their corresponding static road tiles, dynamic traffic data at zoom level 8 can be applied in some embodiments to road tiles from zoom levels 7-15, because of the existence of traffic segment IDs. The traffic segment IDs are a set of globally unique IDs that can be used at all zoom levels. Each traffic segment ID represents a stretch of paved road in the map. For road tiles at different zoom levels, this stretch of road may be drawn with a different number of pixels and with different thickness. But they still refer to the same physical stretch of pavement through the same traffic segment ID in their corresponding linking tiles. Therefore, the dynamic traffic data provided at the single zoom level can be used to scale through other zoom levels through the traffic segment ID.

FIG. 16 illustrates that the dynamic traffic data tiles at zoom level 8 can be used for static road tiles from zoom levels 7-15 in some embodiments, in other embodiments these traffic data tiles are used for other zoom levels above zoom level 7 and below zoom level 15. For instance, the traffic tiles are used at zoom levels below 15 (e.g., 20 or 21) that are used for 3D turn-by-turn navigation in some embodiments. Also, while the embodiments described above and below only provide traffic data tiles for one zoom level, other embodiments provide traffic data tiles at multiple zoom levels.

Figure 17A:
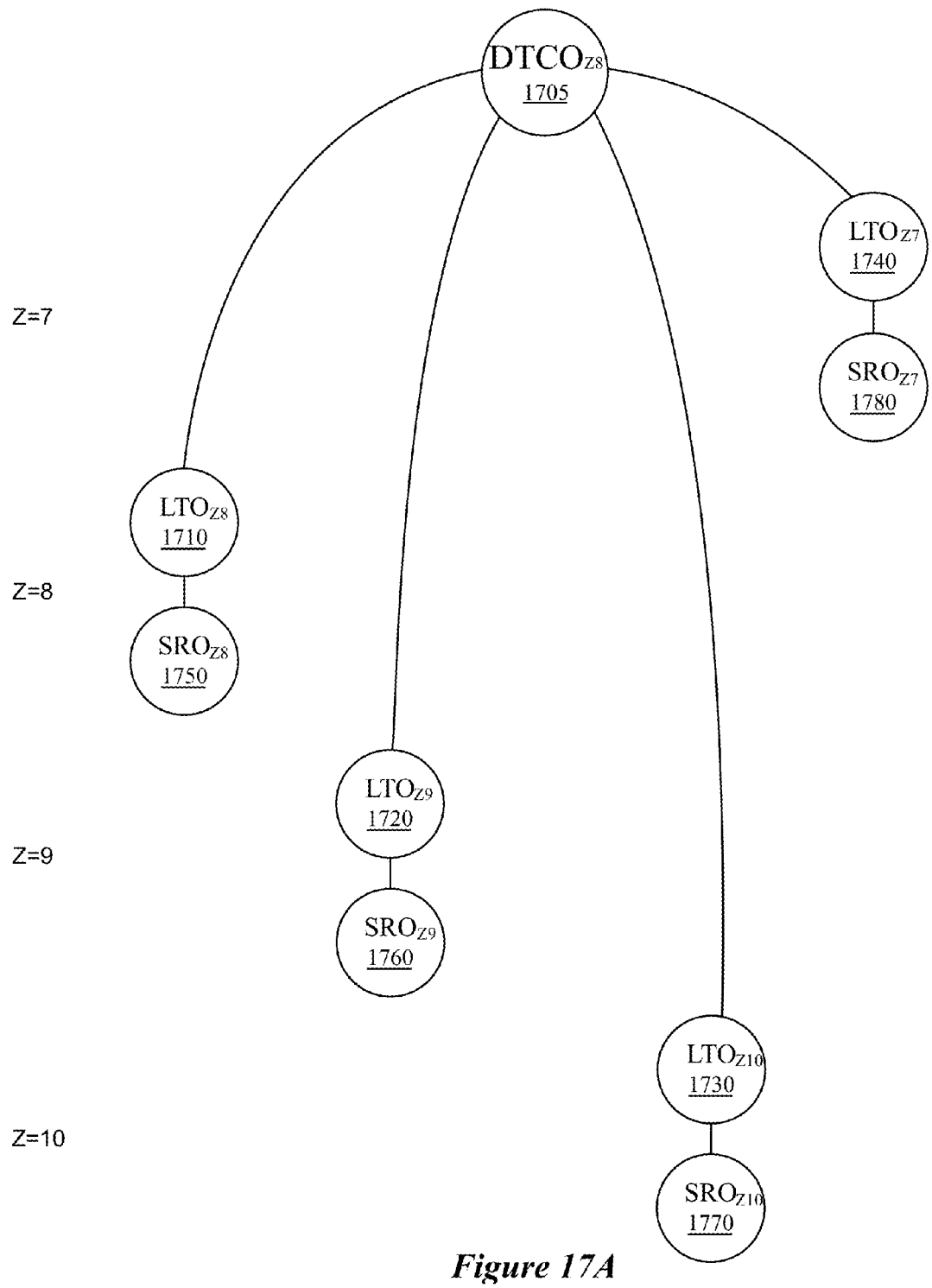
FIG. 17A further illustrates the concept of providing traffic data at a single zoom level and applying it to static road tiles and linking tiles for a range of zoom levels.

FIG. 17A further illustrates the concept of providing traffic data at a single zoom level and applying it to static road tiles and linking tiles for a range of zoom levels. Specifically, this figure illustrates a dynamic traffic condition object at one zoom level being applied to static road objects at several different zoom levels. As shown, the dynamic traffic conditions object 1705 is applied to static road objects 1750-1780 through the mapping of linking objects 1710-1740.

In some embodiments, the dynamic traffic condition object 1705 is provided at zoom level 8 for optimal performance. However, it will be clear and apparent to one skilled in the art that the dynamic traffic condition object can be provided at another zoom level. If the dynamic traffic condition object is provided at a higher zoom level, every traffic segment will cover a longer section of a road and the accuracy of the traffic information on a map goes down. If the dynamic traffic condition objection is provided at a lower zoom level, the accuracy of the traffic information on a map goes up but the volume of data transmitted between the client devices and the server increases. Hence, it is important to choose a zoom level for dynamic traffic condition objects in order to achieve optimal performance.

A dynamic traffic condition object can be used for static road objects at the same zoom level. For example, the dynamic traffic condition object 1705 is used for static road object 1750 through the mapping of the linking object 1710. Both the static road object 1750 and the linking object 1710 are at zoom level 8, which is the same zoom level as the dynamic traffic condition object 1705.

A dynamic traffic condition object can also be used for static road objects at zoom levels below its own zoom level. For example, the dynamic traffic condition object 1705 is used for static road objects 1760 and 1770 through the mappings of the linking objects 1720 and 1730. The static road object 1760 and the linking object 1720 are at zoom level 9. The static road object 1770 and the linking object 1730 are at zoom level 10.

A dynamic traffic condition object can also be used for static road objects at zoom levels above its own zoom level. For example, in the embodiment illustrated in FIGS. 16 and 17, the dynamic traffic condition object 1705 is used for static road object 1780 through the mapping of the linking object 1740, where both the objects 1780 and 1740 are defined at the zoom level 7, which is above the zoom level of the dynamic traffic condition object 1705.

Figure 17B:
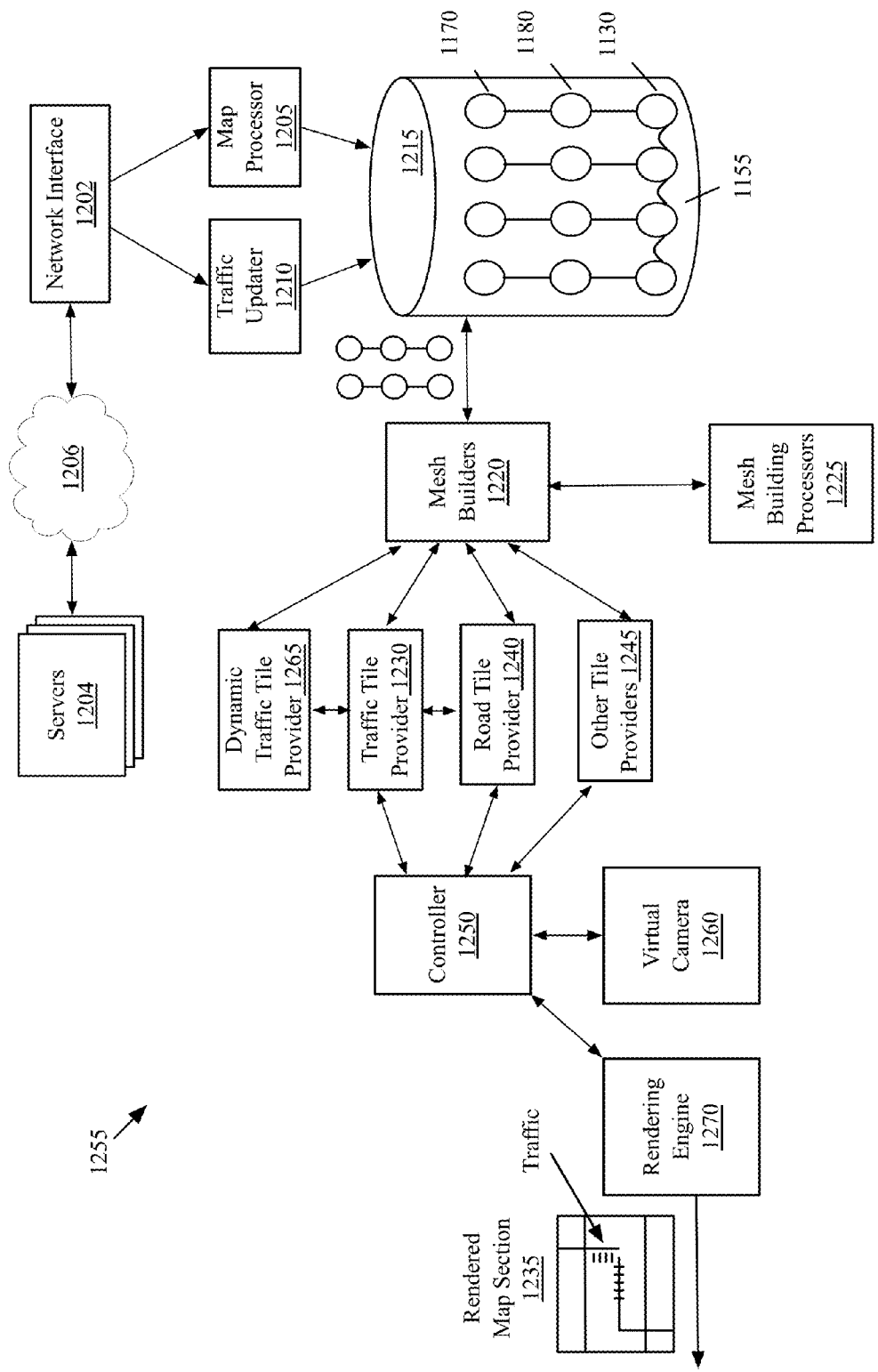
FIG. 17B illustrates a conceptual illustration of an alternative rendering pipeline of the mapping application for some embodiments of the invention.

FIG. 17B illustrates a conceptual illustration of an alternative rendering pipeline 1255 of the mapping application for some embodiments of the invention. This pipeline 1255 is identical to the pipeline 1250 of FIG. 12 except that pipeline 1255 includes a dynamic traffic tile provider 1265 and it uses the traffic tile provider 1230 as the interface between the controller and the road tile provider 1240, as well as the interface between this controller and the dynamic traffic tile provider 1265.

As described above by reference to FIG. 17A, some embodiments provide dynamic traffic tiles only at one particular zoom level. For such embodiments, the pipeline 1255 uses the dynamic traffic tile provider to generate dynamic traffic data for roads shown at other zoom levels for which traffic congestion can be rendered in some embodiments. In some embodiments, the dynamic traffic tile provider has the same responsibilities as the other tile providers but its implementation is different because dynamic tiles are only available at one zoom level. Accordingly, the dynamic tile provider generates dynamic tiles for rendering at zoom levels higher and lower than those described by the provided dynamic tiles. This requires the dynamic tile provider to support a many-to-many relationship between the tiles that it generates and the dynamic traffic tiles that are provided by the servers 1204.

In the pipeline 1255 of FIG. 17B, the traffic tile provider poses as the road tile provider for the controller 1250 when traffic congestion needs to be rendered, but attaches extra traffic rendering resources to road tiles when such resources are available. When the controller asks the traffic tile provider for a tile, the traffic tile provider 1230 proxies the request to the road tile provider 1240. At the same time, it ensures that either it already has a static traffic tile (i.e., a linking tile) ready or it has queued a request for one. Similarly, it asks the dynamic tile provider to ensure that it has a dynamic tile ready or it has queued a request for one. Once the traffic tile provider 1230 notes that it has all the necessary stored tiles for a particular virtual tile that it has to generate, it attempts to produce traffic for that virtual tile.

In other words, the process of producing traffic for a virtual tile requires synchronizing loading between the three types of tiles (dynamic traffic tile 1170, linking tile 1180, and static road tile 1130) provided by the three types of tile provider (dynamic tile provider 1265, traffic tile provider 1230, and road tile provider 1240). The traffic tile provider is effectively the controller of this communication and thus all tiles flow through it. Once all the tiles are available, the traffic tile provider asynchronously generates rendering resources (e.g., the mesh building resources, such as the triangulator, shadow generator, texture decoder, etc.) for traffic using the information from the three tiles.

In FIG. 17B, the road tile provider 1230 is shown to have a connection to the controller 1250 even though in the discussion above it was stated that the traffic tile provider 1230 serves as the interface between the road tile provider 1240 and the controller 1250. This connection is shown in FIG. 17B because when traffic congestion is not being displayed on the map, the traffic tile provider 1230 is not being used. Hence, in this situation, the controller 1250 and the road tile provider 1230 have to directly interface to generate virtual road tiles for rendering.

III. Compact Route Definition

Some embodiments of the invention provide a novel encoding scheme for expressing routes in a compressed manner. In some embodiments, a route server encodes or compresses routes by removing unnecessary control points from the routes. A control point in some embodiments is a piece of data (e.g., maneuver instruction) that specifies a road segment to which to advance from a juncture of the route. A juncture is a location in a map where two or more road segments meet. The route server provides compressed routes to route clients that decode the routes.

The route server in some embodiments generates a route from a starting point to an ending point with a control point at every juncture. The route server then determines, for every control point in the route, whether the control point is necessary. The route server removes unnecessary control points from the routes and sends the routes to the route clients.

The route clients in some embodiments include a mapping application, which generates directions for a user by decoding the compressed routes. In some cases, the map data that the route server used to generate the compressed routes is not the same map data that the mapping application uses to decode the compressed routes. The mapping application employs a novel method of rendering the routes on a map even if the map data used by the route server and the map data used by the mapping application do not match.

In some cases, the mapping application sends a compressed route to another server for further analysis (e.g., ETA to the ending location). In some embodiments, the mapping application of some embodiments reduces the compressed route to send to the other server by removing control points that have been consumed by the mapping application.

In this Section, subsection A describes the route server of some embodiments that generates and compresses routes. Subsection B then describes the mapping application of some embodiments that decodes the compressed routes. Finally, subsection C then describes the mapping application of some embodiments that passes the compressed route to another client in an efficient manner.

A. Route Generation and Encoding

Figure 18:
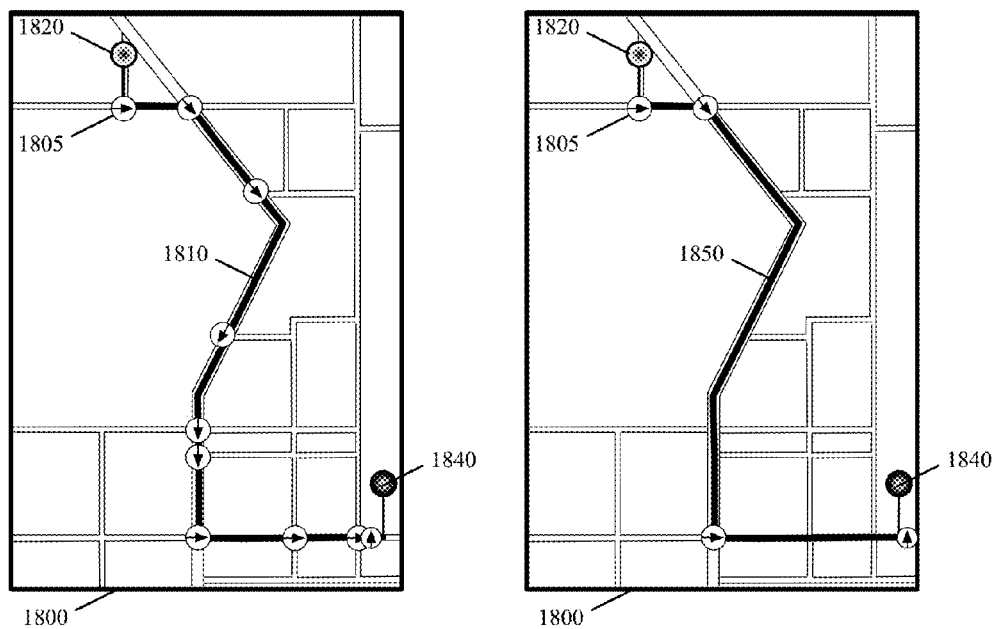
FIG. 18 illustrates conceptual representations of a route generated by the route server of some embodiments.

FIG. 18 illustrates conceptual representations of a route generated by the route server of some embodiments. Specifically, this figure illustrates a route representation 1810 that has a control point at every juncture in the route and a route representation 1850 that has control points at some of the junctures in the route. As shown, the left half of FIG. 18 illustrates the route representation 1810 overlaid on a map 1800 and the right half of FIG. 18 illustrates the route presentation 1850 overlaid on the map 1800. The route server of some embodiments does not render the route representations 1810 and 1850 and the map 1800 to display. The map and the route representations are depicted in this figure for the purpose of describing routes generated by the route server of some embodiments.

The route server generates a route and transmits the route to the mapping application of some embodiments that requested the route. In some embodiments, the data for the route includes data for the starting point, data for the ending point, data for control points, etc. The starting point data and the ending point data in some embodiments include the coordinates (e.g., coordinates for the GPS) for the starting point and the ending point. The control point data includes information of the juncture on which the control point is placed and the direction (e.g., name of the road) which to advance from the juncture. The information of the juncture may include coordinates of the juncture, names of the roads that make up the juncture, the geometric attributes of the juncture, etc. The mapping application of some embodiments reconstructs the route based on the route data.

The route server of some embodiments places a control point at every juncture when the route server initially generates the route between the starting point and the ending point. As such, the size of route data that is transmitted to the mapping application is proportional to the number of junctures and control points. When there are numerous junctures, the size of the route data therefore may grow very large in these embodiments. The route representation 1810 represents an example of route data generated by the route server of these embodiments. As shown, the route representation 1810 has a control point indicator 1805 that represents a control point at every juncture in the route that is depicted as thick black line in the map 1800. The route has the starting point 1820 and the ending point 1840.

In other embodiments, the route server removes control points from some of the junctures in the route. The route server removes control points that are not necessary for the mapping application to reconstruct the route. Determining whether a control point is necessary for reconstructing the route will be described further below. By removing the data for control points from the route data, the route server of these embodiments reduces the size of the route data to send to the mapping application of some embodiments. The route representation 1850 represents an example of route data generated by the route server of these embodiments. As shown, only some of the junctures of the route have control point indicators 1805. The number of control points in the route representation 1850 is much smaller (i.e., 4 vs. 10) than the number of control points in the route representation 1810.

Figure 19:
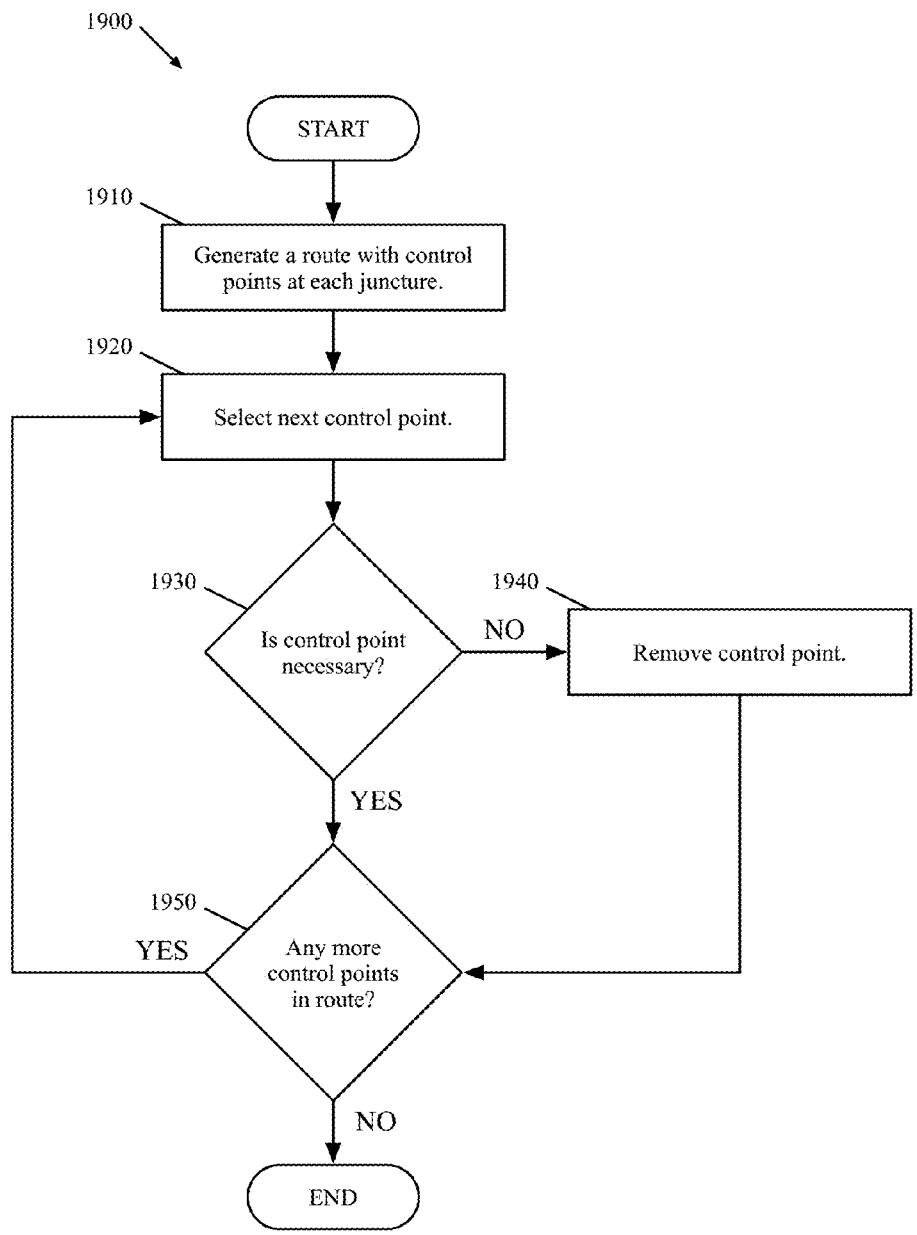
FIG. 19 conceptually illustrates a process of some embodiments for encoding route representations as a minimum number of control points.

FIG. 19 conceptually illustrates a process 1900 of some embodiments for encoding route representations as a minimum number of control points. The process 1900 in some embodiments is executed by a route server. The process 1900 starts once the route server has received a starting point and an ending point from a requesting mapping application.

As shown, process 1900 begins by generating (at 1910) a route with control points at each juncture along the route. A route in some embodiments includes a set of maneuver instructions (or maneuvering instructions) that directs a person or a device through a set of junctures from a starting point to an ending point. More specifically, a maneuvering instruction is associated with each juncture of the route and the maneuvering instruction identifies a road segment to which to advance from the juncture.

Next, process 1900 selects (at 1920) the next control point. If no control point is currently selected by process 1900, then the next control point selected will be the first control point following the start point of the route. Control points describe what maneuver should be used to traverse a juncture while staying on a route. For example, where a route requires a person or a device to take a right turn through a juncture (where a right turn is necessary to stay on the route), the control point will describe a right turn. In some embodiments, each control point is associated with each juncture in a route. The process 1900 employs one or more routing algorithms to produce control points.

Once process 1900 has selected (at 1920) a control point for consideration, process 1900 determines (at 1930) whether the selected control point is necessary. In some embodiments, the route server and the mapping application share a set of default direction rules based on which to determine a direction (or a road segment) to which to advance from a juncture. In some embodiments, process 1900 executes the set of default direction rules on the juncture to produce the maneuver instruction for the associated juncture. Producing a maneuver instruction for a juncture based on the set of default direction rules in some embodiments will be described further below.

Whether a control point is necessary is based on whether the maneuver instruction generated based on the set of default direction rules is the same as the maneuver instruction of the selected control point. That is, whether a control point is necessary is based on whether the two road segments identified by the two maneuvering instructions (one instruction generated based on the set of default direction rules and the other instruction is of the control point) are identical. When the maneuver instruction produced based on the set of default direction rules is different than the maneuver instruction of the control point, the process 1900 determines that the control point is necessary. That is, when the road segment identified by the maneuver instruction produced based on the set of default direction rules is different than the road segment identified by the maneuver instruction of the control point, the process 1900 determines that the maneuver instruction of the control point is necessary.

In some such embodiments, whether a control point is necessary is also based on whether there is a road segment that is close to the road segment identified by the maneuvering instruction of the control point and by the maneuvering instruction generated based on the set of default direction rules. The process 1900 determines whether there is such road segment based on certain criteria. For instance, when another road that makes up the associated juncture is within certain number of degrees (e.g., ten degrees) to the road segment identified by the two maneuver instructions, the process 1900 determines that (the maneuvering instruction of) the control point is necessary even if the maneuvering instruction of the control point is the same as the maneuvering instruction generated based on the set of default direction rules.

When the process 1900 determines (at 1930) that the selected control point is necessary, the process 1900 proceeds to 1950, which will be described further below. When the process 1900 determines (at 1930) that the selected control point is not necessary, the process 1900 removes (at 1940) the control point from the route. In some embodiments, the process 1900 removes the control point from the route by removing the data for the selected control point from the route data that the process 1900 generated (at 1910).

Next, the process 1900 determines (at 1950) whether there are control points left in the route of which the process 1900 has not determined the necessity of yet. When the process 1900 determines (at 1950) there are more such control points in the route, the process 1900 loops back to 1920 to select the next control point. Otherwise, the process ends.

Some embodiments that perform the process 1900 generate the route and control points and then traverse the route to examine each juncture to determine the necessity of the control point associated with the juncture. Alternatively, the process 1900 of other embodiments may generate control points as the process 1900 generates the route. That is, the process 1900 in these embodiments alternates generation of a control point and determination of the necessity of the control point.

Figure 20:
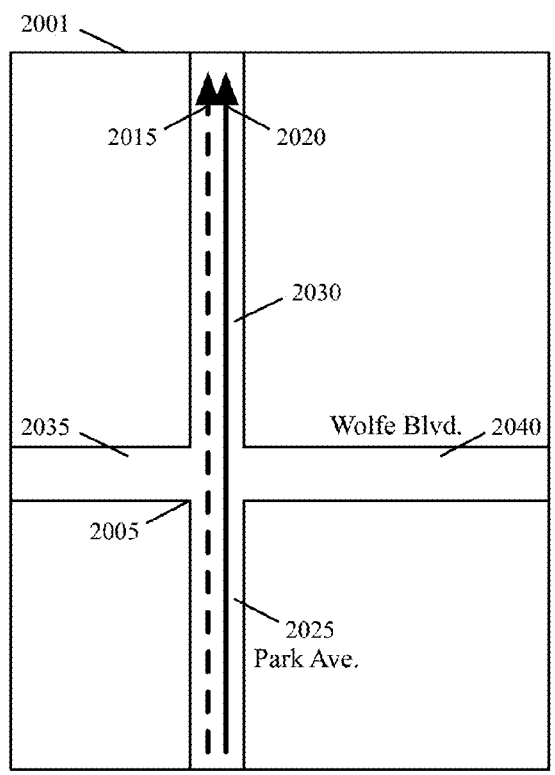
FIGS. 20 and 21 illustrate four example junctures.
Figure 20:
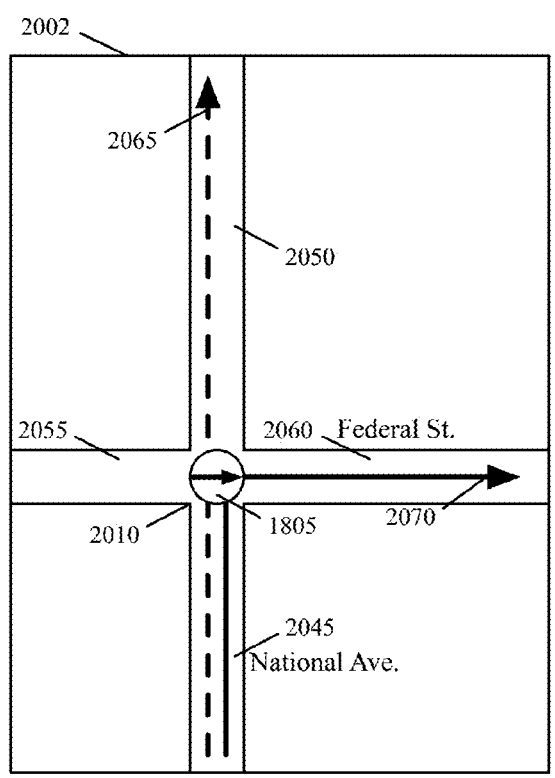
Figure 21:
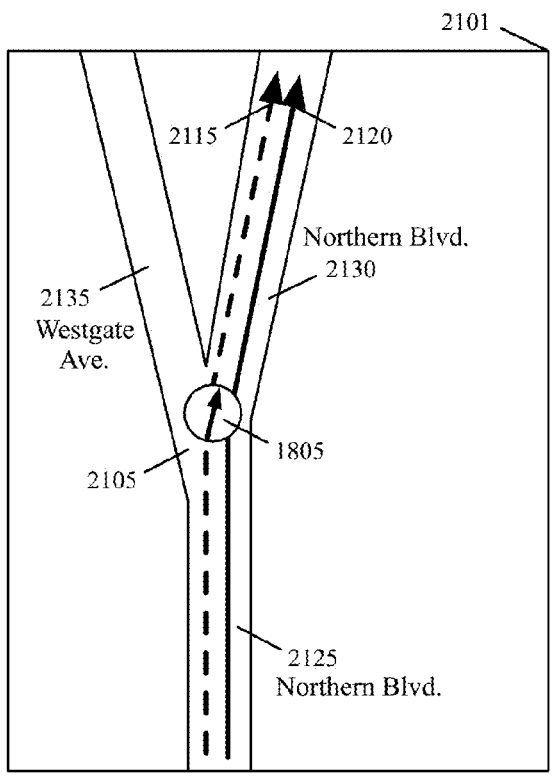
Figure 21:
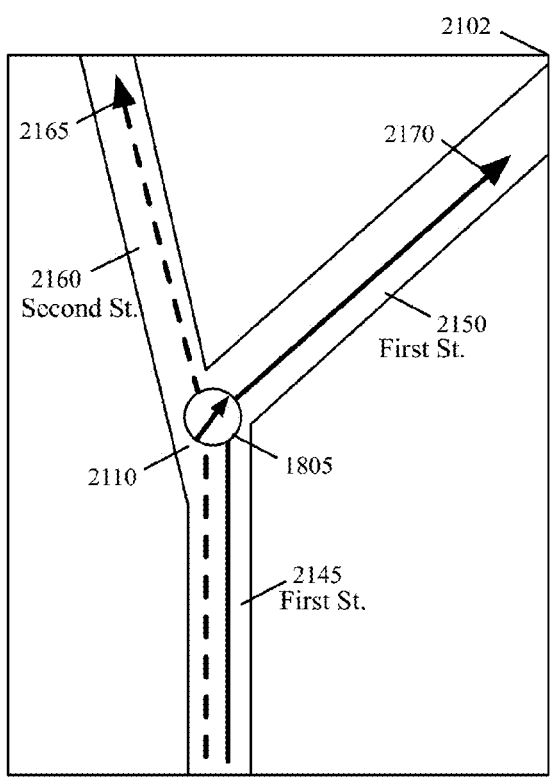

FIGS. 20 and 21 illustrate four example junctures. Specifically, the examples shown in these two figures illustrate four different situations 2001, 2002, 2101, and 2102 in which the route server of some embodiments determines whether to leave the control points for the junctures. Each situation is illustrated in terms of road segments that make up the juncture, an arrowed solid line representing a maneuver instruction of a control point, an arrowed dotted line representing a maneuver instruction produced based on a set of default direction rules, and a control point indicator 1805.

FIG. 20 illustrates the first two situations 2001 and 2002 in the context of junctures 2005 and 2010. The situation 2001 shows that the maneuver instruction 2015 (depicted as an arrowed, dotted line) generated based on the set of default direction rules and the maneuver instruction 2020 (depicted as an arrowed solid line) generated by the route server of some embodiments match.

In some embodiments, the route server (not shown) determines whether the control point for a juncture is necessary by comparing a maneuver instruction generated based on a set of default direction rules and the maneuver instruction of a generated control point. When the two maneuver instructions match (i.e., the maneuver instructions identify the same road segment as the outbound road segment for the juncture), the route server determines that the control point is not needed. When the two maneuver instructions do not match (i.e., the maneuver instructions identify different road segments from the outbound road segments for the juncture), the route server determines that the control point is necessary.

Furthermore, the route server of some embodiments determines whether the control point for a juncture is necessary even when the two maneuver instructions match (i.e., even when the two maneuver instructions identify the same road segment to which to advance from the juncture). The route server of these embodiments determines whether there is another road segment that is close to the road segment identified by the two maneuver instructions. The route server determines that such road segment exists when another road segment meets certain criteria for being close to the identified road segment. For instance, another road segment is determined to be close to the identified road segment when the two segments make an angle (from the juncture) within a certain degree (e.g., ten degrees).

In some embodiments, the route server determines the maneuver instruction for a juncture based on a set of default direction rules for determining the road to which to advance from the juncture. For instance, the route server compares a set of attributes associated with the inbound road segment of a juncture with a set of attributes associated with another road segment of the juncture. When the attributes of the inbound road segment and the other road segment are close or exactly match, the route server determines that the other road segment should be the outbound road segment for the juncture.

The set of attributes in some embodiments includes a functional class attribute, a form of way attribute, and a heading attribute. The functional class attribute indicates the relative importance of the road segment. In some embodiments, road segments with higher relative importance are displayed in more zoom levels than road segments with lower relative importance. For instance, interstate freeways are displayed in almost all zoom levels whereas unnamed dirt roads are displayed only on the most granular zoom levels. The form of way attribute is based on an industry standard system of road segment type codes. For instance, when form of way equals one, the form of way is a road. The heading attribute indicates the angle of deviation from due north of the outbound road segment from the juncture associated with the selected control point.

In some embodiments, the set of default direction rules defines that a certain amount of deviation between inbound and outbound road segment attribute values should be tolerated (i.e., should be deemed matching). For example, when the functional class attributes expressed in quantified values are within a certain threshold difference (e.g. plus or minus one), the functional class attributes are considered matching. As another example, when the heading attributes differ by a certain number of degrees (e.g., ten degrees or equivalent value in radians), the heading attributes are considered matching in some embodiments.

The situation 2001 is a situation in which the road segment identified as the outbound road segment based on the set of default direction rules is the same as the road segment identified as the outbound road segment by the control point. The situation 2001 shows that the juncture 2005 includes two road segments 2025 and 2030 of Park Ave. and two road segments 2035 and 2040 of Wolfe St. In this situation, the segment 2025 of Park Ave. is the inbound road segment of the juncture 2005. In this situation, the route server determines that the attributes of the road segment 2025 and the road segment 2030 are matching because, for example, the attributes of the two road segments exactly match. Therefore, maneuver instruction 2015 indicates go straight.

The maneuver instruction 2020 (depicted as an arrowed solid line) of the control point also indicates go straight as shown. Accordingly, the route server removes the control point from the route as indicated by absence of a control point indicator for the juncture 2005.

In the bottom half of FIG. 20, the situation 2002 shows that the maneuver instruction 2065 (depicted as an arrowed dotted line) generated based on the set of default direction rules and the maneuver instruction 2070 (depicted as an arrowed solid line) generated by the route server of some embodiments are different. The situation 2002 is a situation in which the road segment identified as the outbound road segment based on the set of default direction rules is not the same as the road segment identified as the outbound road segment identified by the control point. The situation 2002 shows that the juncture 2010 includes two road segments 2045 and 2050 of National Ave. and two road segments 2055 and 2060 of Federal St. In this situation, the segment 2045 of National Ave. is the inbound road segment of the juncture 2010. In this situation, the route server determines that the attributes of the road segment 2045 and the road segment 2050 are matching because, for example, the attributes of the two road segments exactly match. Therefore, the maneuver instruction 2065 indicates go straight.

However, the maneuver instruction 2070 (depicted as an arrowed solid line) of the control point indicates turn right (i.e., go to the direction of the road segment 2060) as shown. Accordingly, the route server leaves the control point in the route as indicated by a control point indicator for the juncture 2010.

FIG. 21 illustrates the next two situations 2101 and 2102 in the context of junctures 2105 and 2110. The situation 2101 shows that the maneuver instruction 2115 (depicted as an arrowed dotted line) generated based on the set of default direction rules and the maneuver instruction 2120 (depicted as an arrowed solid line) generated by the route server of some embodiments match. However, this situation shows that the route server leaves the control point for the juncture 2105 to avoid the possible confusion by the user of the mapping application.

The situation 2101 is a situation in which a road segment next to the road segment identified as an outbound road segment, based on the set of default direction rules as well as based on the control point, is too close to the outbound road. In such case, the mapping application of some embodiments provides a maneuvering instruction (e.g., "bear right onto Northern Blvd.") for the user to see (or hear).

The situation 2101 shows that the juncture 2105 includes two road segments 2125 and 2130 of Northern Blvd. and one road segment 2135 of Westgate Ave. In this situation, the segment 2125 of Northern Ave. is the inbound road segment of the juncture 2105. In this situation, the route server determines that the attributes of the road segment 2125 and the road segment 2130 are matching because, for example, the attributes of the two road segments match or are close enough. Therefore, maneuver instruction 2115 indicates go slightly right.

The maneuver instruction 2120 (depicted as an arrowed solid line) of the control point also indicates go slightly right as shown. Accordingly, the route server of some embodiments would remove the control point from the route because the two maneuvering instructions are identical. However, the route server of some embodiments would not remove the control point from the route as shown by the control point indicator 1805 for the juncture 2105. This is because, the road segment 2135 of the Westgate Ave. is too close to the outbound road segment 2130 (e.g., less than 10 degrees apart from the juncture). The user who would approach this juncture 2105 from the road segment 2125 may be confused as to which of the two roads ahead to take.

In the bottom half of FIG. 21, the situation 2102 shows that the maneuver instruction 2165 (depicted as an arrowed dotted line) generated based on the set of default direction rules and the maneuver instruction 2170 (depicted as an arrowed solid line) generated by the route server of some embodiments are different. The situation 2102 is a situation in which the road segment identified as the outbound road segment based on the set of default direction rules better matches with the inbound road segment than the outbound road segment of the control point does even though the outbound road segment of the control point bears the same name as the inbound road segment.

The situation 2102 shows that the juncture 2110 includes two road segments 2145 and 2150 of First St. and one road segment 2160 of Second St. In this situation, the segment 2145 of First St. is the inbound road segment of the juncture 2110. In this situation, the route server determines that the attributes of the road segment 2145 and the road segment 2160 of Second St. are matching because, for example, the attributes of the two road segments exactly match or are close enough. Therefore, maneuver instruction 2165 indicates go slightly left.

However, the maneuver instruction 2170 (depicted as an arrowed solid line) of the control point indicates turn right (i.e., go to the direction of the road segment 2150) as shown. Accordingly, the route server leaves the control point in the route as indicated by a control point indicator for the juncture 2110.

B. Route Decoding and Rendering by Client

Figure 22:
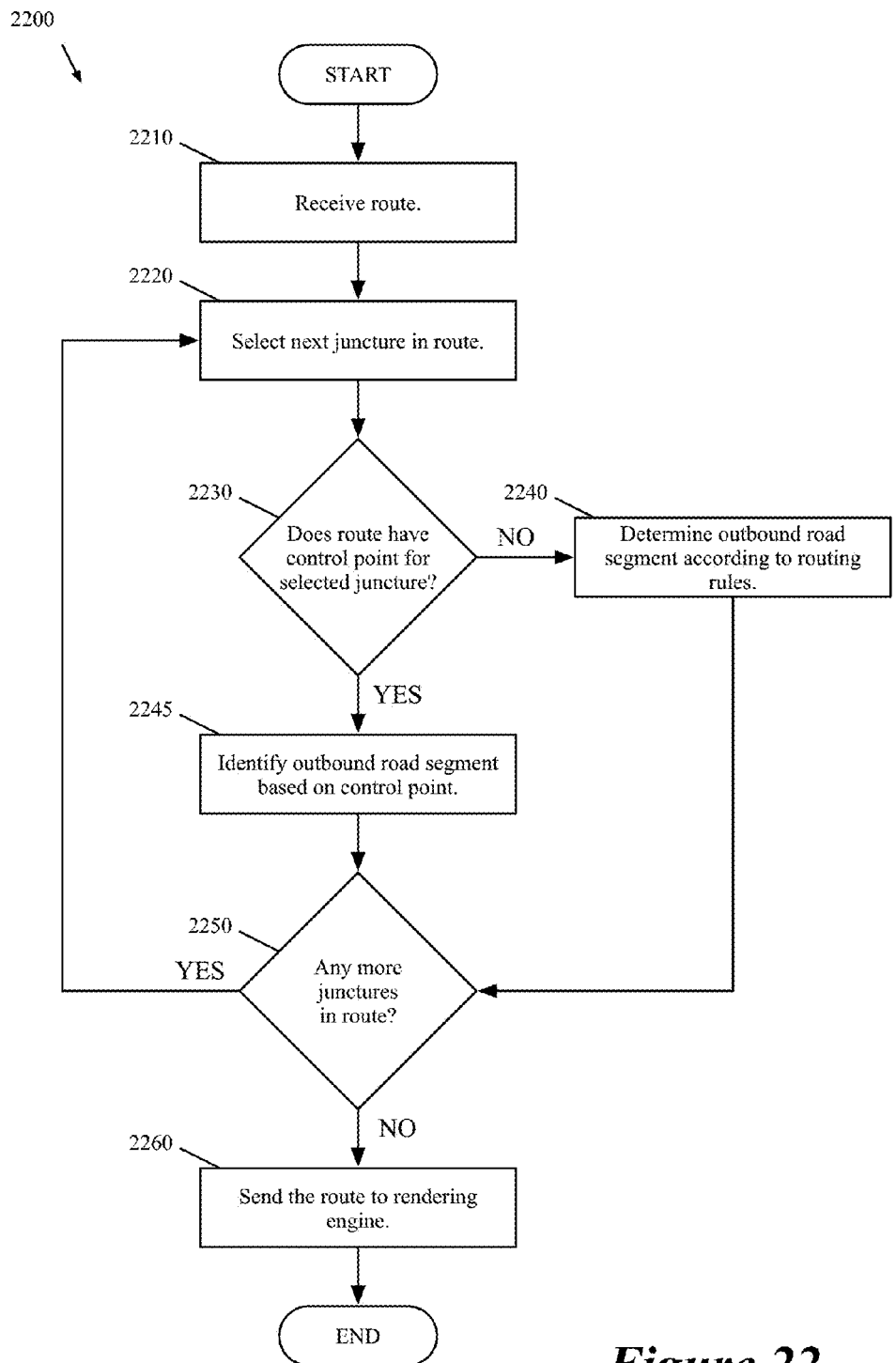
FIG. 22 conceptually illustrates a process of some embodiments for decoding route representations that has been encoded as a minimum number of control points.

FIG. 22 conceptually illustrates a process 2200 of some embodiments for decoding route representations that has been encoded as a minimum number of control points. The process 2200 in some embodiments is executed by a mapping application that receives a route from the route server. The process 2200 starts once the mapping application has sent a starting point and an ending point to the route server of some embodiments to get a route generated by the route server. As shown, process 2200 begins by receiving (at 2210) a route with control points at some junctures along the route. Next, process 2200 selects (at 2220) the next juncture. If no juncture is currently selected by process 2200, then the next juncture selected will be the first juncture at or following the start point of the route.

In some embodiments, the process 2200 finds the junctures from map data (e.g., road tiles described above) that may not be the same map data that the route server had used to generate the route. There are several possible reasons that the map data the process 2200 is using is different than the map data the route server used. For instance, the mapping application that performs the process 2200 may not have downloaded the same road tiles that the route server used to generate the route. Also, map service providers that provide the map data to the mapping application and the route server may be different. Therefore, the junctures that the process 2200 uses may not include the full set of the junctures that the route server had access to in generating the route data and control points.

Once process 2200 has selected (at 2220) a juncture for consideration, the process 2200 determines (at 2230) whether the selected juncture has an associated control point. As mentioned above, the control point data may include information about the associated juncture. The process 2200 in some embodiments uses the juncture information in the control point data to determine whether the juncture has an associated control point.

When the process 2200 determines (at 2230) that the selected juncture does not have an associated control point, the process 2200 proceeds to 2240, which will be described further below. When the process 2200 determines (at 2230) that the selected juncture has an associated control point, the process 2200 identifies (at 2245) the outbound road segment for the selected juncture. The process 2200 then proceeds to 2250 which will be described further below.

When the process 2200 determines (at 2230) that the selected juncture does not have an associated control point, the process 2200 determines (at 2240) the outbound road segment for the juncture based on the set of default direction rules that the route server and the mapping application share in some embodiments.

In some embodiments, process 2200 executes these shared default direction rules on the juncture to produce a maneuver instruction for the selected juncture. By using the shared default direction rules, the process 2200 and the route server can produce the same maneuver instruction. Several examples of producing a maneuver instruction for a juncture in some embodiments are described above by reference to FIGS. 20 and 21.

Next, the process 2200 determines (at 2250) whether there are more junctures in the route which the process 2200 has not considered yet. When the process 2200 determines (at 2250) there are more such junctures in the route, the process 2200 loops back to 2220 to select the next juncture.

When the process 2200 determines there are no more such junctures in the route, the process 2200 then sends (at 2260) the route with the outbound road segment identified or determined for each juncture in the route to the rendering engine so that the rendering engine can render the route representation on a map to display on a device. The rendering engine and its operations to render the route on a map will be described further below. The process 2200 then ends.

The mapping application of some embodiments that consumes the compressed route data (i.e., route data that does not have control point for every juncture in the route) uses the set of default direction rules to reproduce the route generated by the route server. Specifically, the mapping application of these embodiments uses the set of default direction rules to generate maneuvering instructions for the junctures of the route that do not have control points. In other words, the mapping application uses these default direction rules to figures out how to stay on the route from a juncture with one control point and a juncture with the next control point in the route when between these two junctures there are one or more junctures that do not have control points.

In other embodiments, the mapping application consumes the compressed route data does not use the set of default direction rules. The mapping application of these embodiments produces a route using the route data by computing a fastest or shortest path between two consecutive control points of the compressed route data. In other words, the mapping application of these embodiments produces a route from the starting location to the destination location by computing a "route" between each pair of two consecutive control points included in the compressed route data.

Figure 23:
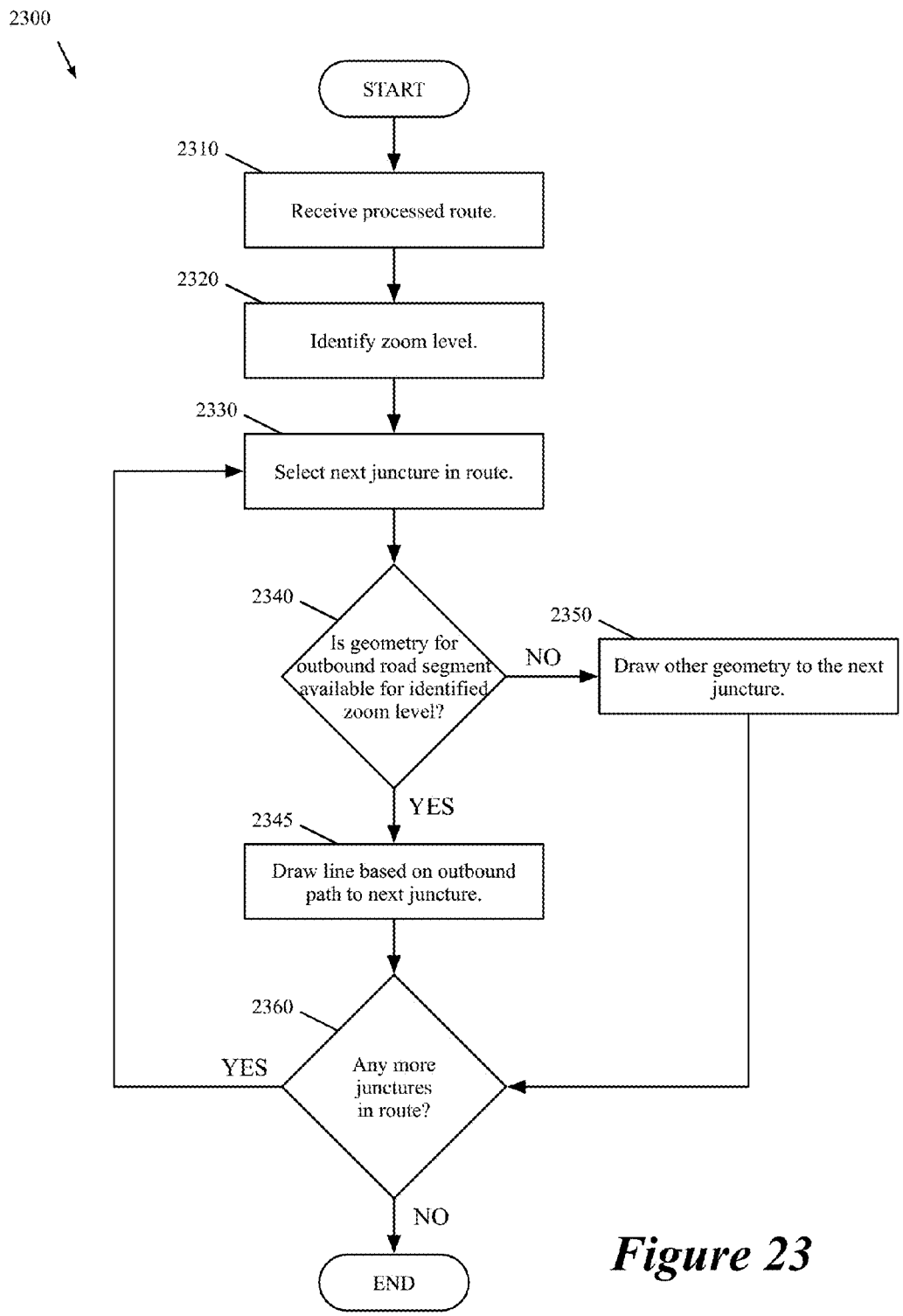
FIG. 23 conceptually illustrates a process that some embodiments perform to render a route on a map in order to display the route representation on a device that the mapping application runs.

FIG. 23 conceptually illustrates a process 2300 that some embodiments perform to render a route on a map in order to display the route representation on a device that the mapping application runs. The process 2300 is performed by the mapping application of some embodiments, more specifically by a rendering engine of the mapping application. In some embodiments, the mapping application that performs the process 2300 is running on a device that does not have full map data including geometry for every zoom level. Some conventional devices dedicated to providing routes have full map data having geometry for the streets for every zoom level. The process 2300 in some embodiments starts when the mapping application completes reconstructing the route from the compressed route.

The process 2300 begins by receiving (2310) a decoded route. As discussed above, the decoded route is a set of maneuver instructions, some of which are generated from a set of default direction rules by the mapping application and some of which are specified by the control points generated by the route server of some embodiments.

The process 2300 then identifies (at 2320) the zoom level at which the mapping application displays the map. Next, the process 2300 selects (at 2330) the next juncture in the received route. If no juncture is currently selected by process 2300, the next juncture selected would be the first juncture at or following the start point of the route.

The process 2300 then determines (at 2340) whether geometry of the outbound road segment for the juncture is available at the identified zoom level. As mentioned above, when the map is zoomed in (i.e., at a relatively higher zoom level), more road segments are visible on the map. When the map is zoomed out (i.e., at a relative low zoom level), less road segments are visible on the map. Therefore, depending on the zoom level, the geometry for the outbound road segment for the selected juncture may not be available because the road tiles at the particular zoom level may not have the geometry for the outbound road segment.

In some embodiments, the process 2300 also examines road tiles at other zoom levels to see whether the geometry for the outbound road segment for the juncture is available. If the geometry for the outbound road segment is available at a zoom level different than the identified zoom level, the process 2300 takes the geometry, rescales the geometry if necessary (i.e., when the geometry is not expressed in vectors), and uses the geometry.

When the process 2300 determines (at 2340) that the geometry is available, the process 2300 proceeds to 2345, which will be described further below. When the process 2300 determines that the geometry is not available, the process 2300 at 2350 draws other geometry (e.g., a straight line) to the next juncture. If there is not another juncture that has not been considered by the process 2300, the next juncture is the ending point of the route.

When the process 2300 determines (at 2340) that the geometry for the outbound road segment for the selected juncture is available, the process 2300 draws (e.g., renders) (at 2345) the available geometry of the outbound road segment on the map.

The process then determines (at 2360) whether there are more available junctures in the route which the process 2300 has not considered yet. When the process 2300 determines (at 2360) there are more such junctures in the route, the process 2300 loops back to 2330 to select the next juncture. Otherwise, the process 2300 then ends.

Figure 24:
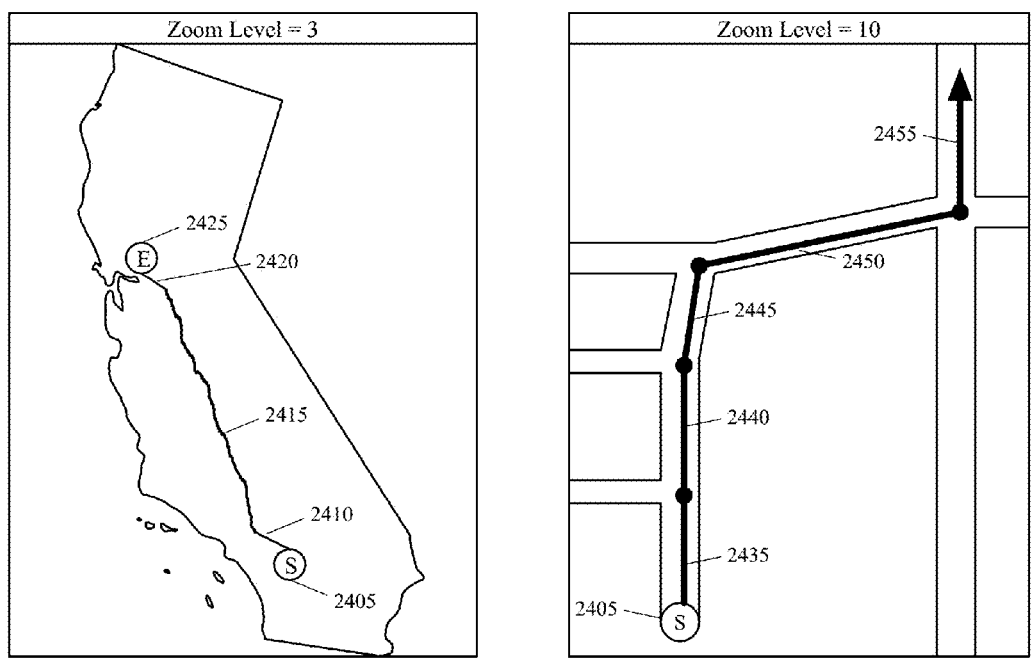
FIG. 24 conceptually illustrates an example of rendering a route at two different zoom levels.

FIG. 24 conceptually illustrates an example of rendering a route at two different zoom levels. Specifically, this figure illustrates that some road segments of the route are rendered as straight lines in the map and some road segments of the route are realistically rendered by using the geometries for those road segments.

The left half of this figure illustrates the route at a relatively low zoom level (e.g., zoom level 3). In this example, the route is between a starting point 2405 at a location in Southern California and an ending point 2425 at a location in Northern California. At this zoom level, the map data (i.e. road tiles) that the mapping application of some embodiments has, does not have geometries for the road segments near the starting point and the ending point and thus the rendering of some embodiments draws the portions of the route that fall in these road segments as straight lines 2410 and 2420. The mapping application in this example has the geometry for the portions of the route that fall in the road segments of highways and freeways. Thus, the rendering engine draws the portion of the route that fall in these road segments using the available geometries. As a result, the portion 2415 of the route is realistically rendered on the map.

The right half of this figure illustrates the portion of the route from the starting point 2405 to the ending point 2425 near the starting point 2405. Because the map is zoomed in to a relatively high zoom level (e.g., zoom level 10) and the mapping application has the road tiles covering this region of the map at this particular zoom level, the rendering engine draws the portions of the route covered by these road segments using the geometries for the road segments as shown.

C. Passing Compressed Route to Another Client

Figure 25:
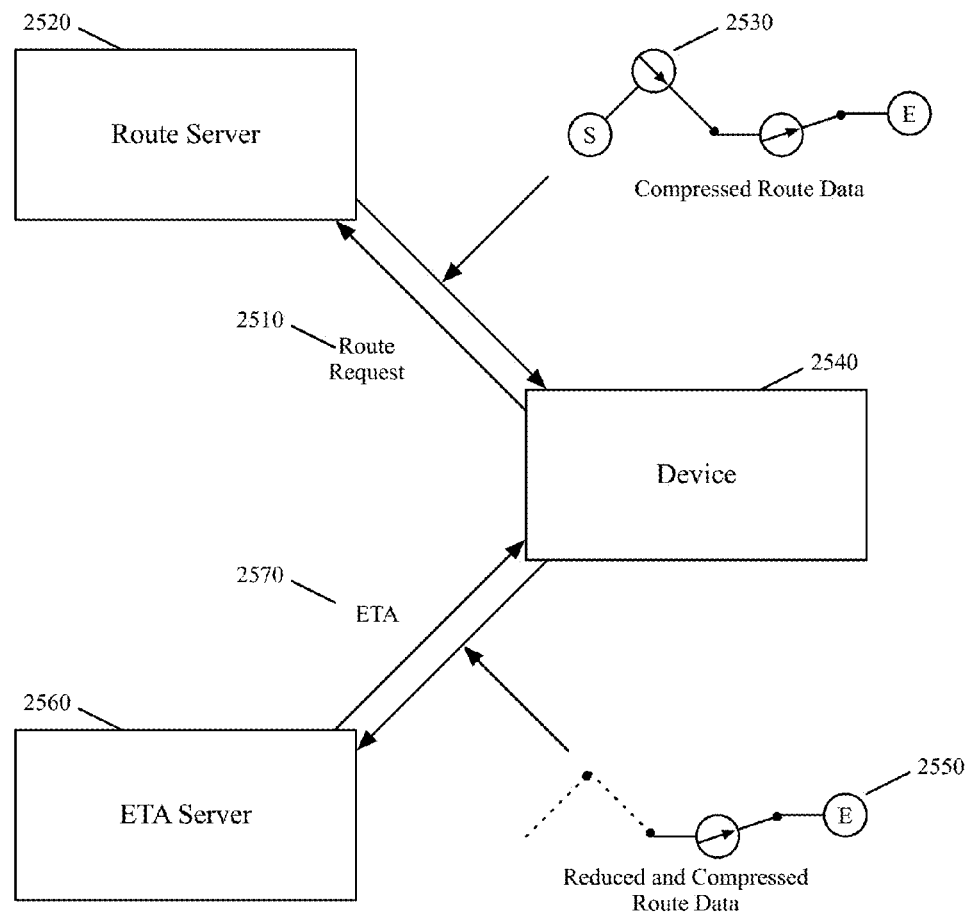
FIG. 25 conceptually illustrates an example of sending compressed route data (1) from a route server that generates the compressed route to a first client that consumes the compressed route data and then (2) from the first client to a second client that consumes the compressed route data.

FIG. 25 conceptually illustrates an example of sending compressed route data (1) from a route server that generates the compressed route to a first client that consumes the compressed route data and then (2) from the first client to a second client that consumes the compressed route data. This figures illustrates a route server 2520, a device 2540, and an ETA server 2560.

The route server 2520 generates a compressed route based on the route request 2510 received from the device 2540. The route request 2510 in some embodiments includes starting point data and ending point data among other data. In response, the route server 2520 generates compressed route data 2530. The compressed route data 2530 in this example includes two control points depicted as encircled, arrowed lines and the starting and ending points depicted as an encircled "S" and an encircled "E." In some embodiments, the route server 2520 removes or does not place control points from junctures in the route. In some embodiments, the route server 2520 generates the compressed route using process 1900 as described above in conjunction with FIG. 19.

The device 2540 is a device on which the mapping application of some embodiment runs. This mapping application generates a set of maneuver instructions based on the received compressed route data 2530. The mapping application provides the maneuver instructions to the user who uses the mapping application. In some embodiments, the device 2540 generates the set of maneuver instructions using process 2200 as described above in conjunction with FIG. 22.

In some embodiments, the mapping application running on the device 2540 provides additional information to the user (e.g., ETA from the current location of the device to the ending point of the route). The mapping application in these embodiments uses another server (e.g., the ETA server 2560) to obtain the data for the additional information (e.g., ETA from the current location of the device to the ending point of the route through which the user is currently navigating).

In some embodiments, the mapping application does not send the whole compressed route data 2530 to the other server (e.g., the ETA server 2560) when sending the route data as part of a request for the additional information (not shown). For instance, the mapping application identifies the current location of the device and then removes any control point that precedes the current location of the device in the route from compressed route data 2530. That is, the mapping application of these embodiments identifies only the ending point and the control points that the mapping application has not consumed or decoded to generate maneuver instructions and gets rid of the rest from the compressed route data 2530. The mapping application of some embodiments thereby reduces (or further compresses) the compressed route data 2530 and sends the reduced and compressed route data 2550 to the other server (e.g., the ETA server 2560). As shown, the reduced and compressed route data 2550 has only one control point. The other server (e.g., the ETA server 2560) then sends back the requested information (e.g., ETA) to the device 2540.

IV. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Device

Figure 26:
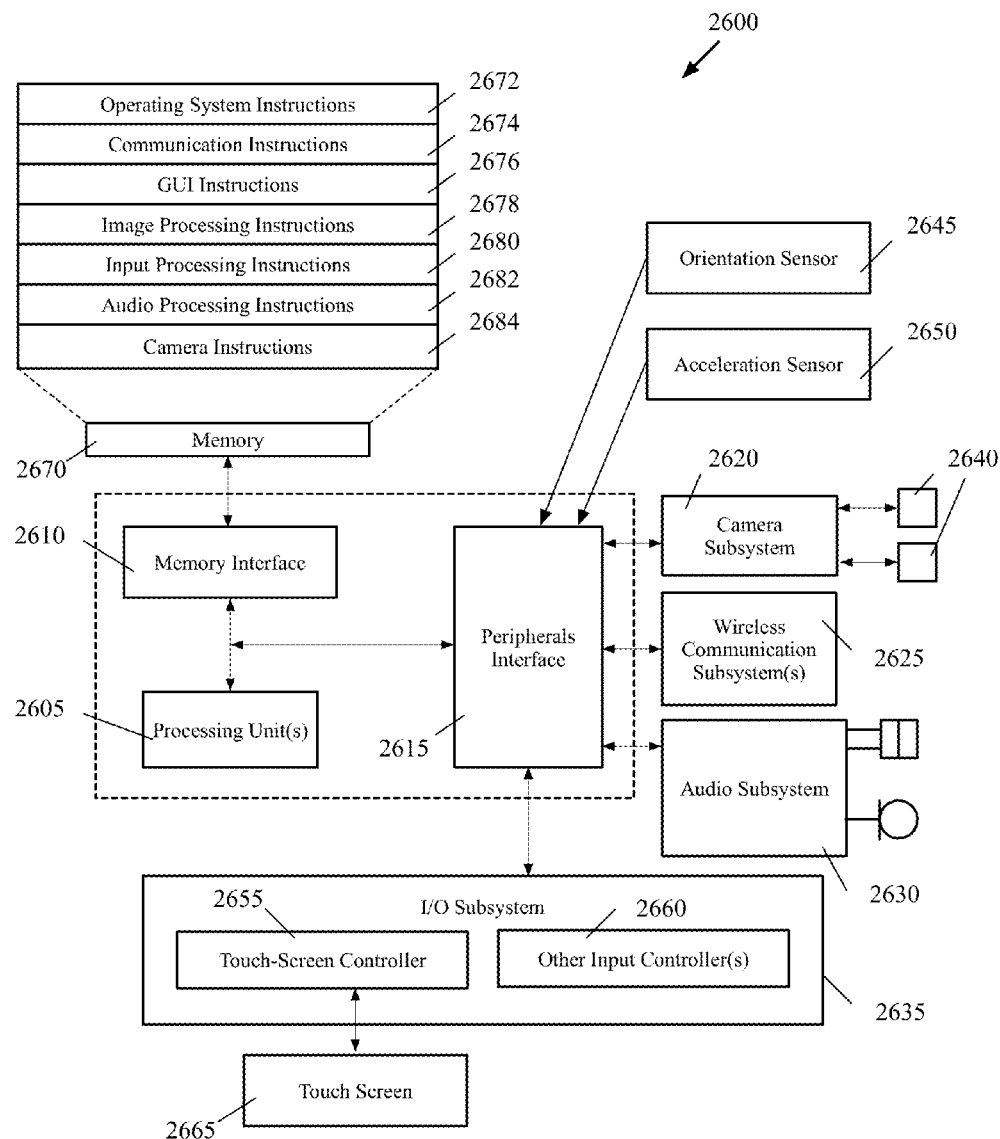
FIG. 26 is an example of an architecture of a mobile computing device on which the mapping application of some embodiments operates.

The mapping and navigation applications of some embodiments operate on mobile devices, such as smart phones (e.g., iPhones®) and tablets (e.g., iPads®). FIG. 26 is an example of an architecture 2600 of such a mobile computing device. Examples of mobile computing devices include smartphones, tablets, laptops, etc. As shown, the mobile computing device 2600 includes one or more processing units 2605, a memory interface 2610 and a peripherals interface 2615.

The peripherals interface 2615 is coupled to various sensors and subsystems, including a camera subsystem 2620, a wireless communication subsystem(s) 2625, an audio subsystem 2630, an I/O subsystem 2635, etc. The peripherals interface 2615 enables communication between the processing units 2605 and various peripherals. For example, an orientation sensor 2645 (e.g., a gyroscope) and an acceleration sensor 2650 (e.g., an accelerometer) is coupled to the peripherals interface 2615 to facilitate orientation and acceleration functions.

The camera subsystem 2620 is coupled to one or more optical sensors 2640 (e.g., a charged coupled device (CCD) optical sensor, a complementary metal-oxide-semiconductor (CMOS) optical sensor, etc.). The camera subsystem 2620 coupled with the optical sensors 2640 facilitates camera functions, such as image and/or video data capturing. The wireless communication subsystem 2625 serves to facilitate communication functions. In some embodiments, the wireless communication subsystem 2625 includes radio frequency receivers and transmitters, and optical receivers and transmitters (not shown in FIG. 26). These receivers and transmitters of some embodiments are implemented to operate over one or more communication networks such as a GSM network, a Wi-Fi network, a Bluetooth network, etc. The audio subsystem 2630 is coupled to a speaker to output audio (e.g., to output voice navigation instructions). Additionally, the audio subsystem 2630 is coupled to a microphone to facilitate voice-enabled functions, such as voice recognition (e.g., for searching), digital recording, etc.

The I/O subsystem 2635 involves the transfer between input/output peripheral devices, such as a display, a touch screen, etc., and the data bus of the processing units 2605 through the peripherals interface 2615. The I/O subsystem 2635 includes a touch-screen controller 2655 and other input controllers 2660 to facilitate the transfer between input/output peripheral devices and the data bus of the processing units 2605. As shown, the touch-screen controller 2655 is coupled to a touch screen 2665. The touch-screen controller 2655 detects contact and movement on the touch screen 2665 using any of multiple touch sensitivity technologies. The other input controllers 2660 are coupled to other input/control devices, such as one or more buttons. Some embodiments include a near-touch sensitive screen and a corresponding controller that can detect near-touch interactions instead of or in addition to touch interactions.

The memory interface 2610 is coupled to memory 2670. In some embodiments, the memory 2670 includes volatile memory (e.g., high-speed random access memory), non-volatile memory (e.g., flash memory), a combination of volatile and non-volatile memory, and/or any other type of memory. As illustrated in FIG. 26, the memory 2670 stores an operating system (OS) 2672. The OS 2672 includes instructions for handling basic system services and for performing hardware dependent tasks.

The memory 2670 also includes communication instructions 2674 to facilitate communicating with one or more additional devices; graphical user interface instructions 2676 to facilitate graphic user interface processing; image processing instructions 2678 to facilitate image-related processing and functions; input processing instructions 2680 to facilitate input-related (e.g., touch input) processes and functions; audio processing instructions 2682 to facilitate audio-related processes and functions; and camera instructions 2684 to facilitate camera-related processes and functions. The instructions described above are merely exemplary and the memory 2670 includes additional and/or other instructions in some embodiments. For instance, the memory for a smartphone may include phone instructions to facilitate phone-related processes and functions. Additionally, the memory may include instructions for a mapping and navigation application as well as other applications. The above-identified instructions need not be implemented as separate software programs or modules. Various functions of the mobile computing device can be implemented in hardware and/or in software, including in one or more signal processing and/or application specific integrated circuits.

While the components illustrated in FIG. 26 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 26 may be split into two or more integrated circuits.

B. Computer System

Figure 27:
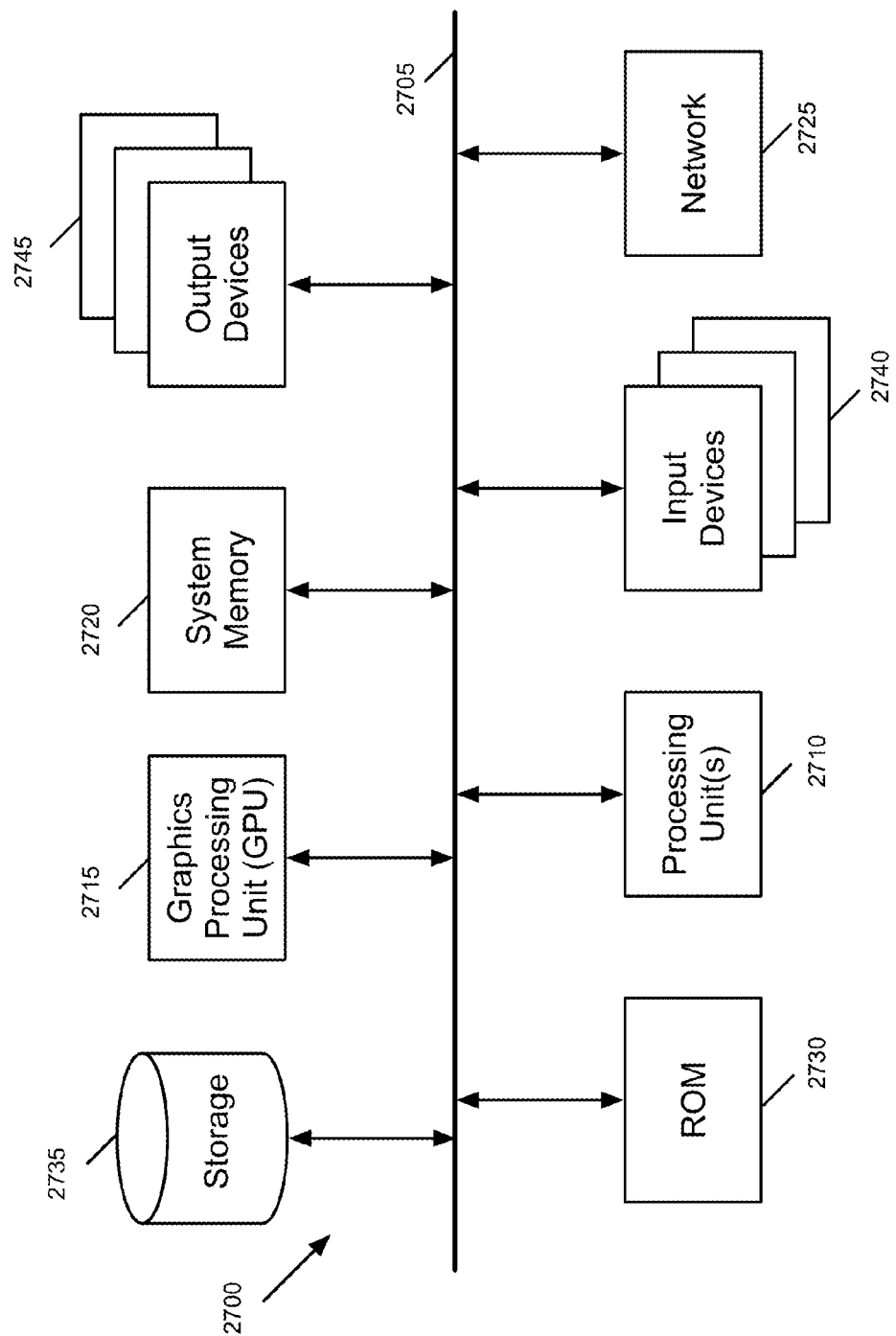
FIG. 27 conceptually illustrates another example of an electronic system with which some embodiments of the invention are implemented.

FIG. 27 conceptually illustrates another example of an electronic system 2700 with which some embodiments of the invention are implemented. The electronic system 2700 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 2700 includes a bus 2705, processing unit(s) 2710, a graphics processing unit (GPU) 2715, a system memory 2720, a network 2725, a read-only memory 2730, a permanent storage device 2735, input devices 2740, and output devices 2745.

The bus 2705 collectively represents all system, peripheral, and chipset buses that communicatively connect the numerous internal devices of the electronic system 2700. For instance, the bus 2705 communicatively connects the processing unit(s) 2710 with the read-only memory 2730, the GPU 2715, the system memory 2720, and the permanent storage device 2735.

From these various memory units, the processing unit(s) 2710 retrieves instructions to execute and data to process in order to execute the processes of the invention. The processing unit(s) may be a single processor or a multi-core processor in different embodiments. Some instructions are passed to and executed by the GPU 2715. The GPU 2715 can offload various computations or complement the image processing provided by the processing unit(s) 2710. In some embodiments, such functionality can be provided using a kernel shading language.

The read-only-memory (ROM) 2730 stores static data and instructions that are needed by the processing unit(s) 2710 and other modules of the electronic system. The permanent storage device 2735, on the other hand, is a read-and-write memory device. This device is a non-volatile memory unit that stores instructions and data even when the electronic system 2700 is off. Some embodiments of the invention use a mass-storage device (such as a magnetic or optical disk and its corresponding disk drive, integrated flash memory) as the permanent storage device 2735.

Other embodiments use a removable storage device (such as a floppy disk, flash memory device, etc., and its corresponding drive) as the permanent storage device. Like the permanent storage device 2735, the system memory 2720 is a read-and-write memory device. However, unlike storage device 2735, the system memory 2720 is a volatile read-and-write memory, such a random access memory. The system memory 2720 stores some of the instructions and data that the processor needs at runtime. In some embodiments, the invention's processes are stored in the system memory 2720, the permanent storage device 2735, and/or the read-only memory 2730. From these various memory units, the processing unit(s) 2710 retrieves instructions to execute and data to process in order to execute the processes of some embodiments.

The bus 2705 also connects to the input and output devices 2740 and 2745. The input devices 2740 enable the user to communicate information and select commands to the electronic system. The input devices 2740 include alphanumeric keyboards and pointing devices (also called "cursor control devices"), cameras (e.g., webcams), microphones or similar devices for receiving voice commands, etc. The output devices 2745 display images generated by the electronic system or otherwise output data. The output devices 2745 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 27, bus 2705 also couples electronic system 2700 to a network 2725 through a network adapter (not shown). In this manner, the computer can be a part of a network of computers (such as a local area network ("LAN"), a wide area network ("WAN"), an intranet, or a network of networks, such as the Internet. Any or all components of electronic system 2700 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

V. Map Service Environment

Figure 28:
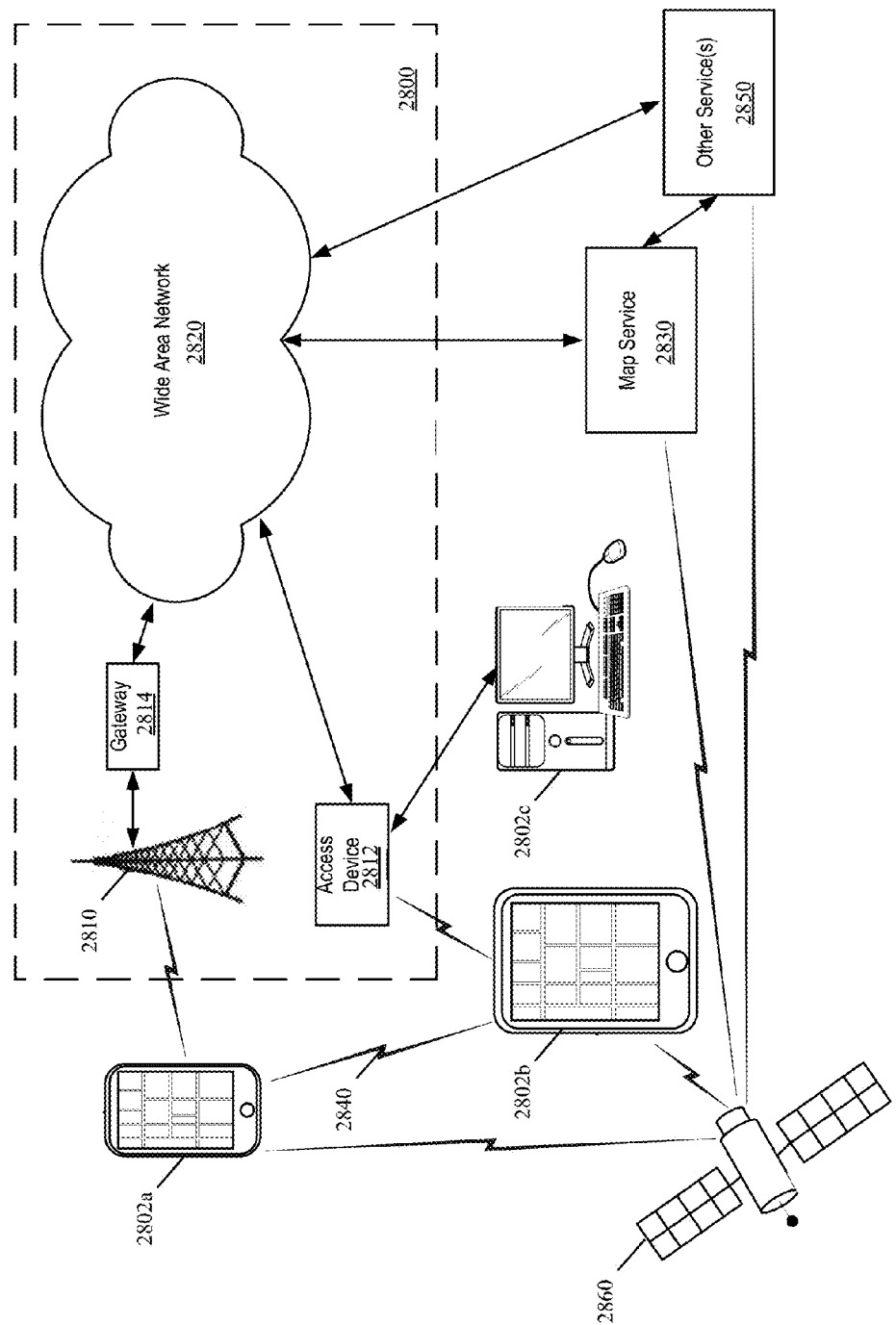
FIG. 28 illustrates a map service operating environment, according to some embodiments.

Various embodiments may operate within a map service operating environment. FIG. 28 illustrates a map service operating environment, according to some embodiments. A map service 2830 (also referred to as mapping service) may provide map services for one or more client devices 2802a-2802c in communication with the map service 2830 through various communication methods and protocols. A map service 2830 in some embodiments provides map information and other map-related data, such as two-dimensional map image data (e.g., aerial view of roads utilizing satellite imagery), three-dimensional map image data (e.g., traversable map with three-dimensional features, such as buildings), route and direction calculations (e.g., ferry route calculations or directions between two points for a pedestrian), real-time navigation data (e.g., turn-by-turn visual navigation data in two or three dimensions), location data (e.g., where the client device currently is located), and other geographic data (e.g., wireless network coverage, weather, traffic information, or nearby points-of-interest). In various embodiments, the map service data may include localized labels for different countries or regions. Localized labels may be utilized to present map labels (e.g., street names, city names, points of interest) in different languages on client devices. Client devices 2802a-2802c may utilize these map services by obtaining map service data. Client devices 2802a-2802c may implement various techniques to process map service data. Client devices 2802a-2802c may then provide map services to various entities, including, but not limited to, users, internal software or hardware modules, and/or other systems or devices external to the client devices 2802a-2802c.

In some embodiments, a map service is implemented by one or more nodes in a distributed computing system. Each node may be assigned one or more services or components of a map service. Some nodes may be assigned the same map service or component of a map service. A load balancing node in some embodiments distributes access or requests to other nodes within a map service. In some embodiments a map service is implemented as a single system, such as a single server. Different modules or hardware devices within a server may implement one or more of the various services provided by a map service.

A map service in some embodiments provides map services by generating map service data in various formats. In some embodiments, one format of map service data is map image data. Map image data provides image data to a client device so that the client device may process the image data (e.g., rendering and/or displaying the image data as a two-dimensional or three-dimensional map). Map image data, whether in two or three dimensions, may specify one or more map tiles. A map tile may be a portion of a larger map image. Assembling together the map tiles of a map produces the original map. Tiles may be generated from map image data, routing or navigation data, or any other map service data. In some embodiments map tiles are raster-based map tiles, with tile sizes ranging from any size both larger and smaller than a commonly-used 256 pixel by 256 pixel tile. Raster-based map tiles may be encoded in any number of standard digital image representations including, but not limited to, Bitmap (.bmp), Graphics Interchange Format (.gif), Joint Photographic Experts Group (.jpg, .jpeg, etc.), Portable Networks Graphic (.png), or Tagged Image File Format (.tiff). In some embodiments, map tiles are vector-based map tiles, encoded using vector graphics, including, but not limited to, Scalable Vector Graphics (.svg) or a Drawing File (.drw). Some embodiments also include tiles with a combination of vector and raster data. Metadata or other information pertaining to the map tile may also be included within or along with a map tile, providing further map service data to a client device. In various embodiments, a map tile is encoded for transport utilizing various standards and/or protocols, some of which are described in examples below.

In various embodiments, map tiles may be constructed from image data of different resolutions depending on zoom level. For instance, for low zoom level (e.g., world or globe view), the resolution of map or image data need not be as high relative to the resolution at a high zoom level (e.g., city or street level). For example, when in a globe view, there may be no need to render street level artifacts as such objects would be so small as to be negligible in many cases.

A map service in some embodiments performs various techniques to analyze a map tile before encoding the tile for transport. This analysis may optimize map service performance for both client devices and a map service. In some embodiments map tiles are analyzed for complexity, according to vector-based graphic techniques, and constructed utilizing complex and non-complex layers. Map tiles may also be analyzed for common image data or patterns that may be rendered as image textures and constructed by relying on image masks. In some embodiments, raster-based image data in a map tile contains certain mask values, which are associated with one or more textures. Some embodiments also analyze map tiles for specified features that may be associated with certain map styles that contain style identifiers.

Other map services generate map service data relying upon various data formats separate from a map tile in some embodiments. For instance, map services that provide location data may utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Embodiments may also receive or request data from client devices identifying device capabilities or attributes (e.g., hardware specifications or operating system version) or communication capabilities (e.g., device communication bandwidth as determined by wireless signal strength or wired or wireless network type).

A map service may obtain map service data from internal or external sources. For example, satellite imagery used in map image data may be obtained from external services, or internal systems, storage devices, or nodes. Other examples may include, but are not limited to, GPS assistance servers, wireless network coverage databases, business or personal directories, weather data, government information (e.g., construction updates or road name changes), or traffic reports. Some embodiments of a map service may update map service data (e.g., wireless network coverage) for analyzing future requests from client devices.

Various embodiments of a map service respond to client device requests for map services. These requests may be a request for a specific map or portion of a map. Some embodiments format requests for a map as requests for certain map tiles. In some embodiments, requests also supply the map service with starting locations (or current locations) and destination locations for a route calculation. A client device may also request map service rendering information, such as map textures or style sheets. In at least some embodiments, requests are also one of a series of requests implementing turn-by-turn navigation. Requests for other geographic data may include, but are not limited to, current location, wireless network coverage, weather, traffic information, or nearby points-of-interest.

A map service, in some embodiments, analyzes client device requests to optimize a device or map service operation. For instance, a map service may recognize that the location of a client device is in an area of poor communications (e.g., weak wireless signal) and send more map service data to supply a client device in the event of loss in communication or send instructions to utilize different client hardware (e.g., orientation sensors) or software (e.g., utilize wireless location services or Wi-Fi positioning instead of GPS-based services). In another example, a map service may analyze a client device request for vector-based map image data and determine that raster-based map data better optimizes the map image data according to the image's complexity. Embodiments of other map services may perform similar analysis on client device requests and as such the above examples are not intended to be limiting.

Various embodiments of client devices (e.g., client devices 2802a-2802c) are implemented on different portable-multi-function device types. Client devices 2802a-2802c utilize map service 2830 through various communication methods and protocols. In some embodiments, client devices 2802a-2802c obtain map service data from map service 2830. Client devices 2802a-2802c request or receive map service data. Client devices 2802a-2802c then process map service data (e.g., render and/or display the data) and may send the data to another software or hardware module on the device or to an external device or system.

A client device, according to some embodiments, implements techniques to render and/or display maps. These maps may be requested or received in various formats, such as map tiles described above. A client device may render a map in two-dimensional or three-dimensional views. Some embodiments of a client device display a rendered map and allow a user, system, or device providing input to manipulate a virtual camera in the map, changing the map display according to the virtual camera's position, orientation, and field-of-view. Various forms and input devices are implemented to manipulate a virtual camera. In some embodiments, touch input, through certain single or combination gestures (e.g., touch-and-hold or a swipe) manipulate the virtual camera. Other embodiments allow manipulation of the device's physical orientation to manipulate a virtual camera. For instance, a client device may be tilted up from its current position to manipulate the virtual camera to rotate up. In another example, a client device may be tilted forward from its current position to move the virtual camera forward. Other input devices to the client device may be implemented including, but not limited to, auditory input (e.g., spoken words), a physical keyboard, mouse, and/or a joystick.

Some embodiments provide various visual feedback to virtual camera manipulations, such as displaying an animation of possible virtual camera manipulations when transitioning from two-dimensional map views to three-dimensional map views. Some embodiments also allow input to select a map feature or object (e.g., a building) and highlight the object, producing a blur effect that maintains the virtual camera's perception of three-dimensional space.

In some embodiments, a client device implements a navigation system (e.g., turn-by-turn navigation). A navigation system provides directions or route information, which may be displayed to a user. Some embodiments of a client device request directions or a route calculation from a map service. A client device may receive map image data and route data from a map service. In some embodiments, a client device implements a turn-by-turn navigation system, which provides real-time route and direction information based upon location information and route information received from a map service and/or other location system, such as a Global Positioning Satellite (GPS) system. A client device may display map image data that reflects the current location of the client device and update the map image data in real-time. A navigation system may provide auditory or visual directions to follow a certain route.

A virtual camera is implemented to manipulate navigation map data according to some embodiments. Some embodiments of client devices allow the device to adjust the virtual camera display orientation to bias toward the route destination. Some embodiments also allow the virtual camera to navigation turns simulating the inertial motion of the virtual camera.

Client devices implement various techniques to utilize map service data from a map service. Some embodiments implement some techniques to optimize rendering of two-dimensional and three-dimensional map image data. In some embodiments, a client device locally stores rendering information. For instance, a client stores a style sheet which provides rendering directions for image data containing style identifiers. In another example, common image textures may be stored to decrease the amount of map image data transferred from a map service. Client devices in different embodiments implement various modeling techniques to render two-dimensional and three-dimensional map image data, examples of which include, but are not limited to: generating three-dimensional buildings out of two-dimensional building footprint data; modeling two-dimensional and three-dimensional map objects to determine the client device communication environment; generating models to determine whether map labels are seen from a certain virtual camera position; and generating models to smooth transitions between map image data. In some embodiments, the client devices also order or prioritize map service data in certain techniques. For instance, a client device detects the motion or velocity of a virtual camera, which if exceeding certain threshold values, lower-detail image data is loaded and rendered for certain areas. Other examples include: rendering vector-based curves as a series of points, preloading map image data for areas of poor communication with a map service, adapting textures based on display zoom level, or rendering map image data according to complexity.

In some embodiments, client devices communicate utilizing various data formats separate from a map tile. For instance, some client devices implement Assisted Global Positioning Satellites (A-GPS) and communicate with location services that utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Client devices may also receive GPS signals directly. Embodiments may also send data, with or without solicitation from a map service, identifying the client device's capabilities or attributes (e.g., hardware specifications or operating system version) or communication capabilities (e.g., device communication bandwidth as determined by wireless signal strength or wired or wireless network type).

FIG. 28 illustrates one possible embodiment of an operating environment 2800 for a map service 2830 and client devices 2802a-2802c. In some embodiments, devices 2802a, 2802b, and 2802c communicate over one or more wired or wireless networks 2810. For example, wireless network 2810, such as a cellular network, can communicate with a wide area network (WAN) 2820, such as the Internet, by use of gateway 2814. A gateway 2814 in some embodiments provides a packet oriented mobile data service, such as General Packet Radio Service (GPRS), or other mobile data service allowing wireless networks to transmit data to other networks, such as wide area network 2820. Likewise, access device 2812 (e.g., IEEE 802.11g wireless access device) provides communication access to WAN 2820. Devices 2802a and 2802b can be any portable electronic or computing device capable of communicating with a map service. Device 2802c can be any non-portable electronic or computing device capable of communicating with a map service.

In some embodiments, both voice and data communications are established over wireless network 2810 and access device 2812. For instance, device 2802a can place and receive phone calls (e.g., using voice over Internet Protocol (VoIP) protocols), send and receive e-mail messages (e.g., using Simple Mail Transfer Protocol (SMTP) or Post Office Protocol 3 (POP3)), and retrieve electronic documents and/or streams, such as web pages, photographs, and videos, over wireless network 2810, gateway 2814, and WAN 2820 (e.g., using Transmission Control Protocol/Internet Protocol (TCP/IP) or User Datagram Protocol (UDP)). Likewise, in some implementations, devices 2802b and 2802c can place and receive phone calls, send and receive e-mail messages, and retrieve electronic documents over access device 2812 and WAN 2820. In various embodiments, any of the illustrated client devices may communicate with map service 2830 and/or other service(s) 2850 using a persistent connection established in accordance with one or more security protocols, such as the Secure Sockets Layer (SSL) protocol or the Transport Layer Security (TLS) protocol.

Devices 2802a and 2802b can also establish communications by other means. For example, wireless device 2802a can communicate with other wireless devices (e.g., other devices 2802b, cell phones, etc.) over the wireless network 2810. Likewise devices 2802a and 2802b can establish peer-to-peer communications 2840 (e.g., a personal area network) by use of one or more communication subsystems, such as Bluetooth® communication from Bluetooth Special Interest Group, Inc. of Kirkland, Wash. Device 2802c can also establish peer to peer communications with devices 2802a or 2802b (not shown). Other communication protocols and topologies can also be implemented. Devices 2802a and 2802b may also receive Global Positioning Satellite (GPS) signals from GPS satellites 2860.

Devices 2802a, 2802b, and 2802c can communicate with map service 2830 over one or more wired and/or wireless networks, 2810 or 2812. For instance, map service 2830 can provide map service data to rendering devices 2802a, 2802b, and 2802c. Map service 2830 may also communicate with other services 2850 to obtain data to implement map services. Map service 2830 and other services 2850 may also receive GPS signals from GPS satellites 2860.

In various embodiments, map service 2830 and/or other service(s) 2850 are configured to process search requests from any of the client devices. Search requests may include but are not limited to queries for businesses, addresses, residential locations, points of interest, or some combination thereof. Map service 2830 and/or other service(s) 2850 may be configured to return results related to a variety of parameters including but not limited to a location entered into an address bar or other text entry field (including abbreviations and/or other shorthand notation), a current map view (e.g., user may be viewing one location on the multifunction device while residing in another location), current location of the user (e.g., in cases where the current map view did not include search results), and the current route (if any). In various embodiments, these parameters may affect the composition of the search results (and/or the ordering of the search results) based on different priority weightings. In various embodiments, the search results that are returned may be a subset of results selected based on specific criteria including but not limited to a quantity of times the search result (e.g., a particular point of interest) has been requested, a measure of quality associated with the search result (e.g., highest user or editorial review rating), and/or the volume of reviews for the search results (e.g., the number of times the search result has been reviewed or rated).

In various embodiments, map service 2830 and/or other service(s) 2850 are configured to provide auto-complete search results that are displayed on the client device, such as within the mapping application. For instance, auto-complete search results may populate a portion of the screen as the user enters one or more search keywords on the multifunction device. In some cases, this feature may save the user time as the desired search result may be displayed before the user enters the full search query. In various embodiments, the auto complete search results may be search results found by the client on the client device (e.g., bookmarks or contacts), search results found elsewhere (e.g., from the Internet) by map service 2830 and/or other service(s) 2850, and/or some combination thereof. As is the case with commands, any of the search queries may be entered by the user via voice or through typing. The multifunction device may be configured to display search results graphically within any of the map display described herein. For instance, a pin or other graphical indicator may specify locations of search results as points of interest. In various embodiments, responsive to a user selection of one of these points of interest (e.g., a touch selection, such as a tap), the multifunction device is configured to display additional information about the selected point of interest including but not limited to ratings, reviews or review snippets, hours of operation, store status (e.g., open for business, permanently closed, etc.), and/or images of a storefront for the point of interest. In various embodiments, any of this information may be displayed on a graphical information card that is displayed in response to the user's selection of the point of interest.

In various embodiments, map service 2830 and/or other service(s) 2850 provide one or more feedback mechanisms to receive feedback from client devices 2802a-2802c. For instance, client devices may provide feedback on search results to map service 2830 and/or other service(s) 2850 (e.g., feedback specifying ratings, reviews, temporary or permanent business closures, errors etc.); this feedback may be used to update information about points of interest in order to provide more accurate or more up-to-date search results in the future. In some embodiments, map service 2830 and/or other service(s) 2850 may provide testing information to the client device (e.g., an A/B test) to determine which search results are best. For instance, at random intervals, the client device may receive and present two search results to a user and allow the user to indicate the best result. The client device may report the test results to map service 2830 and/or other service(s) 2850 to improve future search results based on the chosen testing technique, such as an A/B test technique in which a baseline control sample is compared to a variety of single-variable test samples in order to improve results.

While the invention has been described with reference to numerous specific details, one of ordinary skill in the art will recognize that the invention can be embodied in other specific forms without departing from the spirit of the invention. For instance, many of the figures illustrate various touch gestures (e.g., taps, double taps, swipe gestures, press and hold gestures, etc.). However, many of the illustrated operations could be performed via different touch gestures (e.g., a swipe instead of a tap, etc.) or by non-touch input (e.g., using a cursor controller, a keyboard, a touchpad/trackpad, a near-touch sensitive screen, etc.). In addition, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

Also, while traffic congestion is displayed along or over roads that are presented in a map that is being browsed in several of the example above, one of ordinary skill will realize that in some embodiments traffic congestion can be displayed during route navigation. Thus, one of ordinary skill in the art would understand that the invention is not to be limited by the foregoing illustrative details, but rather is to be defined by the appended claims.

What is claimed is:

1. For a route server that generates route data, a method of encoding the route data, the method comprising:
receiving, from a route client, a request for route data for a route comprising a plurality of junctures, the route data comprising maneuvering instruction data associated with each juncture in the plurality of junctures;
determining, for each juncture of the route, whether the associated maneuvering instruction data is producible by the route client without receiving the maneuvering instruction data from the route server, said determination made by comparing the maneuvering instruction for the juncture to a default maneuvering instruction for the same juncture generated based on a set of default direction rules;
encoding the route data by excluding, from the route data, any maneuvering instruction data that is determined to be producible at the route client, when generating the route data; and
sending the encoded route data to the route client.

2. The method of claim 1, wherein the route client decodes the encoded route data received from the route server by generating the excluded maneuvering instructions data and adding the generated maneuvering instructions data to the route data.

3. The method of claim 1, wherein the maneuvering instruction data is determined to be producible at the route client when the maneuvering instruction for the juncture is deemed to be identical to the default maneuvering instruction.

4. The method of claim 3, wherein each one of the maneuvering instruction and default maneuvering instruction comprises an outbound road segment to which to advance at the juncture, wherein the maneuvering instruction for the juncture is deemed to be identical to the default maneuvering instruction when the two outbound road segments are identical.

5. The method of claim 4, wherein the maneuvering instruction data is determined not to be identical to the default maneuvering instruction when the juncture has two outbound road segments that are close to each other.

6. The method of claim 5, wherein the two outbound road segments are close to each other when the outbound road segments make an angle within a threshold degree.

7. The method of claim 4, wherein the default outbound road segment of the default maneuvering instruction for the juncture is identified based on the set of default direction rules when a set of attributes associated with an inbound road segment of the juncture matches a set of attributes associated with the default outbound road segment of the juncture.

8. The method of claim 7, wherein each set of attributes comprises at least one of a functional class attribute, a form of way attribute, and a heading attribute.

9. The method of claim 7, wherein the set of attributes associated with the inbound road segment of the juncture matches the set of attributes associated with the default outbound road segment of the juncture when each attribute in the set of attributes associated with the inbound road segment is identical to or within a close range of a corresponding attribute in the set of attributes associated with the default outbound road segment.

10. A non-transitory machine readable medium storing a program which when executed by at least one processing unit of a device generates route data for a route server, the program comprising sets of instructions for:
receiving, from a route client, a request for route data for a route comprising a plurality of junctures, the route data comprising maneuvering instruction data associated with each juncture in the plurality of junctures;
determining, for each juncture of the route, whether an associated maneuvering instruction data for the juncture is producible at a route client without receiving the maneuvering instruction data from the route server, said determination made by comparing the maneuvering instruction for the juncture to a default maneuvering instruction for the same juncture generated based on a set of default direction rules;
including in the route data only those maneuvering instructions data for junctures that are determined not to be producible at the route client; and
sending the route data to the route client.

11. The machine readable medium of claim 10, wherein the set of instructions for determining whether a maneuvering instruction data is producible at the route client further comprises a set of instructions for determining that the maneuvering instruction data for the juncture is producible when the maneuvering instruction is identical to the default maneuvering instruction.

12. The machine readable medium of claim 11, wherein the set of instructions for determining whether a maneuvering instruction data is producible at the route client further comprises a set of instructions for determining the maneuvering instruction data is not producible at the route client even when the maneuvering instruction is identical to the default maneuvering instruction only if the juncture has two outbound road segments that are close to each other.

13. The machine readable medium of claim 12, wherein the two outbound road segments are close to each other when the outbound road segments make an angle within a threshold degree.

14. The machine readable medium of claim 11, wherein each one of the maneuvering instruction and default maneuvering instruction comprises an outbound road segment to which to advance at the juncture, wherein the maneuvering instruction is identical to the default maneuvering instruction when the two outbound road segments are identical.

15. The machine readable medium of claim 14, wherein the default outbound road segment of the default maneuvering instruction for the juncture is identified based on the set of default direction rules when a set of attributes associated with an inbound road segment of the juncture matches a set of attributes associated with the default outbound road segment of the juncture.

16. The machine readable medium of claim 15, wherein each set of attributes comprises at least one of a functional class attribute, a form of way attribute, and a heading attribute.

17. The machine readable medium of claim 10, wherein the route client generates maneuvering instructions data that is not included in the route data and adds the generated maneuvering instructions data to the route data received from the route server.

18. An electronic device comprising:
a set of processing units for executing sets of instructions; and
a machine-readable medium storing a program which when executed by at least one of the processing units generates route data for a route server, the program comprising sets of instructions for:
receiving, from a route client, a request for route data for a route comprising a plurality of junctures, the route data comprising maneuvering instruction data associated with each juncture in the plurality of junctures;

determining, for each juncture of the route, whether an associated maneuvering instruction data for the juncture is producible at a route client without receiving the maneuvering instruction data from the route server, said determination made by comparing the maneuvering instruction for the juncture to a default maneuvering instruction for the same juncture generated based on a set of default direction rules;

including in the route data only those maneuvering instructions data for junctures that are determined not to be producible at the route client; and sending the route data to the route client.

19. The electronic device of claim 18, wherein the set of instructions for determining whether a maneuvering instruction data is producible at the route client further comprises a set of instructions for determining that the maneuvering instruction data for the juncture is producible when the maneuvering instruction is identical to the default maneuvering instruction.

20. The electronic device of claim 19, wherein each one of the maneuvering instruction and default maneuvering instruction comprises an outbound road segment to which to advance at the juncture, wherein the maneuvering instruction is identical to the default maneuvering instruction when the two outbound road segments are identical.

21. The electronic device of claim 20, wherein the default outbound road segment of the default maneuvering instruction for the juncture is identified based on the set of default direction rules when a set of attributes associated with an inbound road segment of the juncture matches a set of attributes associated with the default outbound road segment of the juncture.

22. The electronic device of claim 21, wherein each set of attributes comprises at least one of a functional class attribute, a form of way attribute, and a heading attribute.

23. The electronic device of claim 19, wherein the set of instructions for determining whether a maneuvering instruction data is producible at the route client further comprises a set of instructions for determining the maneuvering instruction data is not producible at the route client even when the maneuvering instruction is identical to the default maneuvering instruction only if the juncture has two outbound road segments that are close to each other.

24. The electronic device of claim 23, wherein the two outbound road segments are close to each other when the outbound road segments make an angle within a threshold degree.

25. The electronic device of claim 18, wherein the route client generates maneuvering instructions data that is not included in the route data and adds the generated maneuvering instructions data to the route data received from the route server.

* * * * *